(12) United States Patent
Gudbjartsson et al.

(10) Patent No.: US 7,152,073 B2
(45) Date of Patent: Dec. 19, 2006

(54) METHOD AND SYSTEM FOR DEFINING SETS BY QUERYING RELATIONAL DATA USING A SET DEFINITION LANGUAGE

(75) Inventors: Hakon Gudbjartsson, Reykjavik (IS); Thorvaldur S. Arnarson, Reykjavik (IS); Pavol Rovensky, Kopavogur (IS); Vilmundur Palmason, Mosfellsbaer (IS)

(73) Assignee: deCODE Genetics ehf., Reykjavik (IS)

( * ) Notice: Subject to any disclaimer, the term of this patent is extended or adjusted under 35 U.S.C. 154(b) by 527 days.

(21) Appl. No.: 10/603,112

(22) Filed: Jun. 24, 2003

(65) Prior Publication Data
US 2004/0153435 A1 Aug. 5, 2004

Related U.S. Application Data

(63) Continuation-in-part of application No. 10/356,365, filed on Jan. 30, 2003.

(51) Int. Cl.
G06F 17/30 (2006.01)
(52) U.S. Cl. .................................................. 707/102
(58) Field of Classification Search ............ 707/1–10, 707/100–104.1, 200–206; 725/10, 34; 715/531
See application file for complete search history.

(56) References Cited

U.S. PATENT DOCUMENTS

| | | | |
|---|---|---|---|
| 4,506,326 A | | 3/1985 | Shaw et al. |
| 4,930,071 A | | 5/1990 | Tou et al. |
| 5,542,078 A | | 7/1996 | Martel et al. |
| 5,555,403 A | | 9/1996 | Cambot et al. |
| 5,806,061 A | * | 9/1998 | Chaudhuri et al. ............ 707/3 |
| 5,918,232 A | * | 6/1999 | Pouschine et al. ...... 707/103 R |
| 6,275,818 B1 | | 8/2001 | Subramanian et al. |
| 6,549,907 B1 | | 4/2003 | Fayyad et al. |
| 6,604,100 B1 | * | 8/2003 | Fernandez et al. ............. 707/3 |
| 2001/0053968 A1 | | 12/2001 | Galitsky et al. |
| 2002/0078041 A1 | | 6/2002 | Wu |
| 2002/0165701 A1 | | 11/2002 | Lichtenberg et al. |

(Continued)

FOREIGN PATENT DOCUMENTS

EP 0 877 328 A2 11/1998

(Continued)

OTHER PUBLICATIONS

Chaudhuri, S. and U. Dayal, "An Overview of Data Warehousing and OLAP Technology," *SIGMOD Record* 26(1):65-74 (1997).

(Continued)

*Primary Examiner*—Diane Mizrahi
(74) *Attorney, Agent, or Firm*—Hamilton, Brook, Smith & Reynolds, P.C.

(57) ABSTRACT

The present invention relates to the usage pattern, commonly found in many software applications, of defining sets of objects based on object attributes. A specifically designed set definition language for defining sets, called SDL, is described and a software system that implements this language efficiently on top of a standard relational database management system (RDBMS) is presented. The unique features of the SDL language are the implicit constraints that are enforced on the relational data that belong to the objects. Unique to the SDL system is also the logical metadata of dimensions that enables the SDL system to enforce these constraints across relations. The SDL system utilizes several optimization techniques to enable efficient implementation on top of RDBMS. It is also shown how the SDL language and the SQL language can be merged with bidirectional inlining using syntactic gates. Query composition tools are also described that facilitate the creation of SDL expressions.

22 Claims, 35 Drawing Sheets

U.S. PATENT DOCUMENTS

2002/0178151 A1* 11/2002 Chaudhuri et al. ............ 707/3
2004/0006574 A1* 1/2004 Witkowski et al. ...... 707/104.1

FOREIGN PATENT DOCUMENTS

EP          1 081 610 A2     3/2001

OTHER PUBLICATIONS

Jarke, M. and J. Koch, "Query Optimization in Database Systems," *ACM Computing Surveys 16(2)*:111-152 (1984).

El-Sharkawi, M.E. and Kambayashi, Y., "The Architecture and Implementation of ENLI: Example-Based Natural Language Assisted Interface," Proc. of PARBASE-90, Miami, Florida, Mar. 6-9 (1990), pp. 430-432.

Siau, K.L., et al., "Visual Knowledge Query Language as a Front-End to Relational Systems," Proceedings of the 15th Annual International Computer Software and Applications Conference, (1991), pp. 373-378, Tokyo: IEEE Computer Society Press.

Czejdo, B. and Taylor, M.C., "Integration of Database Systems and Smalltalk," in Proceedings of Symposium on Applied Computing, Kansas City, (1991), pp. 393-402.

Tian, F., et al., "The Design and Performance Evaluation of Alternative XML Storage Strategies," ACM SIGMOD Record, 31(1),Mar. 2002, pp. 5-10.

Shi, S., et al., "An enterprise directory solution with DB2," *IBM Systems Journal 39*(2):360-383 (2000).

Haas, L.M., et al., "Data Integration through Database Federation," *IBM Systems Journal 41*(4):578-596 (2002).

R.G.G. Cattell, "Object Data Management: Object-Oriented and Extended Relational Database Systems", 1994, Addison Wesley Publishing Company, Inc. (Table of Contents).

Brown, S.A., "The Semantics of Database Query Languages," Ph.D. dissertation, University of Sheffield, UK, 1999.

M. Stonebraker, "Object-relational DBMSs: the next great wave," 1996, Morgan Kaufmann Publishers, Inc. (table of contents).

Florescu, D. and D. Kossman, "A Performance Evaluation of Alternative Mapping Schemes for Storing XML Data in a Relational Database," Technical Report, INRIA, France, May 1999 (33 pp.).

Missikoff, M., "A domain based internal schema for relational database machines," .In *Proceedings of 1982 ACM SIGMOD Int'l. Conf. on Management of Data*, Jun. 2-4, 1982 (pp. 215-224).

Copeland, , G.P. and S.N. Khoshafian, "A decomposition storage model," In *Proceedings of the 1985 ACM SIGMOD Int'l Conf. on Management of Data*, May 28-31, 1985, pp. 268-279.

Khoshafian, S. et al., "A Query Processing Strategy for the Decomposed Storage Model," in *Proceedings of the Third Int'l. Conf. on Data Engineering*, Feb. 3-5, 1987, pp. 636-643.

Giovinazzo, W.A. *Object-Oriented Data Warehouse Design: Building a Star Schema*, Prentice-Hall, Feb. 2000 (table of contents).

Oracle9i Data Warehousing Guide, Release 1 (9.0.1), Jun. 2001, Oracle Corporation, Redwood Shores, California (table of contents and index).

Ramakrishnan, R. and J. Gehrke, Database Management Systems 2nd Edition, McGraw Hill, 2002 (table of contents).

Agrawal, R. et al., "Storage and Querying of E-Commerce Data," *Proceedings of 27th VLDB Conference*. Rome, Sep. 11-14, 2001 (pp. 149-159).

DB2 Application Development Guide [online], [retrieved on Mar. 20, 2003]. Retrieved from the Internet URL:http://www-3.ibm.com/software/data/db2/udb/ad/v7/ (1 p.). (also table of contents).

* cited by examiner

400

| | Domain | SQLtype | Hierarchy | Min | Max |
|---|---|---|---|---|---|
| 303 | DIAG | String | TDiags | NULL | NULL |
| 304 | GENDER | Char | TSex | NULL | NULL |
| 302 | DATE | Date | NULL | 1900 | 2100 |
| 305 | ID | Integer | NULL | 0 | NULL |

401

| Dimension | Domain |
|---|---|
| PID | ID |
| FID | ID |
| MID | ID |
| SEX | GENDER |
| DOB | DATE |
| DOD | DATE |
| OBSDATE | DATE |
| DIAG | DIAG |

403

| Dimension | Relation | Column_name | Multiplicity |
|---|---|---|---|
| PID | relation1 | CPID | Unique |
| PID | relation2 | CPID | Multiple |
| FID | relation1 | CFID | Multiple |
| MID | relation1 | CMID | Multiple |
| SEX | relation1 | CSEX | Multiple |
| DOB | relation1 | CDOB | Multiple |
| DOD | relation1 | CDOD | Multiple |
| OBSDATE | relation2 | COBSDATE | Multiple |
| DIAG | relation2 | CDIAG | Multiple |

402

| Relation | SQLrelation | Inclusion_criteria |
|---|---|---|
| relation1 | TableA | {PID, FID, MID, SEX, DOB, DOD} |
| relation2 | TableB | Sex |

| PID | DIAG | HOSPID | DOCID | DATE |
|---|---|---|---|---|
| 1 | icd9.stroke | 100 | A | 1966 |
| 2 | icd9.x | 200 | B | 2000 |

601

| HOSPID | NAME | TYPE | REGION | ZIP |
|---|---|---|---|---|
| 100 | MGH | TH | Boston | 02222 |
| 200 | BWH | TH | Brookline | 02115 |

602

| PID | DATE | DIAG | HOSP. NAME | HOSP. TYPE | HOSP. REGION | HOSP. ZIP |
|---|---|---|---|---|---|---|
| 1 | 1966 | icd9.stroke | MGH | TH | Boston | 02222 |
| 2 | 2000 | icd9.x | BWH | TH | Brookline | 02115 |

603

| Relation | SQL relation | Inclusion_criteria |
|---|---|---|
| relation1 | diags | {PID,DIAG,HOSPID,DOCID} |
| relation2 | hospitals | {HOSPID,NAME,TYPE,REGION, ZIP} |
| relation3 | vdiags | {PID,DIAG,HOSPID,DOCID}, {HOSP.NAME,HOSP.TYPE, HOSP.REGION,HOSP.ZIP} |

{ A disjunctive SDL expression of the form (expr_A) OR (expr_B) } ─ 900

↓

Translate to SQL using the union approach, e.g.:
SELECT DISTINCT output-dim
FROM (SDL2SQL(expr_A) UNION SDL2SQL(expr_B)

{ A conjunctive SDL expression of the form (expr_A) AND (expr_B) } ─ 901

↓

Translate to SQL using the join approach, e.g.:
SELECT DISTINCT output-dim FROM
(SDL2SQL(expr_A) vA, SDL2SQL(expr_B) vB
WHERE vA.output-dim = vB.output-dim

| | |
|---|---|
| FIG. 19A | |
| FIG. 19B | |

FIG. 19A

Query Tool

- Projects
  - Gene Mining
    - Dimensions — 1900
      - Alternative gene IDs
        - Accession
        - Gene Symbol
        - Gene Symbol Alias
      - Expression
        - Gene ID
      - Gene Text Reports
      - Internal Systems dimensions
      - Linkage
      - Location
      - Mutations and Polymorphisms
      - Protein Structure and function
        - Enzyme reactions
        - Functions
        - GeneOntology — 1902
          - Go Terms
            - Original go id
        - Interaction
        - Protein motifs
        - Sequence Similarity
        - Species Homology
        - Transcript related information
- Resources Related Dimensions — 1901
- Gene ID
- Original go id
- Import identifier Tabs: SDL Editor | External | Venn | Output Spec | Dialog Builder | Resources

1903

1904

[Intersect] [Query] — 1905

| Name | Expression | Date | Count | Dimensions |
|---|---|---|---|---|
| Query 0 | ALT_IDS SYMBOL | Wed Feb 06 17:00:20 GMT 2002 | 14620 | GID |
| Query 1 | ALT_IDS SYMBOL and NOT LOC.CHROM | Wed Feb 06 17:01:00 GMT 2002 | 47 | GID |
| Query 2 | ALT_IDS SYMBOL_ALIAS | Wed Feb 06 17:01:27 GMT 2002 | 8128 | GID |
| Query 3 | ALT_IDS SYMBOL and LOC.CHROM | Wed Feb 06 17:02:01 GMT 2002 | 14573 | GID |

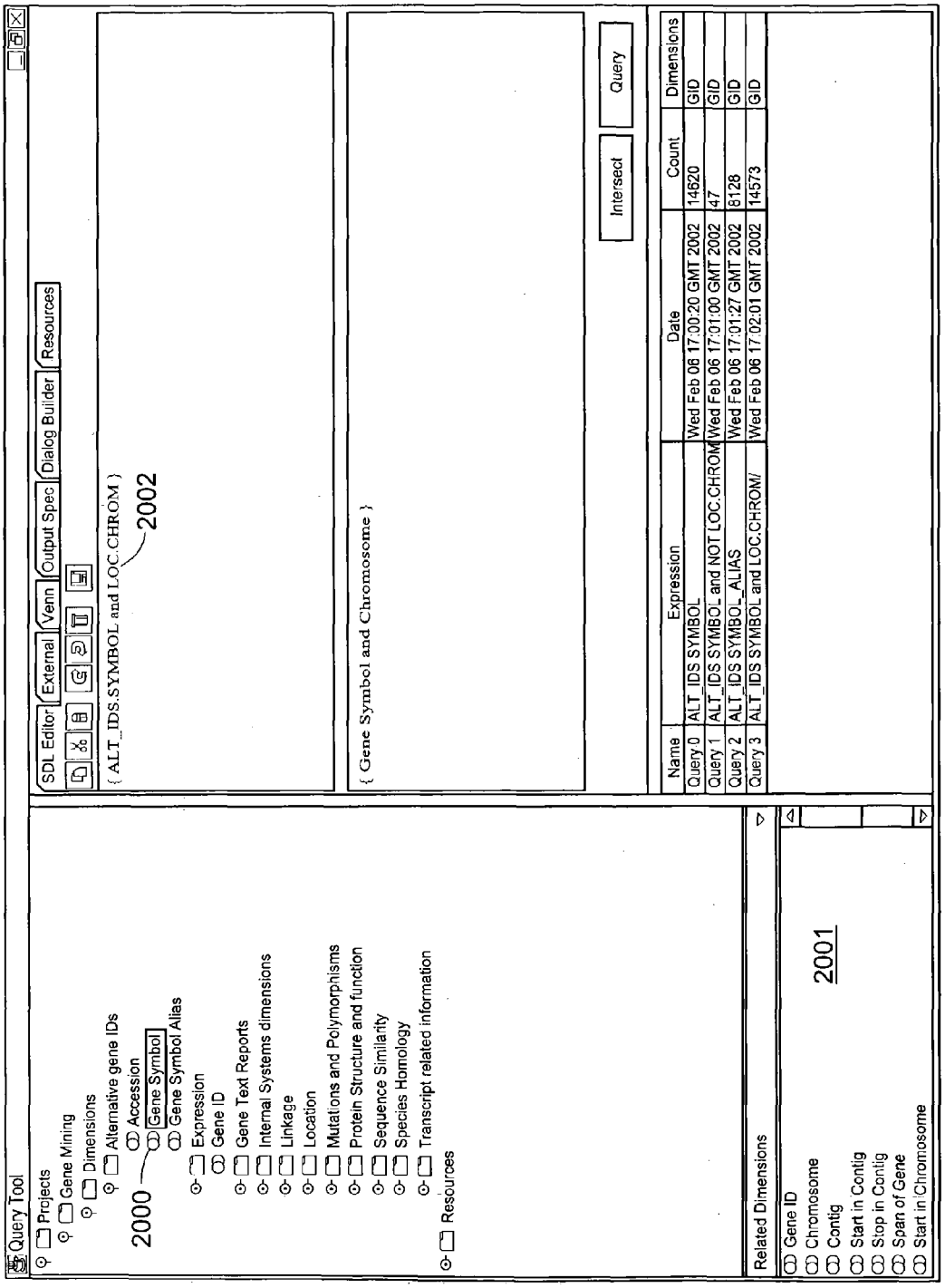

FIG. 21B

Query Tool

- Projects
  - Gene Mining
    - Dimensions
      - Alternative gene IDs
        - Accession
        - Gene Symbol
        - Gene Symbol Alias
      - Expression
      - Gene ID
      - Gene Text Reports
      - Internal Systems dimensions
      - Linkage
      - Location
      - Mutations and Polymorphisms
      - Protein Structure and function
        - Enzyme Reactions
        - Functions
        - GeneOntology
        - Gene Ontology
        - Pathways
        - Interaction
          - Medical Subject Headings
            - Medicine ID
            - Related Gene ID
        - Protein motifs
        - Sequence Similarity
        - Species Homology
        - Transcript related information
- Resources

Related Dimensions
- Gene ID
- Medicine ID
- Mesh String
- Mesh Terms
- Import identifier

---

SDL Editor | External | Venn | Output Spec | Dialog Builder | Resources

PF.GO.TERM = :3673,8150,16265,8219 and PF.INTER.PUB.PGID IN { }

Browse Dimension
- ALT_IDS.ACCESSION - Accession
- POLY_MUT.MRK.ACCESSION - Accession
- PF.PROT.BEST_PROT_ID - Best Match Protein ID
- LOC.CHROM - Chromsome

— 2101

Go Terms = :cell death and Related Gene ID IN { }

Intersect | Query

| Name | Expression | Date | Count | Dimensions |
|---|---|---|---|---|
| Query 0 | ALT_IDS.SYMBOL | Wed Feb 06 17:00:20 GMT 2002 | 14620 | GID |
| Query 1 | ALT_IDS.SYMBOL and NOT LOC.CHROM | Wed Feb 06 17:01:00 GMT 2002 | 47 | GID |
| Query 2 | ALT_IDS.SYMBOL_ALIAS | Wed Feb 06 17:01:27 GMT 2002 | 8128 | GID |
| Query 3 | ALT_IDS.SYMBOL and LOC.CHROM/ | Wed Feb 06 17:02:01 GMT 2002 | 14573 | GID |

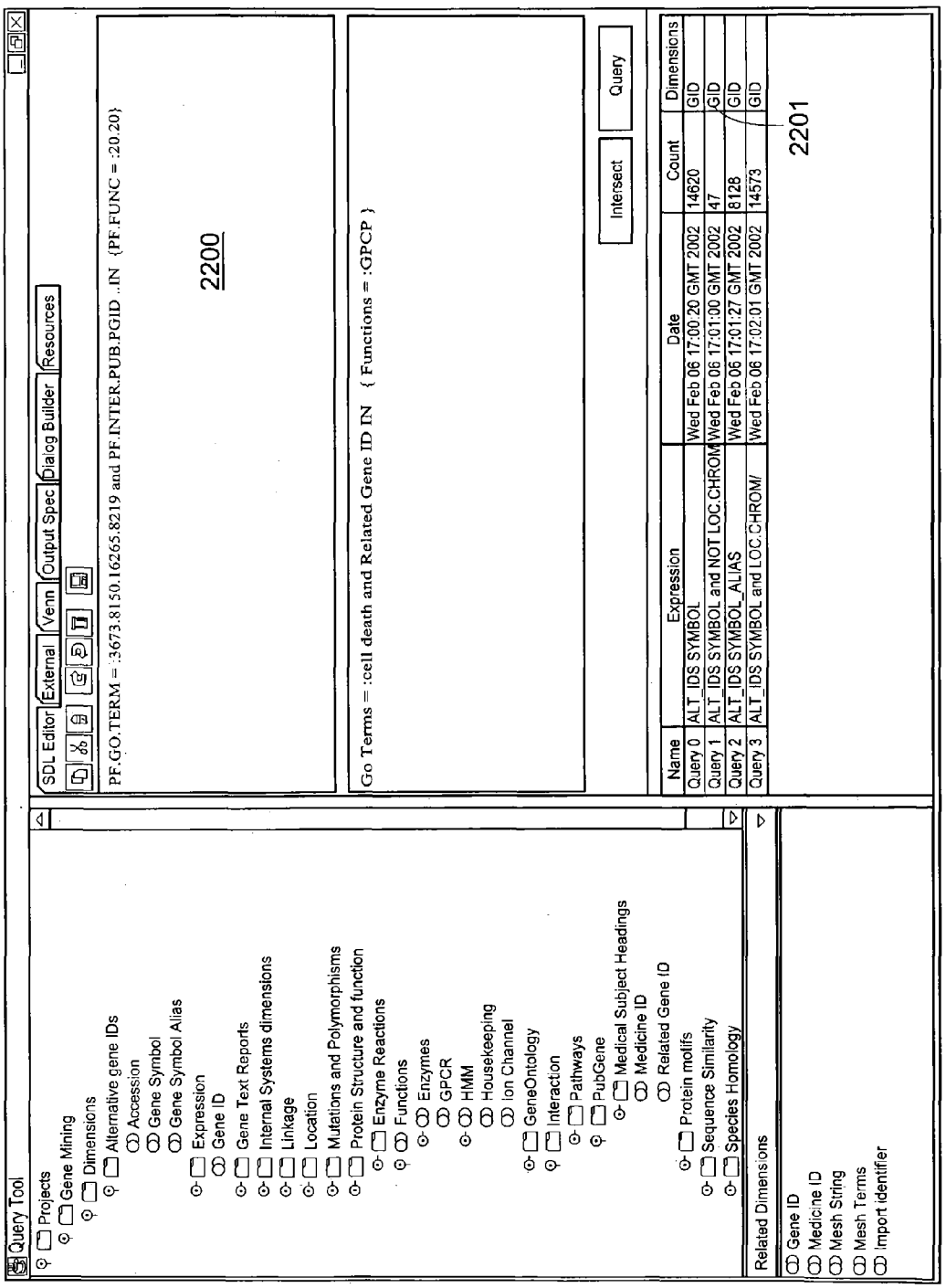

SDL query [58]

(GID | %1)

2302

| GID | TEXT.DESC |
|---|---|
| Hs.101174 | microtubule-associated protein tau |
| Hs.105658 | DNA fragmentation factor, 45 kD, alpha polypeptide |
| Hs.1103 | transforming growth factor, beta 1 |
| Hs.11171 | APG5 (autophagy5, 6, cerevisiae)-like |
| Hs.12409 | somatostatin |
| Hs.128087 | coagulation factor II (thrombin) receptor |
| Hs.1313 | tumor necrosis factor (ligand) superfamily member 8 |
| Hs.133089 | |
| Hs.142255 | islet amyloid polypeptide |
| Hs.146355 | v-abl Aberson murine leukemia viral oncogene homolog 1 |
| Hs.151988 | mitogen-activated protein kinase kinase 5 |
| Hs.159494 | Bruton agammaglobulinemia tyrosine kinase |
| Hs.1613 | adenosine A2a receptor |
| Hs.170917 | prostaglandin E receptor 3 (subtype EP3) |
| Hs.1722 | interleukin 1, alpha |
| Hs.1724 | interleukin 2 receptor, alpha |
| Hs.172894 | BH3 interacting domain death agonist |
| Hs.176090 | PRKC, apoptosis, WT1, regulator |
| Hs.177486 | amyloid beta (A4) precursor protein (protease nexin-II, Alzeimer dise... |
| Hs.180338 | tumor necrosis factor receptor superfamily, member 12 (translocating... |
| Hs.1817 | myeloperoxidase |
| Hs.1846 | tumor protein p53 (Li-Fraumeni syndrome) |
| Hs.2007 | tumor necrosis factor (ligand) superfamily, member 8 |
| Hs.20313 | protein tyrosine kinase 2 beta |
| Hs.21486 | signal transducer and activator of transcription 1, 91kD |
| Hs.225995 | somatostatin receptor 3 |
| Hs.239176 | insulin-like growth factor 1 receptor |
| Hs.239489 | TIA1 cytotoxic granule-associated RNA-binding protein |

58 rows (Total: 750 msec)

Abort

| GID | TEXT.DE8C | COUNT(DISTINCT LINK.DIS |
|---|---|---|
| Hs.101174 | microtubule-associated protein tau | 9 |
| Hs.105658 | DNA fragmentation factor, 45 kD, alpha polyp... | 0 |
| Hs.1103 | transforming growth factor, beta 1 | 4 |
| Hs.11171 | APG5 (autophagy5, 6, cerevislae)-like | 0 |
| Hs.12409 | somatostatin | 8 — 2401 |
| Hs.128087 | coagulation factor II (thrombin receptor | 7 |
| Hs.1313 | tumor necrosis factor (ligand) superfamily m... | 8 |
| Hs.133089 | | 0 |
| Hs.142255 | islet amyold polypeptide | 6 |
| Hs.146355 | v-abl Aberson murine leukemia viral oncogen... | 8 |
| Hs.151988 | mitogen-activated protein kinase kina... | 10 |
| Hs.159494 | Bruton agammaglobulinemiatyrosine kinase | 0 |
| Hs.1613 | adenosine A2a receptor | 6 |
| Hs.170917 | prostaglandin E receptor 3 (subtype EP3) | 10 |
| Hs.1722 | interleukin 1, alpha | 0 |
| Hs.1724 | interleukin 2 receptor, alpha | 0 |
| Hs.172894 | BH3 interacting domain death agonist | 5 |
| Hs.176090 | PRKC, apoptosis, WT1, regulator | 7 |
| Hs.177486 | amyloid beta (A4) precursor protein (protease... | 6 |
| Hs.180338 | tumor necrosis factor receptor superfamily, m... | 9 |
| Hs.1817 | myeloperoxidase | 8 |
| Hs.1846 | tumor protein p53 (Li-Fraumeni syndrome) | 8 |
| Hs.2007 | tumor necrosis factor (ligand) superfamily, m... | 9 |
| Hs.20313 | protein tyrosine kinase 2 beta | 6 |
| Hs.21486 | signal transducer and activator of transcriptio... | 8 |
| Hs.225995 | somatostatin receptor 3 | 6 |
| Hs.239176 | insulin-like growth factor 1 receptor | 4 |
| Hs.239489 | TIA1 cytotoxic granule-associated RNA-bindin... | 8 |

58 rows (Total: 4426 msec)

| PID | DIAGN | CALC |
|---|---|---|
| PID0 | A.04.0 | abc PID0 def |
| PID1 | A.04.1 | abc PID1 def |
| PID2 | A.04.2 | abc PID2 def |
| PID3 | A.04.3 | abc PID3 def |
| PID4 | A.04.4 | abc PID4 def |
| PID5 | A.04.5 | abc PID5 def |
| PID6 | A | | abc PID6 def |
| PID7 | A | Search and Select | abc PID7 def |
| PID8 | A | Applay Selection | abc PID8 def |
| PID9 | | Reset Selection | abc PID9 def |
| | | Invert Selection | |
| | | URL Templates | |

Query Report (10)
Diagnose 10 rows (Total: 1142 msec)

Network Error - Microsoft Internet Explorer provided by deCODE Genetics, Inc

File  Edit  View  Favorites  Tools  Help

Back   Search   Favorites   History

Address  http://www.diagnweb.org/cdi-bin/find_icd?code=A.04.6   2605

This Web provides details on ICD9 Codes.  2604

Abort   Close   Links

METHOD AND SYSTEM FOR DEFINING SETS BY QUERYING RELATIONAL DATA USING A SET DEFINITION LANGUAGE

RELATED APPLICATION(S)

This application is a continuation-in-part of U.S. application Ser. No. 10/356,365, filed Jan. 30, 2003, the entire teachings of which are incorporated herein by reference.

BACKGROUND OF THE INVENTION

1. Field of the Invention

The present invention relates to the usage pattern, commonly found in many software applications, of defining sets of objects based on object attributes. A specifically designed set definition language for defining sets, abbreviated SDL, is described as well as a software system that implements this language efficiently on top of standard relational database management systems (RDBMS).

2. Description of Related Art

Without a doubt, the most common query language is the SQL language that is implemented in most relational database systems (RDBMS). However, although SQL is a very powerful language it is too complex for many users because of its versatile nature and the need for the user to know the underlying data schema. The aim with the invention SDL language is to (i) define a language that is powerful enough to allow users to define sets based on multiple criteria, (ii) define a language that is easy to use, and (iii) define a language that is easier to learn than SQL which does not require the user to know the underlying data schema. The SDL system is invented in the life-science domain, nevertheless, it has a much wider applicability. Similar attempts have been made before in that domain, such as with the health query language (HQL see www.clinical info.co.uk/miquest.htm), where instead of eliminating the need for schema knowledge, the schema was kept fixed, hence allowing for certain simplifications in the language as compared to SQL. Thus, HQL is considered simple enough such that the average medical doctor can use it for epidemiological studies. HQL is however both a language for defining patient sets and calculating statistics on those sets, whereas SDL leaves that task to more standard on-line analytical processing (OLAP) systems.

Systems that aim at providing query capabilities for users while hiding the complexity of formal query languages such as SQL are not new. For instance, tools have been devised to facilitate the generation of SQL queries with a graphical support (GUI), such as by Shaw et.al., "Apparatus and Method for Synthesizing a Query for Accessing a Relational Database", U.S. Pat. No. 4,506,326. Unlike SDL, this system is purely graphical and generates QBE syntax that is then translated into SQL. Other systems of similar nature, such as Business-Objects (BO), see Cambot and Liautaud, "Relational Database Access System Using Semantically Dynamic Objects", U.S. Pat. No. 5,555,403, have been made to hide the SQL and the database schemas from the users. Like the system mentioned previously, BO does not have its own language and is as such GUI based. However, in addition to the former system it also provides an abstraction on top of the SQL metadata, the so-called business objects and rules for building database joins, given a list of such objects in a report. Database abstraction of this nature goes further back. In the work of El-Sharkawi et.al. "Architecture and Implementation of ENLI: Example-Based Natural Language Assisted Interface" Proc. of PARBASE-90, Miami, Fla., Mar. 6–9, 1990, pp.430–432, the authors use an English sentence to describe the meaning of each database attribute to build an English-schema. Their English-like query language is then translated into QBE before it is mapped to SQL. Other systems of similar nature are knowledge based visual query systems that map a knowledge base onto a relational database system. A paper by K. L. Siau et.al., "Visual Knowledge Query Language as a Front-End to Relational Systems," Proceedings of the 15th Annual International Computer Software and Applications Conference, 1991, pp. 373–378, Tokyo: IEEE Computer Society Press, describes a knowledge abstraction based on an enhanced entity-relationship model (EER). The system they present is a GUI-based application that uses an EER-based knowledge schema and a visual knowledge query language (VKQL) that is mapped to SQL for query evaluation.

Although the invention SDL system shares some aspects with the above systems, there are also clear distinctions. First, the SDL system is based on a new language as well as novel definitions of virtual relations and dimension attributes. A new and unique feature of a set-output-dimension enables implicit relational equi-joins and a very sparse and intuitive syntax. Thus in the present invention the SDL dimensions, the virtual relations and the SDL language define the relational algebraic constraints, as compared for instance to BO where the join-rules for objects are defined in explicit metadata. Also, the BO system is purely GUI based whereas the invention SDL system is centered on the SDL language. The SDL query tools use English descriptions for dimensions, i.e. a metadata on the dimensions. The descriptions are not part of the SDL language, however, they can provide a more user-friendly, English-like feeling for the SDL expression, as well as an easier view on the dimension metadata. Note that the dimensions can also have very descriptive names as long as there is no naming conflict. This can however result in longer SDL expressions. A major difference in the present invention SDL system from all of the above systems is its focus on sets and its approach for defining the sets. In the SDL language, a set is defined without any connection to the view that is used to present the elements in the set. These set views can be textual reports or graphical in nature. Finally, the SDL language is very true to its relational origin and can therefore be integrated with the SQL language, as shown in the present invention, thereby generating a new language that Applicants refer to here as SSDL.

Another language or protocol with similar aim as the invention SDL is the lightweight directory access protocol (LDAP), see S. Shi, E. Stokes, D. Byrne, C. Corn, D. Bachmann, and T. Jones, "An enterprise directory solution with DB2", IBM Systems Journal, 39(2): 360–383, 2000. Common to them is the set definition pattern, however, LDAP uses very different syntax than SDL aimed at application programmers and unlike SDL, LDAP also provides access control methods to its data. Also, their data structures implementation, i.e. their approach for storing data with arbitrary attributes in a RDBMS is very different from the one presented in this invention. Implementation with data structures that are closer to the one presented here for SDL, although for strikingly different languages such as Smalltalk, can be found in work by B. Czejdo et.al., "Integration of Database Systems and Smalltalk", in Proceedings of Symposium on Applied Computing, Kansas City, 1991. Recently there has also been a large effort in defining XML query languages and work to map them into SQL. See Florescu, D. and D. Kossman, "A Performance Evaluation of Alternative Mapping Schemes for Storing XML Data in a Relational Database", Technical Report, INRIA, France, May 1999 or F. Tian et.al. "The Design and Performance Evaluation of Alternative XML Storage Strategies", ACM Sigmod Record, vol. 31(1), 2002 Some of the storage strategies described in the above references are similar to the one used in the present invention, however, SDL is significantly different from all these languages.

There are certain features in the SDL language, such as primary and virtual dimensions, that have some correspondence to object oriented techniques (see R.G.G. Cattell, "Object Data Management: Object-Oriented and Extended Relational Database Systems", 1994, Addison Wesley Publishing Company, Inc.). In object schemas that utilize composition or aggregation, it is a common technique in object-oriented languages to de-reference references with path expressions (cascaded dot notation). Object aggregation is also referred to as implicit joins, for reasons that become obvious by reading the discussion on virtual relations. However, these implicit joins are not what Applicants refer to as implicit joins in the present invention. In these teachings, implicit join refers to the equi-join constraint that is generated based on the output-dimension in SDL set definitions. Although related, this is different from the implicit join that results from path expressions.

A relatively recent comparison of relational query languages (RQL) and object query languages (OQL) by Brown, S. A., "The Semantics of Database Query Languages", PhD dissertation, University of Sheffield, UK, 1999, points out important semantic differences between OQL and RQL in "grouped" queries. Although SDL has some resemblance with OQL (virtual dimensions), it is strictly connected to the relational model and mathematical aggregate operators behave identical in SDL as SQL. SDL is thus closer to object-relational extensions of SQL (SQL3). For the equivalence of the output-dimension in SDL, both SQL and OQL require the definition of a cursor, thus those languages don't support implicit join, in the meaning of the word in the present invention, although they support de-referencing and path expressions.

Another technical point that emphasizes the difference between SDL and OQL/SQL is that in SDL multiple virtual dimensions can be combined in a record-operator, thus constraints on multiple attributes is possible in SDL even though "path expressions" are used. It is impossible to use path expressions in OQL/SQL to refer to multiple attributes simultaneously without introducing an intermediate cursor or the use of succinct notation (see M. Stonebraker. "Object-relational DBMSs: the next great wave", Morgan Kaufmann Publishers, Inc. 1996).

Accordingly, there are other differences between SDL and both OQL and SQL, both in terms of their language structure as well as the underlying data models.

SUMMARY OF THE INVENTION

It is an object of the present invention to provide a simple and efficient method for defining sets of objects, where the information on the objects is represented as relational data. For this attempt, the present invention defines a new set definition language, abbreviated SDL, and a system that creates sets of objects by evaluating statements written according to the SDL syntax. An important feature of the SDL language is that it results in very short expressions due to its unique nature of implicit constraints. It is a further objective of this invention to describe an implementation that is efficient with regard to statement execution time, easily integrated with most existing relational data stored in legacy databases and does not suffer from maintenance problems related to data schema evolution.

To achieve these objectives, the present invention provides a novel way of representing multiple and continuously evolving relations. Each registered relation is defined in terms of high level dimensions and each dimension is an instance of a data domain. The use of the term dimension is common in OLAP systems where a single hyper cube is defined by facts and two or more dimensions. Applicants extend the usage of dimensions by allowing a dimension to exist in more than one relation, each of which can be thought of as a hyper cube. This is a very important step in order to enable enforcement of the implicit constraints across relations. In addition, Applicants use domains to extend conventional data types such that they can represent higher-level logical types such as weight and height. This approach has the side benefit of enforcing higher-level type checking and it allows data stored in relational database tables, data that was not originally intended for the SDL system, to be registered with the SDL such that it can be used in set definitions.

Furthermore, Applicants show a systematic approach for mapping the SDL statements to corresponding SQL statements based on a schema model. In addition, the present invention provides methods for rewriting an SDL expression in such a manner that the SDL expression can be translated into SQL statements that have efficient implementation, i.e. statements that allow for optimization within most SQL optimizers.

In a preferred embodiment, a computer method and apparatus for defining sets of data to be retrieved from a data store (e.g., database) comprise: an input component for providing a written representation of a desired data set in terms of dimensions and relation instances, the desired data set having a certain set type; and an assembly coupled to receive the written representation. In response to the written representation, the assembly implies constraints on relation instances or dimensions by the set type of the desired data set and/or a record operator. This implying of constraints enables length of the written representation to be minimized.

The written representation may include any combination of a disjunctive expression and a conjunctive expression. The assembly thus performs OR-distribution on disjunctive expressions and eliminates from disjunctive expressions, conjuncts with undefined binding variables. The assembly translates conjunctive expressions to respective SQL join terms and translates disjunctive expressions to respective SQL-union terms. Further, the assembly rewrites the disjunctive and/or conjunctive expressions such that the SQL union operator is applied after the SQL join terms are calculated. This results in a computationally faster implementation.

In accordance with one aspect of the present invention, the assembly automatically enforces a record-operator where an expression in the written representation without the record-operator is equivalent to the expression with the record-operator or based on information on data structures of dimensions.

In accordance with another aspect, the written representation may include an IN-statement and a disjunctive expression in a nested set. In that case, the assembly can apply OR-distribution within the nested set by treating the IN-statement effectively as a record-operator expression.

In one embodiment the data store has a native query engine. In turn, the assembly further translates the written representation into code for the native query engine in a manner such that the code is optimized for querying the data store.

In one embodiment, the written representation utilizes a certain symbol, such as a colon, to specify hierarchical constraints on dimensions.

The written representation may include any combination of AND and OR expressions. In response, the assembly optionally performs OR-distribution in a manner that results in expressions with different sets of dimensions (dimension fingerprint). That is, if the conjuncts (AND expressions) inside a subject written representation have different sets of dimensions, the written representation is separated into multiple working expressions.

In accordance with another aspect, the assembly groups expressions from the written representation based on record operator constraint.

The written representation may include aggregate operators in expressions. Then assembly automatically introduces an implicit grouping based on the output-dimension and places constraints based on the aggregates into a HAVING clause in SQL.

The present invention defines syntactic gates that allow SDL to be combined with SQL, thereby allowing bidirectional inlining of the two languages. Another important step to achieve this is to introduce operators to map the SDL metadata to the SQL metadata, e.g. table names and column names. In one embodiment the assembly uses a double-recursive pass-through approach for compiling statements that include both SQL and SDL, thereby ignoring most of the complexity associated with maintaining a formal SQL parser.

In one embodiment, the input component includes (i) an editor for composing written representations and (ii) a search engine for enabling user browsing of metadata, dimension values and relations of the data store. The search engine assists a user in composing desired written representations. In particular, the search engine provides graphical views of dimension hierarchies for user browsing. Further, the editor employs a user interface that supports drag and drop of dimensions and relation values in written representations being composed. Another aspect of the editor is to provide a syntactic and semantic feedback, based on the SDL syntax and the available domain definitions. Yet another aspect of the editor is to provide a descriptive representation of the SDL expression based metadata descriptions of the dimensions and the domain values.

In accordance with another aspect, the assembly enables virtual dimensions and corresponding virtual relations to be defined based on domains primary dimensions. Virtual dimensions minimize metadata maintenance and allow attributes from different objects to be used together in an intuitive fashion, thereby hiding joins from the user. The search engine for browsing the metadata also utilizes information on primary dimensions for nested dimension drilling and thereby supports the generation of virtual dimensions in a drag-and-drop fashion. Alternatively, it also supports the construction of nested SDL queries with nested dimension drilling.

In one embodiment, the input component includes a dialog builder that constructs dialogs that can issue SDL queries with dimension attributes defined by the users in a drag-and-drop fashion. The dialogs have built in logic such that they generate an SDL expression based on only the dimension attributes that are used by the user. Thus the SDL generation mechanism of the dialogs eliminates unknown dimensions from the SDL expression.

Finally, the preferred embodiment presents two mechanisms to federate SDL systems, namely, static federation and dynamic federation. For query evaluation performance the system relies on a federated RDBMS optimizer (see L. M. Haas, et.al., "Data Integration through Database Federation", IBM Systems Journal Vol. 41(4), 2002), however, the assembly provides a mechanism to map dimension names with prefixes as well as a mechanism to define dimension aliases. Thus metadata from multiple SDL systems can be combined in a relatively simple manner. A more unique federation mechanism in the present invention is the dynamic federation. This approach relies on the same metadata transformations, however, each user session can have different metadata composition from multiple metadata schemas specified at runtime. With dynamic federation, user and session dependent application data can be combined in SDL queries with other global server based data.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 4 is an illustration of how the SDL meta-data tables would represent the scenario in FIG. 3.

FIG. 6 is an example of data denormalization and corresponding metadata.

FIG. 9 is a simplified diagram that describes the process for translating disjunctive and conjunctive expressions.

FIGS. 19A and B are a composite data explorer and query composer.

FIGS. 23A and B illustrate output-specification for a report on the sets.

FIGS. 24A and B illustrate further the output-specification of FIG. 23.

FIGS. 26A and B illustrate URL templates in SDL reports

DETAILED DESCRIPTION OF THE INVENTION

The following description of the preferred embodiment is to be understood as only one of many possible embodiments allowed by the scope of the present invention. Reference is made to the accompanying figures that form a part hereof.

Overview

A complete SDL system setup is a combination of client and server modules that can be utilized to build software applications that allow users to evaluate arbitrary SDL queries in an easy manner. The SDL invention described here covers both the server part of the system as well as the software components to facilitate the creation of SDL queries, either with a specific SDL editor or through specialized SDL query dialogs. Applicants also briefly describe utilities for importing data and for the maintenance of the SDL meta-data.

In order to understand the importance of a simple, yet powerful set definition language, consider the case where a computer user is searching for files in the operating system that have some properties. Although not thought of as such by most users, this use case is an example of a pattern where a user is defining a set of objects, e.g. files. Also, consider the scenarios where a user needs to define sets of affected individuals, for genetic linkage analysis, based on medical events such as diagnosis, treatments and measurements. Also, consider the selection of a set of genes that have certain properties represented with attributes associated to them. Yet another example could be the selection of genetic markers to be used for genetic analysis or the selection of archived linkage runs, stored in a database with relevant search attributes associated to them. All these use cases are examples of where the definition of a "set" is in common.

A very important design objective with the SDL language was to create a language that could be implemented efficiently, both with respect to query response time and data volumes. Indeed, the preferred embodiment of the SDL query system is implemented in such a way that SDL statements are parsed and translated into SQL statements and evaluated in a RDBMS. Not only does this simplify the SDL compilation and evaluation logic, but also it allows one to utilize the enormous effort that has gone into optimizing queries and the manipulation of large data volumes in RDBMS. Similar approaches have been used before in other language implementations, e.g. in LDAP and XML query language applications.

Figure 1:
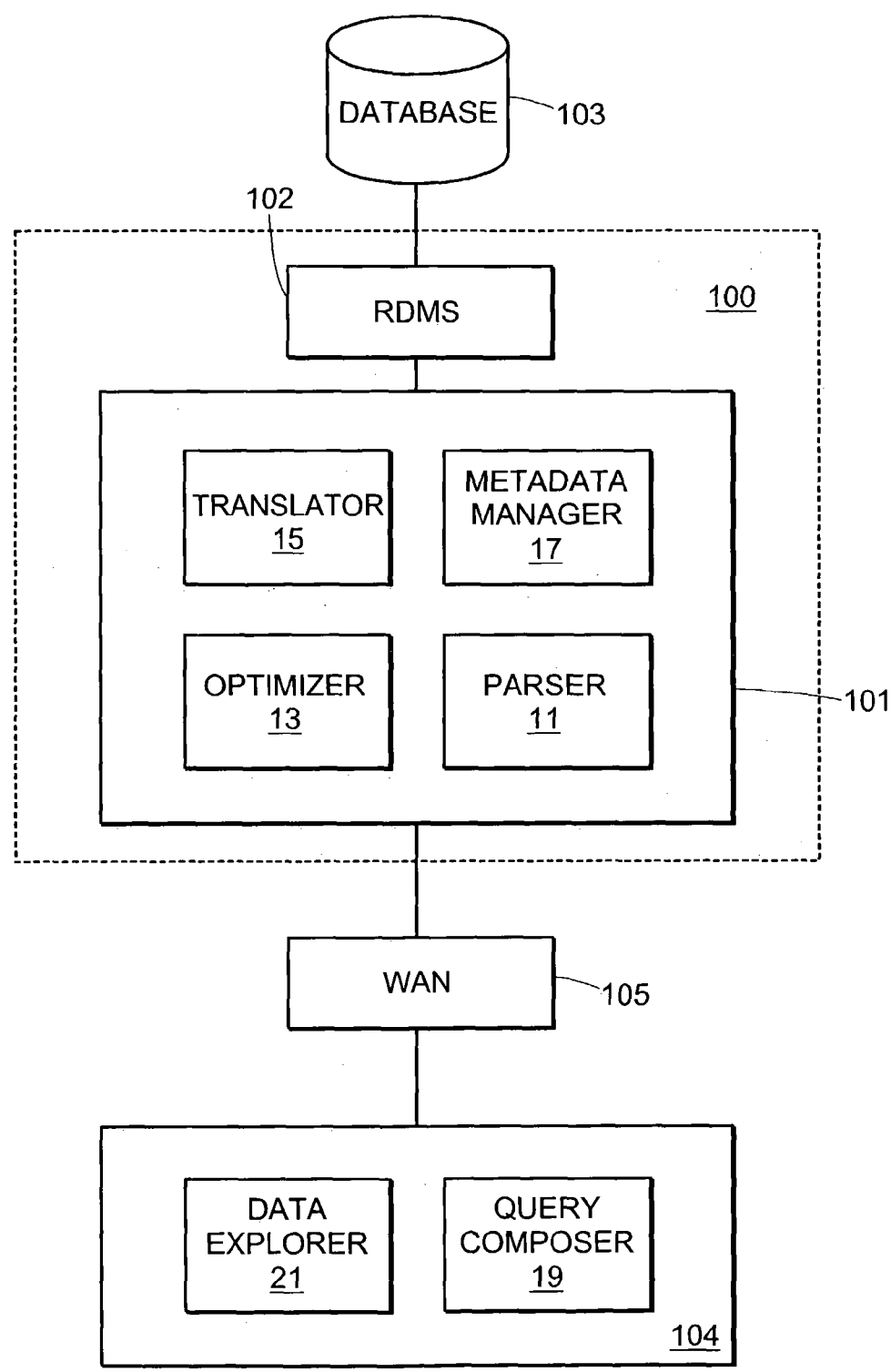
FIG. 1 is a block diagram illustrating an exemplary setup required to implement the preferred embodiment of the present invention. As shown, the system consists of hard disks, a computer with RDBMS, a computer with the SDL server system, and a computer running the SDL client modules.

As shown in FIG. 1, The SDL server system 100 consists of several components 101. In the preferred embodiment the components 101 include a parser 11, optimizer 13, translator 15 (preferably SDL2SQL translator), evaluator and data and meta-data modules 17. In the preferred embodiment, the SDL server is also comprised of an RDBMS (Related Database Management System) 102 and hard disks 103 for the storage of the data. It is a matter of configuration whether RDBMS 102 and components 101 reside in the same computer or whether they are kept on different computers. The server 100 is then connected to an SDL client 104 through a wide area or similar network 105. The client 104 can either be an application specifically designed for SDL or a SDL query component bundled into a host application. Generally client 104 is formed of a query composer 19 and a search engine 21 of sorts.

The rest of the text describes the nature of the SDL language, logical constructs such as dimensions and domains, relational schemas as well as mapping of the language to the SQL language as well as bidirectional integration of SDL with SQL. Further, later described are special SDL query tools that facilitate the construction of SDL expressions.

Introduction to SDL

The best way to understand the SDL language is by taking many short examples. Along the way Applicants introduce the concepts necessary for understanding the composition of a general SDL query. A general SDL query declaration looks almost like the way sets are defined with standard mathematical notation:

$$\text{setname} = \{\text{output dimension} | \text{SDL expression}\}$$

Where, "setname" is the name of the set that is being defined and "SDL expression" is an expression of first order logic that has to be true for every element in the set. The set is defined over the output dimension. The SDL language is in many ways similar to relational calculus (see R. Ramakrishnan and J. Gehrke, "Database Management Systems," 2nd ed., McGraw Hill, 2000), especially domain relational calculus (DRC). Both of these languages are for instance unsafe as defined by Ramakrishnan and Gehrke. The main difference is that in the SDL language, dimensions are used as compared to domain variables in DRC. Therefore referrals to relations in SDL are unnecessary. Also, in SDL the output dimension is always implicit in the SDL expression, i.e. other dimensions have to appear in relations with the output dimension and a natural join on the output dimension is implemented behind the scenes. This results in very sparse expressions that are easily human readable. Typically the output dimension is an identifier of some objects that can then later be used to retrieve additional information on those objects that were in the set that was being defined.

Figure 2:
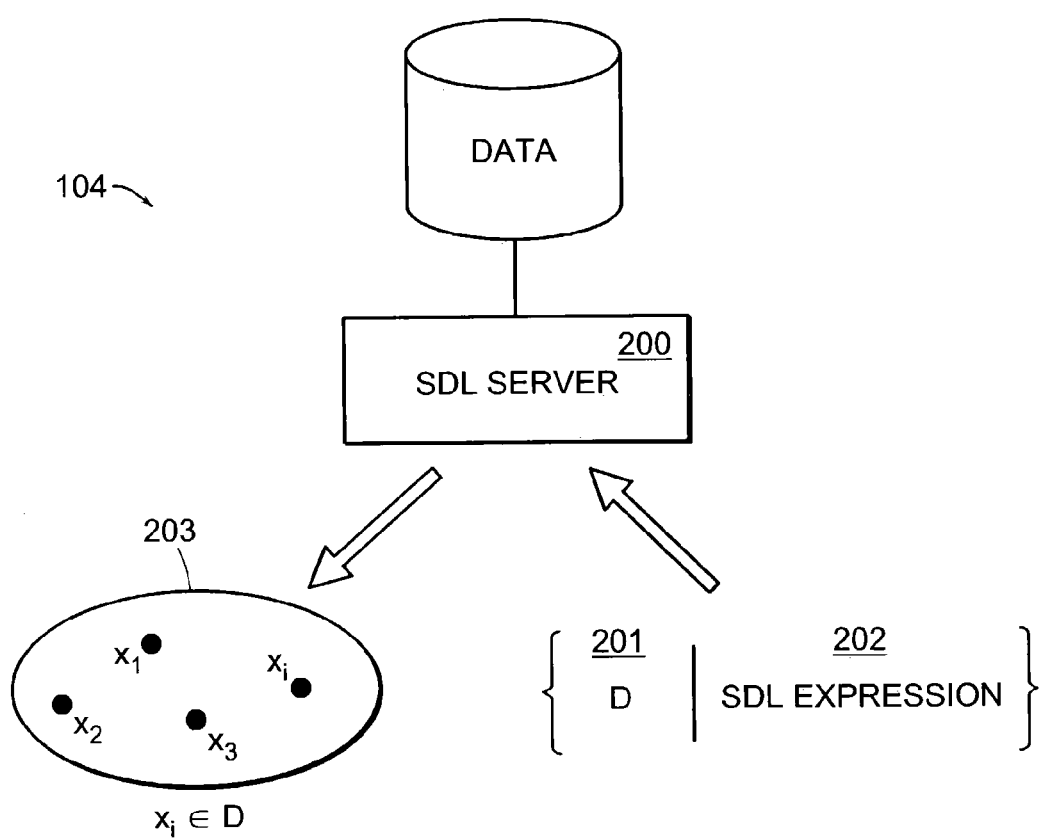
FIG. 2 is a block diagram illustrating how the SDL server takes a set definition as an input and returns as output the elements that belong to the defined set.

FIG. 2 shows how an SDL statement is sent to an SDL server 200 from client 104. The statement is comprised of the output-dimension D 201 and an SDL expression 202. The server 200 returns a set 203 with elements $x_i$ from the output-dimension (i.e., $x_i \in D$). For each element $x_i$ there must exist relation instances in the data with the output-dimension D and other dimensions referred to in input expression 202 such that the expression in 202 is true for each element $x_i$ in the output set 203.

An example that brings this into clinical context is the following:

patients={pid|dob>1966 AND [diag:icd9.stroke AND date>2000]}

Here, patients become the set of all personal identification numbers (pid) of individuals who were born after 1966 and have been diagnosed with a stroke after the year 2000. The proper way to read this example set definition is that "patients defines the set of all individuals for which there exists a date of birth attribute larger than 1966 and for which there exists a data record/relation with the attributes diag: icd9.stroke and a date larger than 2000." In addition to the output dimension of pid, the dimensions that appear in this definition are dob, diag and date. Note the use of the colon in "diag:icd9.stroke" which is equivalent to "diag=: icd9.stroke." This syntax is allowed for dimensions such as diag that are of a domain type that is enumerable and has a hierarchy associated with it. For such dimensions, this is a short hand notation for the SQL constraint "diag LIKE'icd9.stroke. %' OR diag='icd9.stroke' ", i.e. all diagnoses that are children or lower level elements in the corresponding diagnostic code hierarchy. The square brackets denote the socalled record operator, used to enforce the co existence of one or more attributes in the same record/relation. Since the same individual can have multiple diagnoses it is not uncommon to record them in relation with a date. However, certain attributes, such as date of birth, are each a singleton by nature and therefore typically only registered once per individual.

Another SDL expression example from the biology field is as follows:

target genes={gene id|geneclass:gpcr AND

[expr.tissue:brain; $x=expr.level] AND

[expr.tissue:stomach AND 1.5*expr.level<$x]}

Based on this definition, the set "target-genes" will contain all gene ids of GPCRs that are expressed 50% more in brain tissue than in stomach tissue. Note the use of binding variables within the record expressions to enforce the expression level in some brain tissue to be 50% higher than any expression level in stomach tissue. One sees that the output dimension, i.e. the identifier of the elements that represent the sets, does not appear in the SDL expression itself. Once the set type has been specified, it is implicit in the SDL expression that all of the other dimensions used refer to attributes associated with the output dimension. This is one of the unique features of the SDL syntax and results in very short expressions. In the first example, the existence of the relations (pid, dob) and (pid, diag, date) is assumed, and in the second example the existence of relations (gene-id, class) and (gene-id, expr.tissue, expr.level) is assumed.

The SDL system can be configured in such a manner that the output dimension has been preset, i.e. the SDL server 100, 200 returns only a single type of set, for instance sets of individuals, genes, markers etc. Thus, the user usually only has to create the "SDL expression" part itself, and does not have to specify the "output dimension" and the curly brackets in the SDL query; and the SDL query tool will generate an output set of the appropriate type. However, an SDL system can also be set up in such a manner that it allows definition of various types of objects. Furthermore, it is within the purview of those skilled in the field to extend the invention language (SDL) in such a manner that it allows the definition of relation with multiple output dimensions. In this embodiment however, the applicants choose to integrate SDL with SQL for working with output data of relations as explained in later sections.

Domains, Dimensions and Relations

Without going into a formal syntax specification, Applicants next briefly consider the structure of a general SDL expression. Without a loss of generality, assume an SDL system 100 (FIG. 1) is configured to generate sets of individuals (pid s) based on longitudinal medical event data registered on those individuals. The general format of patient data imported into the SDL system 100 is therefore of the following relational form:

relation=(output dim, dim1, . . . , dimN)=(pid, A1, . . . , An)

For data to be directly applicable to set definition in SDL, the output dimension has to appear in the data relations (here it is pid). The other elements (representing respective columns in a data store 103) that appear in the relation statement and represent one or more attributes associated with an individual, have to be of pre specified dimensions. Thus, dimensions can be considered as attributes or terms associated with individuals through data relations. If data is normalized in such a way that the output dimension is not present, it can still be used through the use of nested sets. Nested sets and the registration of normalized data are discussed later in more detail.

For each dimension, a domain has to be specified. Not only does the domain specify the data type used to represent its corresponding dimensions in the RDBMS 102, but it also specifies the logical content and constraints associated with its corresponding dimensions. For instance, the domain may specify whether the corresponding dimension is "closed" (enumerable) or "open" and whether there are maximum and minimum limitations. As an example, consider attributes such as weight and height. Both are naturally represented by a NUMBER, however, their values represent totally different physical measures. Therefore, two separate domains should be used to represent values of weight and height, and two dimensions from the different domains should not be comparable. Hence, the domains can be used to enforce strict type checking. As another example consider the dimensions "date of birth" and "date of death". Although these dimensions represent two different attributes, they have still the same logical type and are therefore naturally two instances of the same domain, i.e. date. In summary, dimensions represent attributes that are instances of a certain domain, and dimensions that are instances of the same domains are comparable. When a domain is defined as closed, its values (corresponding dimensions) can optionally be organized into a hierarchy (DAG, parent child relationship).

Dimensions must have distinct names. Their names can be organized in a hierarchical manner (folders) such that the path name represents the distinct name of the dimension. In such case, they are typically placed in the hierarchy based on their logical meaning. A GUI metadata browser that shows the available dimensions to a user would then typically show the dimensions listed in a tree based on their names. However, the names of the dimensions do not have to reflect their position in the tree of the metadata browser and the same dimension could even appear in multiple locations. As a systematic approach, in order to register a relational schema with multiple tables into the SDL system 100, the dimensions could be named following the format "table_name.domain". However, dimensions that represent ids (identifiers) of objects that are supposed to be in the SDL sets have to map with the same name for each table.

Figure 3:
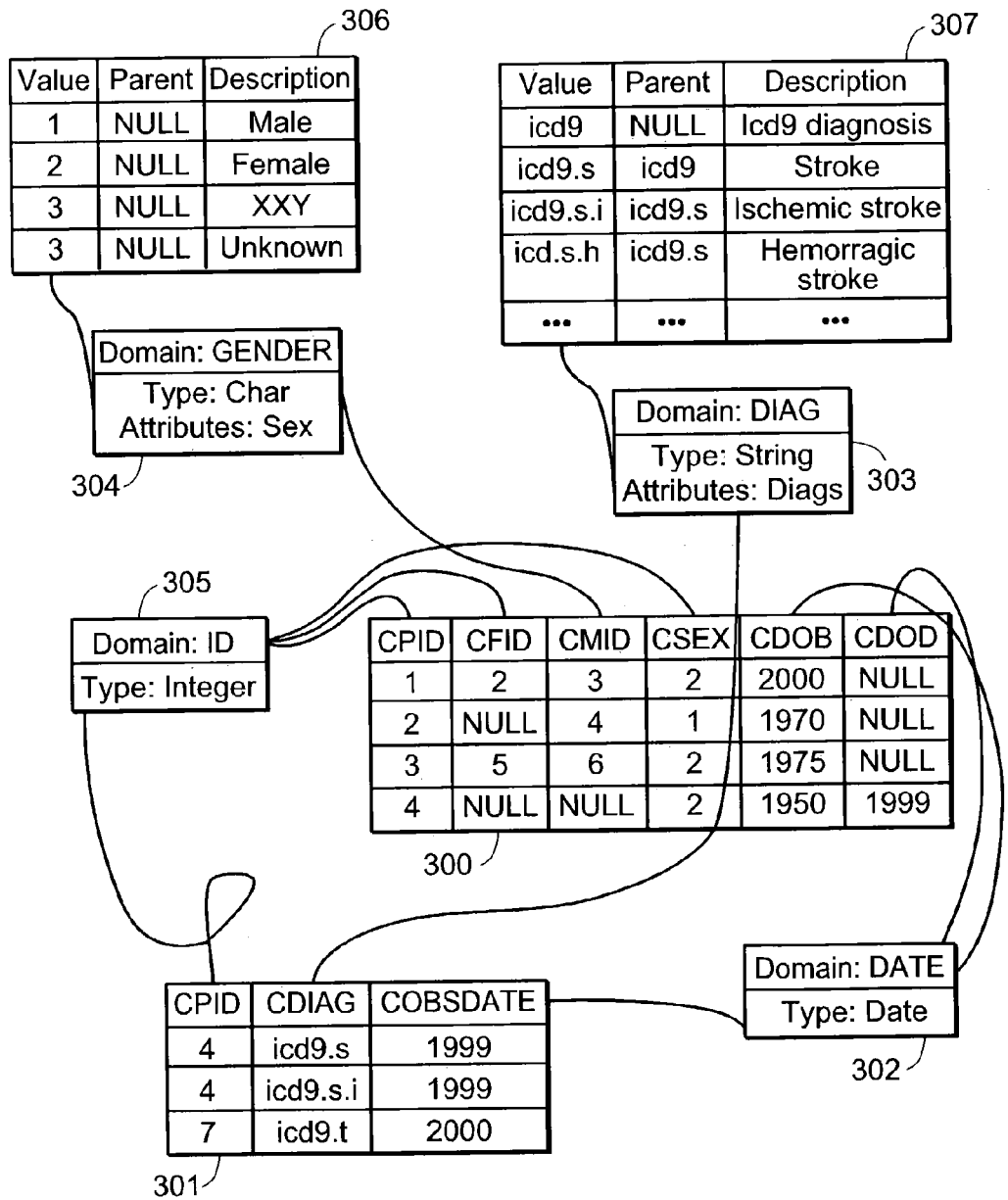
FIG. 3 is an example showing two relations with dimensions and their corresponding domains. For the enumerable domains GENDER and DATE, their corresponding attribute tables are shown. The values in the DATE domain have a hierarchy structure.

FIG. 3 shows an example of two relations, 300 and 301, and four different domains, 303, 304, 305 and 302. Relation 300 has six dimensions, namely CPID, CFID, CMID, CSEX, CDOB and CDOD. Relation 301 has three dimensions—CPID, CDIAG and COBS DATE. Two of the domains 303, 304 (diagnosis and gender, respectively) in this example are enumerable and therefore have associated with them tables 306, 307 that list the possible values in the domains, 304 and 303. Diagnosis Domain 303 table 307 has a hierarchical nature, however, gender domain 304 table 306 is a special case of a flat diagnosis hierarchy. The other domains, identifier domain 305 and date domain 302, are open domains that do not have tables that list the possible values associated with them. Both relations 300 and 301 have the dimension PID (in column CPID). Also, relation 300 has three different dimensions (CPID, CFID and CMID) that belong to the same domain, i.e. Identifier Domain 305.

Tables and Metadata

Available relations in an SDL repository are completely defined by the data that has been imported or registered with the system. A relation is very much like an SQL database table but the columns do not bear names as such, rather each column is bound to a specific dimension. Each dimension may appear in an arbitrary number of relations. The dimension may be thought of as a super column able to span an arbitrary lumber of tables. The SDL language defines sets of objects that depend on the output dimension in the set definition based on relations registered with the SDL system 100. The SDL language neither specifies how expressions are evaluated nor the storage mechanism for the relations. When RDBMS 102 (FIG. 1) is used for the embodiment of the system, two extreme data schemas can be used for the storage of relations. Both of these schemes set no limits to the number of relations allowed. One approach is the so-called horizontal structure, i.e. a large table with sufficient number of columns to store all the combinations of dimensions that can coexist together. The other extreme alternative is the vertical representation or a fully pivoted storage format (see R. Agrawal et al., "Storage and Querying of E-Commerce Data," Proceedings of the 27th VLDB Conference, Rome Italy, 2001) that has recently been proposed as a storage mechanism for data where there are very many different logical relations. In the vertical schema, all relations are put into a single table that has only three columns, i.e. rowid, dimension, and value.

Other alternatives have also been proposed for schemas that are allowed to evolve, such as to store the relations in multiple 2 ary tables (see S. Shi et al, "An enterprise directory solution with DB2", IBM Systems Journal, 39(2): 360 383, 2000; M. Missikoff, "A domain based internal schema for relational database machines", In Proceedings of the 1982 ACM SIGMOD International Conference on Management of Data, Orlando, Fla., Jun. 2 4, 1982, pg. 215 224; G. P. Copeland and S. N. Khoshafian, "A decomposition storage model", In Proceedings of the 1985 ACM SIGMOD International Conference on Management of Data, Austin, Tex., May 28 31, 1985, pg. 268 279; and S. Khoshafian et al., "A query processing strategy for the decomposed storage model", In Proceedings of the Third International Conference on Data Engineering, Feb. 3 5, 1987, Los Angeles, Calif., USA, pg. 636 643).

The present invention proposes a new alternative that is closer to regular relational schemas used in most RDBMS. Applicants' approach is to store information on all the dimensions that have been defined in the system 100, their domain and the relations they exist in. The preferred embodiment defines the following metadata tables (at 17 in FIG. 1) to store information on domains, dimensions and relations:

domains(domain, SQLtype, SQLattributehierarchy)
dim2dom(dimension, domain)
relations(relation, SQLrelation, inclusion_criteria)
dim2rel(dimension, relation, column_name, multiplicity)

These four SQL tables define a basic metadata structure for the invention SDL server system 100. One embodiment omits data types on the columns in these tables and effectively assumes column contents to be strings (e.g. VARCHAR2 in Oracle RDBMS).

The table named "domains" stores a domain name and the SQL data type used for columns belonging to dimensions defined on its domain. For domains that are enumerable and closed, it also stores reference to a table listing all the allowed values in a hierarchical manner (the hierarchy can also be flat). Optionally, minimum and maximum values can be used to specify an allowed range for open domains.

The table "dim2dom" stores indications of the connections between dimensions and their corresponding domain. The table named "relations" indicates connections between SDL relation and corresponding SQL structure for representing that relation. The SQL structure can either be a table, view or materialized view. For each relation, an inclusion criteria can be specified, i.e. a condition on the selected dimensions that needs to be met for the table to be included into the SQL code (see the following discussion). Formally, Applicants' use of relation is more like a set of relation instances since the same SDL relation can exist in more than one SQL relation. This will become clearer later.

Finally, the table "dim2rel" indicates the connection between the dimensions and the relations (set of relation instances) and indicates the column used to store the dimension in the corresponding table. The last column stores information on whether duplicates are allowed in the dimension in the corresponding relation.

FIG. 4 shows how the meta-data tables 17 mentioned above, would be instantiated for the example relations 301, 302 of FIG. 3. In that example, domains table 400 specifies the four domains (Diagnosis 303, gender 304, date 302 and identifier 305) and their respective SQL type (string, character, date, integer, respectfully). Domains table 400 makes reference (Tdiags, Tsex) to enumeration tables 306, 307 for the closed domains 303, 304 and indicates maximum and/or minimum values for the open domains 302, 305. Dim2dom table 401 indicates the domain. As further explained below, Table 403 shows dimensions cross-referenced to relations (dim2rel) and Table 402 provides correspondence between an SDL relation and a respective SQL structure.

Referring back to FIG. 1, the SDL server 100 uses its metadata tables (collectively illustrated at 17) to parse (at parser 11) an SDL expression and translate it (via translator 15) into a corresponding SQL statement that refers to the appropriate tables that are needed for proper evaluation of the subject expression. This is best explained through a short example.

Consider the following SDL expression: {d0|d1=2}. Here d0 is the output dimension and the constraint is set on dimension d1. This expression should return all values of d0 that exist in relation with d1 where d1=2. Expressed in relational algebra, the following is equivalent:

{d0|d1=2}=$\pi_{d0}((d0,d1)))$

To evaluate this expression, the invention SDL system 100 uses the table dim2rel (like 403 of FIG. 4) to look up all relations that contain the dimensions d0 and all the relations that contain the dimension d1. Two sets of relations result, i.e., one for each of d0 and d1. Next the invention SDL system 100 takes the intersection of these two sets of relations. The set resulting from the intersection can contain one or more relation name. The system 100 then creates a virtual relation that is a projection of the two dimensions in the union of all the relations it found with the intersection operation (i.e. union of sets of relations instances). This virtual relation is denoted "v01", the numbers representing the dimensions that exist in it.

Figure 5:
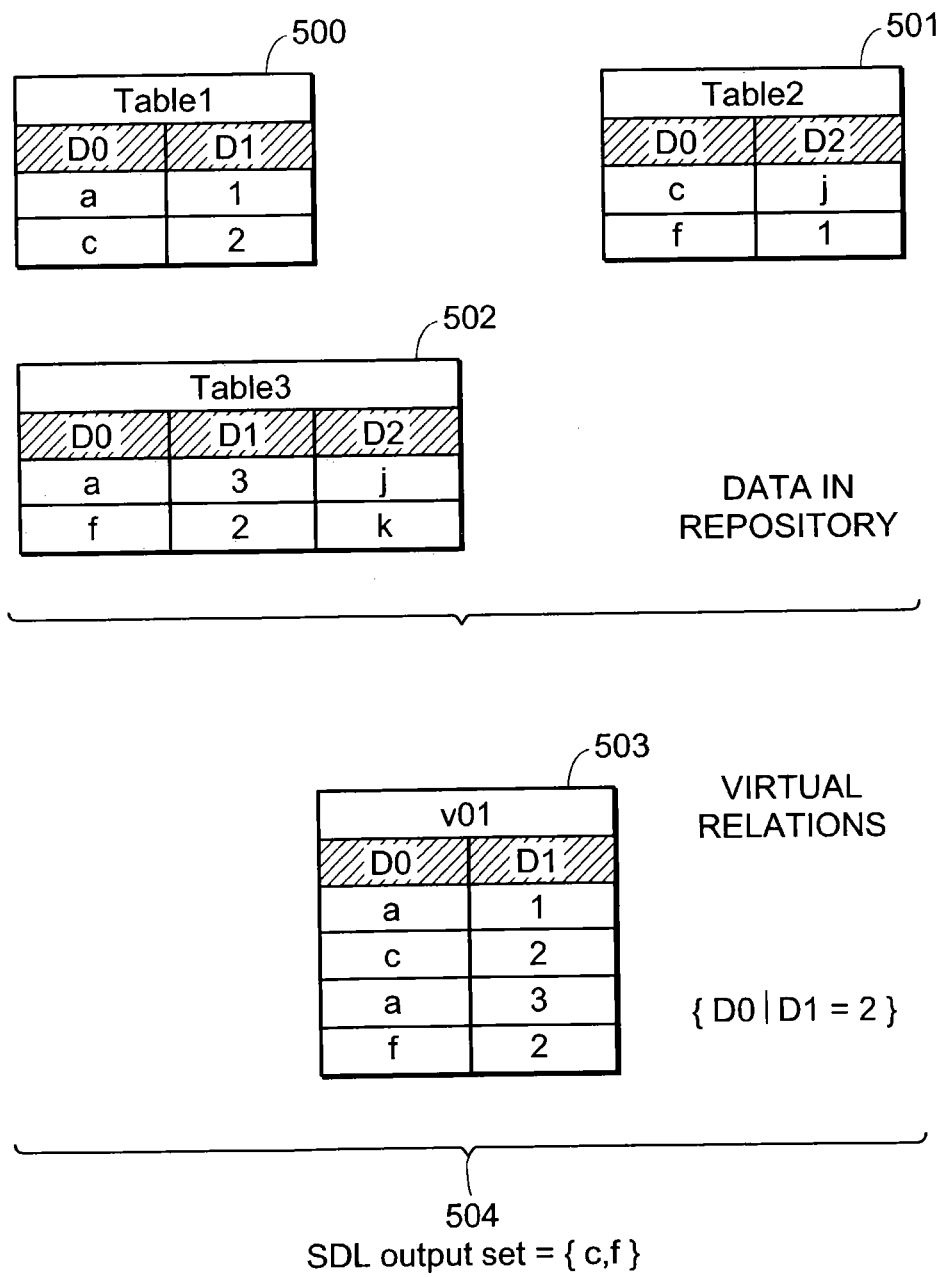
FIG. 5 is an example of how virtual relations are generated as views on the underlying data in the repository based on the SDL query.

Let's assume that there are only three tables registered with the SDL server 100 as shown in FIG. 5: Table1(d0,d1) 500, Table2(d0,d2) 501, and Table3(d0,d1,d2) 502. For simplicity of the example, assume that the column names of the tables are the same as the name of the dimensions they store. This is not a requirement, it is just for purposes of illustration in the example. The SQL code that evaluates the previous SDL expression is then:

SELECT DISTINCT D0 FROM (SELECT V01.D0 D0 FROM (SELECT D0, D1 FROM TABLE1 UNION SELECT D0, D1 FROM TABLE3) V01 WHERE V01.D1=2);

Notice how the virtual relation Table v01 503 only contains table1 and table3 since table2 does not contain dimension d1. An alternative way to define the virtual relations on the fly in an SQL statement is by using the WITH statement and common table expression. The WITH statement however only exists in some new versions of SQL implementations, such as IBM DB2 and Oracle9i. Similar to using the WITH statement, with respect to an SQL syntax virtual relation v01 of Table 503 could also have been defined as a view, instead of being defined on the fly as above:

CREATE VIEW V01 (D0, D1) AS (SELECT D0, D1 FROM TABLE1 UNION SELECT D0, D1 FROM TABLE3);

SELECT DISTINCT D0 FROM (SELECT V01.D0 D0 FROM V01 WHERE V01.D1=2);

If the registered data consists of the tables 500, 501, and 502, the result from both of these SQL statements shown above would be the set {c, f} 504.

Consider another more complicated example with a record operator:

{d0|d1=2 AND [d3>0 AND d4<0]}

$\pi_{d0}(\sigma_{d0=d0'}(\sigma_{d1=2}((d0,d1))\times\sigma_{d3>0,d4<0}((d0',d3,d4))))$ In order to evaluate this expression, the SDL system 100 creates two virtual relations, v01 and v034 and performs a natural join on d0 (the prime is just used to make a distinction between the same dimension coming from two different relations).

In the following discussion on translation of SDL to SQL statements, the virtual relations are denoted with "v" and a suffix based on the dimensions that are included in the corresponding relation. For instance, a relation with d0, d1 and d3 is denoted by v013. The following will leave aside whether the virtual relation is defined on the fly or with SQL views since it does not impact other things in the SQL statement structure.

Normalization and Views

Schema refinement through normalization of data is a common practice in relational schema designs and there exists extensive literature on this subject (see R. Agrawal et al., "Storage and Querying of E Commerce Data", Proceedings of the 27th VLDB Conference, Rome, Italy, 2001 (p. 417)). The basic idea is to format the data such that updates are easy, the data is flexible with respect to queries, and storage space is minimum. The invention SDL system 100 utilizes normalized data in two ways: directly, through the use of nested sets, and indirectly through the use of views. Here a closer look at the former approach is taken since, due to limitations in most SQL optimizers, it requires a special flag in the metadata in order to be implemented efficiently.

Without loss of generality, consider an arbitrary scenario where one has two relations as shown in FIG. 6, diags(pid, diag, hospid, docid, date) 600 and hospitals(hospid, name, type, region, zip) 601. If one would like to define a set of all patients that have gotten some diagnosis in a hospital in a particular region, the corresponding invention SDL expression could look like:

{pid|[diag=icd9.x AND hospid IN{hospid|zip=101}]}

This expression is perfectly fine, however, it can be argued that it is relatively long and complex for most inexperienced users. One might like to define new dimensions on the diagnoses that make this definition easier. One could for instance create a view 602 called vdiags and register it in addition to diags 600 and hospitals 601:

vdiags(pid,diag,hosp.name,hosp.type,hosp.region,hosp.zip, doc.speciality,doc.age,date) with the following SQL code:

CREATE VIEW VDIAGS AS (SELECT PID,DIAG,HOSP.NAME,HOSP.TYPE,HOSP.REGION,HOSP.ZIP,DATE FROM DIAGS, HOSPITALS HOSP WHERE DIAGS.HOSPID=HOPS.HOSPID);

With these dimensions, the subject SDL expression would simply become:

{pid|[diag=icd9.x AND hosp.zip=101]}

This expression is obviously much shorter and easier to understand than the one above (hosp.zip could also have been called diag.zip).

There is a dangerous pitfall however. Notice what happens if one creates an expression such as:

{pid|diag=icd9.x}

As discussed above, this expression will generate a virtual relation that is a union of diags 600 and vdiags 602, since both of these tables contain the dimensions pid and diag. All the information on the relation (pid, diag) is in diags 600, and vdiags 602, adds no additional information given its definition. What is even worse is that the SQL code that would be generated (see the following discussion on the translation of SDL to SQL) would use the view vdiags 602 with no conditions on the dimensions taken from hospitals 601. Hence, this would result in a cross product (Cartesian product) between the tuples in diags, 600 and hospitals 601, a join that could potentially be very expensive. This is because SQL optimizers cannot recognize that this join does not have to be performed, given the output parameters and the conditions specified in the SQL join.

Applicants' solution to the above problem is not to abandon views, but to allow them to be registered into the SDL system 100 with additional information on their inclusion criteria. The inclusion criteria can be implemented in many ways. For instance as a list of sets of dimensions with the meaning that one dimension from each set is required to appear in an expression or record expression (see the syntax specification) for the table/relation to be included into the virtual relation. As an example, Applicants could have specified the inclusion criteria 604 on vidags in the metadata table relations 603 as: {pid, diag, hospid, docid, date}, {hosp.name, hosp.type, hosp.region, hosp.zip}. Then the view would only be included into the virtual view when there is at least one column required from each of the two tables, diags 600 and hospitals 601. A query that uses dimensions from both of the underlying tables, diags 600 and hospitals 601, would however only use the view 602, vdiags, since the inclusion criteria would be false for the two tables.

Figure 7:
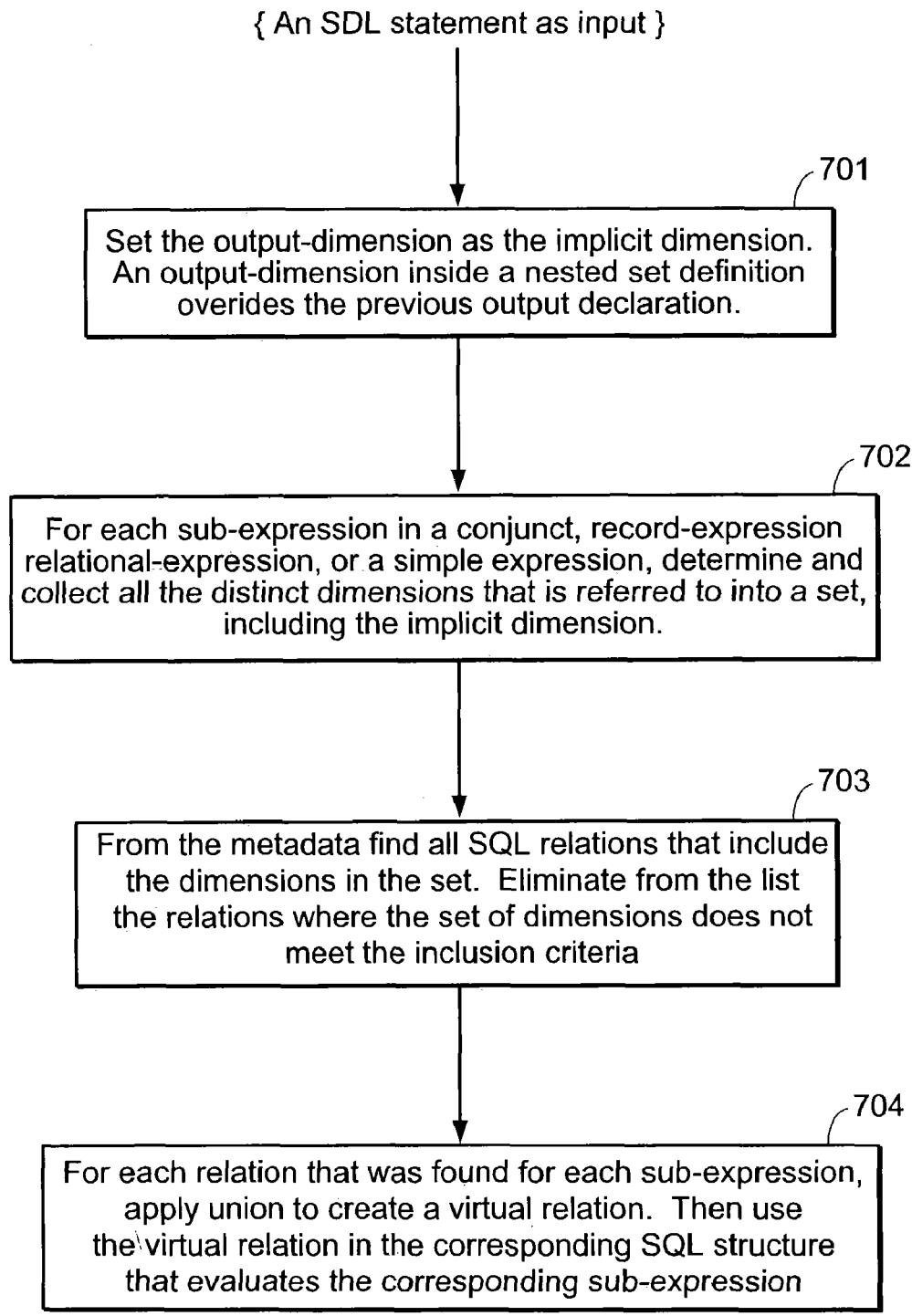
FIG. 7 is a block diagram describing the process for creating the virtual relations that are needed to evaluate each expression.

In general, the inclusion criteria will result in fewer SQL relations that will be included into the SQL statement. FIG. 7 summarizes the process of finding which SQL relations are needed in a virtual relation for an SQL statement that results from the translation of SDL to SQL. An SDL statement is provided as input. At step 701, the system sets the output dimension as the implicit dimension from the input statement. An output dimension inside a nested set definition overrides the previous output declaration.

Next in step 702, for each sub expression in a conjunct, record-expression, relational-expression, or a simple expression, the system determines and collects all the distinct dimensions that are referred to, into a set. The system includes the implicit dimensions.

In step 703, the system finds from the metadata and lists all the SQL relations that include the dimensions in the set created in step 702. The system eliminates from the list the relations where the set of dimensions does not meet the inclusion criteria.

In step 704, for each relation that was found in step 703 for each sub-expression, the system applies a union operation to create a virtual relation. The system then uses the virtual relation in the corresponding SQL structure that evaluates the corresponding sub-expression.

It is worth mentioning that star-schemas, see William A. Giovinazzo, "Object-Oriented Data Warehouse Design: Building a Star Schema", Prentice Hall, (February 2000) and Oracle 9i B "Data Warehousing Guide", (Part Number A90237-01), June 2001, Oracle Corporation B www.oracle.com, are common examples of where data is denormalized. A star usually refers to a fact-table with corresponding dimension-tables. The fact-table usually stores facts that are some kind of measures, e.g. cost, and dimension columns that are classifiers on the measure (attributes). The dimension-tables are then composed from a dimension column that has a foreign-key relationship with a dimension column in the fact-table in addition to more columns that are usually lower-resolution classification of the dimension, e.g. timestamp grouped into weeks, months, quarters and years. In the terminology presented herein, Applicants do not make any distinction between facts and dimensions as such, although, dimensions would typically be dimensions that belong to enumerable domains (and be primary dimensions, see later discussion on primary dimensions and default output-dimensions).

Applicants have described that the SDL metadata 17 provides special support for enumerable domains that have hierarchical values. The SDL metadata 17 could also be augmented in such a manner that domains could be assigned dimension-tables, i.e. dimension grouping tables. This could for instance be obtained by adding fields in the domain table, see 400 in FIG. 4. The benefit of this would be that the SDL system could automatically provide the grouping that the dimensions-table provides to any dimension that belongs to the corresponding domain.

As an example, consider the import of registration of a relation that has a dimension with a date dimension that is an instance of the domain DATE. If a dimensions-table, dategr(date, week, month, qt, year), had been assigned to the DATE domain, the SDL system could automatically create, in addition to the date dimension, a dimension such as date.week, date.month, date.qt, date.year and register a view (or materialized view) that is a join between the imported relation and the dimension-table. This would provide the user with a "hierarchical-like feeling" for all dimensions of such domains, when creating an expression with a constraint on time.

Translation of SDL to SQL

To explain how a general SDL statement can be translated to a SQL statement, this discussion uses a stepwise approach and starts by explaining how the basic SDL structures map to SQL. For one skilled in the art of compilers and RDBMS, it will then follow how to construct a generic translator/compiler 15 that takes a general SDL statement that complies with the SDL syntax specification and maps it to an SQL statement. The SQL standard is defined by ANSI document, X3.135 1992,"Database Language SQL" and in revised form by document ANSI/ISO/EIS 9075. These documents are available from the American National Standards Institute.

Atomic Expression

Consider the most simplistic definition of an SDL set as:

{d0|d1}

Here d0 is the output dimension, i.e. the set is defined on dimension d0. This SDL definition is translated into the following SQL:

SELECT DISTINCT D0 FROM (SELECT V01.D0 D0 FROM V01 WHERE V01.D1!=NULL);

where v01 is defined as a view of all relations with dimensions d0 and d1, i.e. (d0, d1). Since d0 is the output dimension, according to the SDL syntax, a specific (or target) dimension for the output does not have to be mentioned in the expression itself.

Constraints and Comparisons

SDL expressions with relational expression and calc-expr are translated in the following manner:

{d0|di>pi} is translated to:

SELECT DISTINCT D0 FROM (SELECT V01.D0 D0 FROM V01 WHERE V01.D1>PI);

{d0|d1!=pi} is translated to:

SELECT DISTINCT D0 FROM (SELECT V01.D0 D0 FROM V01 WHERE V01.D1!=PI);

Two dimensions with the same domain type can be compared in the following manner:

{d0|d1d1>d2}

The above expression is translated to:

SELECT DISTINCT D0 FROM (SELECT V01.D0 D0 FROM V01, V02 WHERE V01.D0=V02.D0 AND V01.D1>V02.D2);

Notice that since no record operator (see below) is used d1 and d2 do not have to come from the same tuples nor the same relation.

The same is the case in this calculated expression:

{d0|d1/d2>10} which is translated to:

SELECT DISTINCT D0 FROM (SELECT V01.D0 D0 FROM V01, V02 WHERE V01.D0=V02.D0 AND V01.D1/V02.D2>10);

Conjunctive expression

{d0|d1>pi AND d2=4} is translated to:

SELECT DISTINCT D0 FROM (SELECT V01.D0 D0 FROM V01, V02 WHERE V01.D0=V02.D0 AND V01.D1>PI AND V02.D2=4);

Disjunctive Expression

{d0|d1>pi OR d2=4} is translated to:

SELECT DISTINCT D0 FROM (SELECT V01.D0 D0 FROM V01 WHERE V01.D1>PI UNION ALL (SELECT V02.D0 D0 FROM V02 WHERE V02.D2=4) );

Record Operator

{d0|d> AMD d2!=4]} is translated to:

SELECT DISTINCT D0 FROM (SELECT V012.D0 D0 FROM V012 WHERE V012.D1>PI AND V012.D2!=4);

Like before, v012 defines a view of all relations with dimensions d0, d1, and d2. The previous SDL expression could also have been written in this way:

{d0|d1>pi AND NOT d2=4]} and it is translated to: SELECT DISTINCT D0 FROM (SELECT V012.D0 D0 FROM V012 WHERE V012.D1>PI AND NOT V012.D2=4);

Notice the equivalence of NOT and "!=" inside the record expression. The meaning of NOT outside record expressions is different as described next.

Consider now two examples that use relational expression and calc-expr inside the record operator and contrast them with the examples shown previously. Two dimensions with the same domain type can be compared in the following manner:

{d0|[d1>d2]}

This is translated to: SELECT DISTINCT D0 FROM (SELECT V012.D0 D0 FROM V012 WHERE V012.D1>V012.D2);

Notice that since a record operator is used, d1 and d2 have to come from the same tuple in a virtual relation. The same is the case in this calculated expression:

{d0|[d1/d2>10]} which is translated to: SELECT DISTINCT D0 FROM (SELECT V01.D0 D0 FROM V012 WHERE V012.D1>V012.D2);

FIG. 7 explains the logic behind the generation of virtual relations. The process receives on input an SDL expression. Step 701 sets the "current" output-dimension, as a required dimension in each virtual relation. In step 702, virtual dimensions that belong to the same record are found based on record-operators, calculated expressions etc. A distinct list of such dimensions, including the implicit dimension, determines the dimension fingerprint. Translation of each sub-expression conjunct may require several virtual relations with different fingerprints. Based on the SDL metadata, all SQL relations that fulfill the inclusion criteria for each fingerprint are found 703. In the present embodiment a virtual relation is generated for each dimension fingerprint 704 by using the SQL UNION keyword and common table expressions.

Negations

Before considering the general case of expressions with NOT, start by considering two simple cases:

{d0|d1>pi AND NOT d2=4} is translated to:

SELECT DISTINCT D0 FROM (SELECT V01.D0 D0 FROM V01 WHERE V01.D1>PI MINUS (SELECT V02.D0 D0 FROM V02 WHERE V02.D2=4));

Here the SQL keyword MINUS is used to perform set-subtraction. The MINUS keyword is Oracle specific, however, MINUS can be replaced with EXCEPT in order to make the SDL translation SQL ANSII compliant.

Consider now the simpler case where there is only the NOT term in the expression:

{d0|NOT d1>pi}

Now it seems impossible to use the set minus approach shown above. However, by recognizing that since d0 is the output dimension, it is implicit in the constraint and therefore this set definition is equivalent to:

{d0|d0 AND NOT d1>pi} and can therefore be translated to:

SELECT DISTINCT D0 FROM (SELECT V0.D0 D0 FROM V0 WHERE V0.D0!=NULL MINUS (SELECT V01.D0 D0 FROM V01 WHERE V01.D1>PI ));

Here v0 denotes a view containing all relations with d0. Applicants like to refer to v0 as the "universe" or all the attributes that the dimension d0 covers in its corresponding domain.

It should be mentioned that the inclusion-criteria, e.g. 604 in FIG. 6, on relations can be used to control which SQL-relations will be included in the virtual relation that constitutes the "universe". Also, the universe, V0, of a given output-dimension, d0, can also be implemented as a materialized view. Thus an SQL optimizer can substitute a union of possibly multiple tables with a summary of all the possible values for that dimension. Furthermore, as discussed in the section on primary dimensions and default output-dimension, a universe of a given output-dimension can be declared in terms of its domain and relations prepresenting the complete listing of values in the corresponding domain.

Now consider a record expression with NOT:

{d0|d3=7 AND NOT[d1>pi AND NOT d2=4]}

The above is translated to:

SELECT DISTINCT D0 FROM (SELECT V03.D0 D0 FROM V03 WHERE V03.D3=7 MINUS (SELECT V012.D0 D0 FROM V012 WHERE V012.D1>PI AND NOT V012.D2=4) );

Like before, v012 defines a view of all relations with dimensions d0, d1, and d2.

Binding Variables

Binding variables can be used in conjunction with records, e.g.:

{d0|[d1=a; $x=d2] AND [d1=b AND d2>$x]}

This definition is translated to:

SELECT DISTINCT D0 FROM (SELECT VA.D0 D0 FROM V012 VA, V012 VB WHERE VA.D0=VB.D0 AND VA.D1=a AND VB.D1=b AND VB.D2>VA.D2);

Notice how the criteria with the binding variable are implemented using additional constraints on the join, which in this case is a self-join.

An alternative way for defining binding variables in the syntax can be the following:

{d0|[d1=a AND $x:=d2]]AND [d1=b AND d2>$x]}

This way of declaring binding variables is easily implemented if it can be guaranteed that dimension names will not cause naming conflicts. This is most easily achieved by using a different assignment operator than the equality comparison operator, i.e. Applicants use a Pascal like operator, ":=", for assignment. Furthermore, Applicants use the symbol "$" in the beginning of binding variables, simply to make them more easily recognized in the teaching of this invention. In the SQL translation above, the translator replaced reference to $x with a reference to d2.

An alternative way is to rename the SQL-column that is created in the SQL-implementation of the virtual relation by using nested table expressions, e.g.:

SELECT DISTINCT D0 FROM (SELECT VA.D0 D0 FROM (SELECT V012.D0 D0, V012.D2 BX FROM V012) VA, V012 VB WHERE VA.D0=VB.D0 AND VA.D1=A AND VB.D1=B AND VB.D2 >VA.BX);

Here, the relation VA contains a column named BX that defines the binding variable. This method makes it easy to extend the binding variable declaration such that formulas can be defined, e.g.:

{d0|[d1=a AND $x:=d2/d1] AND [d1=b AND d2>$x]}

It goes without saying that this translation strategy also applies when binding variables are declared with the other approach, i.e. behind a semicolon.

Yet another way of declaring binding is by using a syntax more related to SQL cursors, i.e. bind relations as compared to individual columns or functions. As an example consider the following:

{d0|[d1=a AMD d] as $x AND [d1=b AND d2>$x.d2]}

A natural way to translate this to SQL is:

SELECT DISTINCT D0 FROM (SELECT VA.D0 D0 FROM V012 VX, V012 VB WHERE VX.D0=VB.D0 AND VA.D1=a AND VB.D1=b AND VB.D2>VX.D2);

Here VX becomes the name issued to the first virtual relation that has the dimension fingerprint 012, because of the binding declaration of the relation.

In all of these examples, Applicants have not been very rigorous with regard to the naming of the SQL columns, but in actual SDL2SQL implementation, it is important to have a naming system that avoids naming conflicts. The following examples will only use the first two approaches for defining binding variables, however, the translation logic discussed below should apply to all syntax variants.

Binding Variable and Negation

Binding variables can be used in conjunction with records, e.g.:

{d0|[d1=a; $x=d2] AND NOT [d1=b AND d2>$x]}

Figure 8:
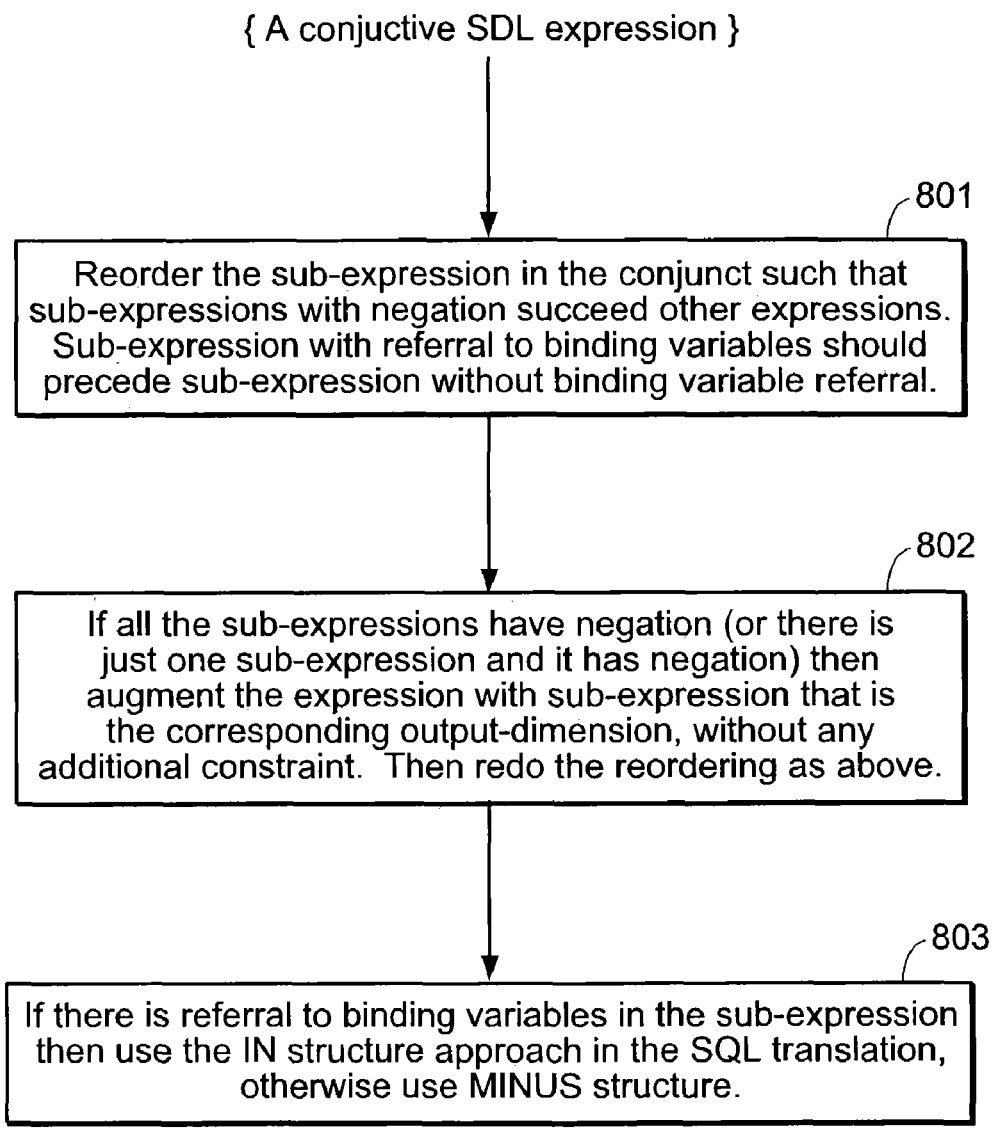
FIG. 8 is a block diagram describing the process for translating a conjunctive sub-expression with one or more negations.

Because of the binding variable, it is no longer possible to use a straight-forward set minus approach for implementing NOT. Applicants therefore translate this in the following manner:

SELECT DISTINCT D0 FROM (SELECT V01.D0 D0 FROM V012 VA WHERE VA.D1=a AND NOT V012.D0 IN (SELECT VB.D0 D0 FROM V012 VB WHERE VA.D0=VB.D0 AND VB.D1=b AND VB.D2>VA.D2));

Note that this approach could also have been used for implementing NOT where there are no binding variables, however, it is usually slower than the minus approach. Also notice the renaming of the relations because of the multiple referrals to the same relation. Finally, notice the constraint vA.d0=vB.d0 that is important for many optimizers when nested SQL is used with negation. FIG. 8 summarizes the process for translating a conjunctive SDL expression with negation to SQL.

The process receives on input a conjunctive SDL expression. In response to the input, the process (at step 801) reorders the sub-expressions in the subject conjunct such that sub-expressions with negations succeed other expressions. The process also provides that sub-expressions with references to binding variables precede sub-expressions without binding variable references.

In step 802, if all the sub-expressions have negation or there is just one sub-expression and it has negation, then the process augments the expression with a sub-expression that is the corresponding output dimension, without any additional constraint. Next step 802 redoes the reordering of step 801.

In step 803, if there is a reference to binding variables in the sub-expression, then the process uses the IN structure approach in the SQL translation. Otherwise, the process uses the MINUS structure.

Nested Sets

The invention SDL syntax allows for nested sets through the use of the IN keyword in expressions. Consider the following simple case:

{d0|d1>3 AND d2 IN{d3|d4=3}}

Notice that for this definition to be valid the two dimensions, d2 and d3, have to be from the same domain. The most obvious approach is to translate this in the following manner:

SELECT DISTINCT D0 FROM (SELECT V01.D0 D0 FROM V01, V02 WHERE V01.D0=V02.D0 AND V01.D1>3 AND V02.D2 IN (SELECT V34.D3 D3 FROM V34 WHERE V34.D3=V02.D2 AND V34.D4=3));

Notice the constraint v34.D3=v02.D2 which is instrumental for this to perform well on database systems that have poor optimizers.

Alternatively, this can be written by using a join approach:

SELECT DISTINCT D0 FROM (SELECT V01.D0 D0 FROM V01, V02, V34 WHERE V01.D0=V02.D0 AND V01.D1>3 AND V02.D2=V34.D3 AND V34.D4 3);

This implementation should be in a form that is easier for most SQL optimizers, with regard to choosing a right execution plan. As seen later, one may rewrite any SDL expression in such a manner that one can apply this join approach instead of the above approach.

Before leaving the IN statements, it is illustrative to see how binding variables can be used inside nested SDL sets:

{d0|[d1>3; $x=d1] AND d2 IN{d3|d4>$x}} can be translated as:

SELECT DISTINCT D0 FROM (SELECT V01.D0 D0 FROM V01, V02, V34 WHERE V01.D0=V02.D0 AND V01.D1>3 AND V02.D2=V34.D3 AND V34.D4>V01.D1);

Finally consider:

{d0|[d1>3 AND d2 IN{d3|d4>$x}; $x=d1]} which is translated as:

SELECT DISTINCT D0 FROM (SELECT V012.D0 D0 FROM V012, V34 WHERE V012.D1>3 AND V012.D2=V34.D3 AND V34.D4=V012.D1);

The above SDL query might have been more readable using alternative binding declaration:

{d0|[d1>3 AND $x:=d1 AND d2 IN{d3|d4>$x}]} which can be translated in the same manner as above.

To conclude the discussion on nested SDL sets and the use of IN in SDL expressions, consider the case where nesting is used inside a nested set:

{d0|d1>3 AND d2 IN{d3|d4>4 AND d5 IN}d6|d7>5}}}

The easiest and most straightforward approach would be to use SQL structure with IN to translate this and use multiple nesting in SQL as well. However, this SDL expression can also be solved with the join approach if the IN term is treated in a similar way as AND is treated:

SELECT DISTINCT D0 FROM (SELECT V01.D0 D0 FROM V01, V02, V34, V35, V67 WHERE V01.D0=V02.D0 AND V01.D1>3 AND V02.D2=V34.D3 AND V34.D4>4 AND V34.D3=V35.D3 AND V35.D5=V67.D6 AND V67.D7>5);

One way to understand the SQL translation better is the following SDL equality:

{d0|d1 AND d2}={d0|[d1 AND d0 IN{d0|d2}]}

The SIZE Set Function

Related to the IN statements and binding variables is the SIZE function on SDL sets. The SIZE function is simply to evaluate the size of a set and should mostly be useful in conjunction with the use of binding variables. Consider the following SDL statement:

{d0|d1>0 AND $x:=d2 AND SIZE{d3|d4>$x}>2}

The translation of an SDL statement with a SIZE function is straightforward:

SELECT DISTINCT D0 FROM (SELECT V01.D0 D0 FROM V01, V02 WHERE V01.D0=V02.D0 AND V01.D0>0 AND (SELECT COUNT(*) FROM (SELECT DISTINCT V34.D3 FROM V34 WHERE V34.D4>V02.D2))>2);

Notice the equivalence between the two SDL statements:

{d0|d1 AND $x:=d2 AND SIZE{d3|d4 AND d3=$x}>0}={d0|d1 AND d2 IN{d3|d4}}

The ALL Keyword on Records

The SDL syntax has an inherent ANY or EXIST notation with regard to the expressions. Sometimes it may be desired to require that all of the tuples/rows in a relation fulfill a certain criteria. For this purpose one can use the ALL keyword in front of a record-operator which indeed is a shorthand for the following NOT syntax:

{d0|d1 AND ALL[d2>x]}={d0|d1 AND ([d2>x] AND NOT[NOT(d2>x)])}

The ALL keyword simply provides a more readable syntax. Notice that NOT ALL should then be translated as (see rewrite rules in following sections):

{d0|d1 AND NOT ALL[d2>x]}=

{d0|d1 AMD NOT ([d2>x] AND NOT[NOT(d2>x)]) }=

{d0|d1 AND (NOT[d2>x] OR [NOT(d2>x)])}=

{d0|d1 AND NOT[d2>x] OR d1 AND [NOT (d2>x)]}

Here a query-rewrite rule (see following section) has been used to eliminate double negation and negation on brackets.

General SDL Expression

Based on the short expressions above one may deduce a general approach for translating an SDL statement of the invention into an SQL statement. Consider now a general disjunctive expression:

{d0|d1=pi OR(d2=4 AND NOT d3=5)}=

{d0|SDLexpr1 OR (SDLexpr2)}

The invention system translates this in the manner it translates the simple OR expression, e.g. by using the union approach. By using SDL2SQL to denote a function that translates SDL expressions to corresponding SQL statements, one obtains:

SELECT DISTINCT D0 FROM (SDL2SQL(SDLEXPR1) UNION ALL

SDL2SQL(SDLEXPR2))=SELECT DISTINCT D0 FROM (SELECT V01.D0 D0 FROM V01 WHERE V01.D1=PI

UNION ALL (SELECT V02.D0 D0 FROM V02 WHERE V02.D2=4 MINUS

SELECT V03.D0 D0 FROM V03 WHERE V03.D3=5));

Notice how the brackets enclosing the SQL code for SDLexpr2 are necessary because the precedence on UNION and MINUS in SQL is not the same as on NOT and OR in SDL.

Now consider a general conjunctive SDL expression:

{d0|d1=pi AND (d2=4 OR d3=5)}=

{d0|SDLexpr1 AND (SDLexpr2)}

Initially the invention system might translate this in the same manner as it did with the simple AND expression above:

SELECT DISTINCT D0 FROM (SELECT VA.D0 D0 FROM V01 VA, (SDL2SQL(SDLEXPR2)) VB WHERE VA.D0=VB.D0 AND VA.D1=PI);

To clarify this, expand the SQL statement:

SELECT DISTINCT D0 FROM (SELECT VA.D0 D0 FROM V01 VA, (SELECT V02.D0 D0 FROM V02 WHERE V02.D2=4 UNION ALL (SELECT V03.D0 D0 FROM V03 WHERE V03.D3=5)) VB WHERE VA.D0=VB.D0 AND VA.D1=PI);

This approach works even when SDLexpr2 contains binding variables defined in SDLexpr1 although the two expressions cannot then be translated separately. FIG. 9 summarizes the general approach for translating disjunctive 900 and conjunctive 901 SDL expressions.

An alternative approach is to use nested SQL with IN statement, the same way as the invention handles negation. The IN translation approach is considered in the following example where binding variables are also used:

{d0|[d1=pi; $x=d2] AND ([d3=5 AND d2>$x] OR d3=6)}=

{d0|[d1=pi; 4x=d2] AND (SDLexpr2)}

With the IN translation approach this becomes:

SELECT DISTINCT D0 FROM (SELECT VA.D0 D0 FROM V012 WHERE VA.D1=PI AND V012.D0 IN (SELECT V023.D0 D0 FROM V023 WHERE V023.D0=V12.D0 AND V023.D3=5 AND V023.D2>V012.D2 UNION ALL (SELECT V03.D0 D0 FROM V03 WHERE V03.D0=V012.D0 AND V03.D3=6)))

The drawback with both of these approaches becomes clear if one considers an extreme case where d3=6 is highly selective, much more so than d1=pi. Because of the union operator and the binding variable, the cursors on v023 and v03 will be nested under the cursor on v012. Therefore, for each value of the v012 cursor, a lookup will be done on both v023 and v03. This lookup is approximately twice as expensive as a lookup only on v023. This example is further discussed later in the description of the OR distribution rewrite approach.

Query Rewrite Approaches

In the previous section, Applicants showed how one could map most of the basic structures in the invention SDL syntax to corresponding SQL statements. On purpose, the discussion omitted the handling of brackets since brackets are indeed only to control the evaluation order. In this section, Applicants show rewrite rules for the parser 11 (FIG. 1), which, amongst other tasks, eliminates all brackets and puts a subject SDL statement into conjunctive normal form (CNF) that is easily translated into an efficient corresponding SQL statement.

The rewrite rules of the invention are based on the following rules of algebraic logic:

I. (e)=e

II. e1 AND e2=e2 AND e1

III. (e1 AND e2) AND e3=e1 AND (e2 AND e3)

IV. e1 OR e2=e2 OR e1

V. (e1 OR e2) OR e3=e1 OR (e2 OR e3)

VI. (e1 OR e2) AND e3=(e1 AND e3) OR (e2 AND e3)

VII. (e1 AND e2) OR e3=(e1 OR e3) AND (e2 OR e3)

VIII. NOT(e1) OR NOT(e2)=NOT(e1 AND e2)

IX. NOT(e1 OR e2)=NOT(e1) AND NOT(e2)

X. NOT NOT e=NOT(NOT e)=e

Rules II and IV are based on the commutative law, rules III and V on the associative law and rule VI on the distributive law. Rule VII is not applied in the preferred embodiment of the present invention, however, it is listed for the sake of completeness. Rules VII and VIII are based on deMorgans's law. In particular, Applicants refer to rule VI as OR distribution.

OR Distribution

Consider the general SDL expression that is made up from three conjuncts:

{d0|SDLexpr1 AND (SDLexpr2 OR SDLexpr3)}=

{d0|(SDLexpr1 AND SDLexpr2) OR (SDLexpr1 AND SDLexpr3)}=

{d0|SDLexpr1 AND SDLexpr2 OR SDLexpr1 AND SDLexpr3}

Here the invention drops the brackets and insists that AND has higher precedence than OR in SDL as is the case in most computer languages. As an example consider:

{d0|d1>pi AND [d2=4 AND d3>0] OR D1>pi AND d4=

{d0|d1>pi AND ([d2=4 AND d3>0] OR d4=4)}=4}

According to the previous sections, using joins for AND and unions for OR, this example is translated into the following SQL statement:

SELECT DISTINCT D0 (SELECT V01.D0 D0 FROM V01, V023 WHERE V01.D0=V023.D0 AND V01.D1>PI AND V023.D2=4 AND V023.D3>0 UNION ALL (SELECT V01.D0 D0 FROM V01, V04 WHERE V01.D0=V04.D0 AND V01.D1>PI AND V04.D4=4));

Continuous application of the OR distribution results in an SDL expression in a conjunctive normal form (CNF). As an example, consider:

{d0|d1 AND (d2 OR d3 AND (d4 OR d5))}=

{d0|d1 AND (d2 OR (d3 AND d4) OR (d3 AND d5))}=

{d0|d1 AND d2 OR d1 AND d3 AND d4 OR d1 AND d3 AND d5}

This is now easily translated to a joins for the conjuncts and unions for the disjuncts.

Consider the example from before:

{d0|[d1=pi; $x=d2] AND ([d3=5 AND d2>$x] OR d3=6)}=

{d0|([d1=pi; $x=d2] AND [d3=5 AND d2>$x]) OR ([d1=pi] AND d3=6)}

Based on the invention's standard translation approaches for AND and OR, one writes this as:

SELECT DISTINCT D0 FROM (SELECT V012.D0 D0 FROM V012, V023 WHERE V012.D1=PI AND V012.D0=V023.D0 AND V023.D2>V012.D2 UNION ALL (SELECT V01.D0 D0 FROM V01, V03 WHERE V01.D0=V03.D0 AND V01.D1=PI AND V03.D3=6));

Written in this way, an SQL optimizer 13 can easily choose an independent execution path for each of the two SQL parts, separated by the union operation, thus resulting in almost twice as low execution cost if d3=6 is highly selective as compared to the other criteria. The difference can be even more dramatic in scenarios where for instance d3=5 is also much more selective than d1=pi, because with this SQL structure, the SQL optimizer 13 can choose to make the cursor on v01 to be the most nested in both parts of the SQL statement, whereas, most SQL optimizers will not do that in the two previous SQL statements (see R. Ramakrishnan and J. Gelirke, "Database Management Systems", 2nd ed., McGraw Hill, (2000)).

Finally, it is interesting to see how OR distribution can help in expressions with negation:

{d0|d1=1 AND (NOT d2=2 OR d3=3)}

By using the IN translation approach this would map to:

SELECT DISTINCT D0 (SELECT V01.D0 D0 FROM V01 WHERE V01.D1=1 AND V01.D0 IN (SELECT V0.D0 D0 FROM V0 WHERE V0.D0!=NULL MINUS SELECT V02.D0 D0 FROM V02 WHERE V02.D2=2 UNION ALL (SELECT V03.D0 D0 FROM V03 WHERE V03.D3=3)));

The problem with this statement is that the part: "SELECT V0. D0 D0 FROM V0 WHERE V0.D0!=NULL" can be quite costly since v0 can be quite large (see the discussion on inclusion criteria for dimension). By using OR distribution the SDL expression becomes:

{d0|d1=1 AND NOT d2=2 OR d1=1 AND d3=3} and the corresponding SQL translation results:

SELECT DISTINCT D0 (SELECT V01.D0 D0 FROM V0l WHERE V01.D1=1 MINUS SELECT V02.D0 D0 FROM V02 WHERE V02.D2=2 UNION ALL (SELECT V01.D0 D0 FROM V01, V03 WHERE V01.D0=V03.D0 AND V01.D1=1 AND V03.D3=3));

OR Distribution and Nested Sets

Consider now an SDL expression with an IN statement and a disjunctive expression in a nested set:

{d0|d1 {d2|d3=3 OR d3=4}}

This can be translated in the following manner:

SELECT DISTINCT D0 FROM (SELECT V01.D0 D0 FROM V01, V23 WHERE V01.D1=V23.D2 AND (V23.D3=3 OR V23.D3=4);

If one changes this slightly by replacing the latter d3 by d4, one will have to apply the following rewrite in order to be able to use the same SQL structure:

{d0|d1 IN{d2|d3=3 OR d4=4}}=

{d0|d1 IN{d2|d3=3} OR d1 IN{d2|d4=4}}

This can be translated in the following manner:

SELECT DISTINCT D0 FROM (SELECT V01.D0 D0 FROM V01, V23 WHERE V01.D1=V23.D2 AND V23.D3=3 UNION ALL (SELECT V01.D0 D0 FROM V01, V24 WHERE V01.D1=V23.D2 AND V24.D3=4));

Hence, this shows that one can treat IN statements in the same way as record expressions, i.e. one can apply OR distribution within the nested SDL sets. Without this approach the expression shown above would have to be mapped using nested SQL or the following:

SELECT DISTINCT D0 FROM (SELECT V01.D0 D0 FROM V01 WHERE V01.D1 IN (SELECT V23.D2 D2 FROM V23 WHERE V01.D1=V23.D2 AND V23.D3=3 UNION ALL (SELECT V24.D2 D2 FROM V24 WHERE V01.D1=V24.D2 AND V24.D4=4))); or alternatively as:

SELECT DISTINCT D0 FROM (SELECT V01.D0 D0 FROM V01,(SELECT V23.D2 D2 FROM V23 WHERE V23.D3=3 UNION ALL (SELECT V24.D2 D2 FROM V24 WHERE V24.D4=4)) V2 WHERE V01.D1=V2.D2);

As mentioned before, the drawback with these two approaches is that often the SQL optimizer 13 will not be able to handle this structure as well as the alternative proposed above. This approach is however useful when the nesting is preceded with negation, such as in the following example:

{d0|d1 AND NOT d5 IN{d2|d3=3 OR d4=4}]}

OR Merging

Consider now a general structure of a CNF formatted SDL expression:

{d0|ANDexpr1 OR ANDexpr2 OR SDLexpr3}

If any two conjuncts have the same set of dimensions, they can be merged together in the translation to SQL. A simple example explains this:

{d0|[d1=1 AND d2=2] OR [d1=3 AND d2=4]} which can be translated in the following manner:

SELECT DISTINCT D0 FROM (SELECT V012.D0 D0 FROM V012 WHERE (V012.D1=1 AND V012.D2=2) OR (V012.D1=3 AND V012.D2=4));

This can give a factor of two in speed increase in cases where the SQL optimizer chooses full scan. Note however that the merge cannot be applied for conjuncts that differ by a NOT connective or by reference to different binding variables.

Negations

Query rewrites related to negation can be done according to rules VIII X as well as rule II above. As an example consider the following SDL expression:

{d0|NOT d1=1 AND d2=2}={d0|d2=2 AND NOT d1=1}

In the initial form the SDL expression is not easily translated to SQL using a left to right join approach, however, after the rewrite based on the cornmutative law, it is easily translated to:

SELECT DISTINCT D0 FROM (SELECT V02.D0 D0 FROM V02 WHERE V02.D2=2 MINUS SELECT V01.D0 D0 FROM V01 WHERE V01.D1=1);

or to a corresponding SQL with IN keyword:

SELECT DISTINCT D0 FROM (SELECT V02.D0 D0 FROM V02 WHERE V02.D2=2 AND V02.D0 NOT IN (SELECT V01.D0 D0 FROM V01 WHERE V01.D0=V02.D0 AND V01.D1=1));

The latter structure works also when the second part of the conjunction contains a reference to a binding variable defined in the other half, as mentioned earlier. The present invention therefore pushes negations to the end of any conjunct. For instance if there is more than one negation:

{d0|d1=1 AND NOT d2=2 AND NOT d3=3}

This can be translated as:

SELECT DISTINCT D0 FROM (SELECT V01.D0 D0 FROM V01 WHERE V01.D1=1 AND V01.D0 NOT IN (SELECT V02.D0 D0 FROM V02 WHERE V01.D0=V02.D0 AND V02.D2=2) AND V01.D0 NOT IN (SELECT V03.D0 D0 FROM V03 WHERE V01.D0=V02.D0 AND V03.D3=3));

or into an SQL form using two MINUS operations.

If negation is in front of two or more disjunctive SDL expressions, the invention applies rewrite according to rule VIII, e.g.:

{d0|NOT(e1) OR NOT(e2) OR e3}={d0|NOT(e1 AND e2) OR e3}

In this example, one saves one set subtraction from the "universe" as explained in previous sections. If negation encloses brackets, the present invention only applies rewrite if it contains a conjunctive expression according to rule IX. Before concluding discussion on rewrite approaches for negation, Applicants take one detailed example:

{d0|[d1;$x=d1] AND NOT(d2>$x OR d3 OR NOT (d4))}=

{d0|[d1;$x=d1] AND NOT(d2>$x) AND NOT(d3) and D4}=

{d0|d4 AND [d1;$x=d1] AND NOT(d2>$x) AND NOT(d3)}

Notice how the negation with the referral to the binding variable precedes the other negation because it has to be implemented with an IN structure whereas the latter term can be enforced by subtraction using MINUS:

SELECT DISTINCT D0 FROM (SELECT V04.D0 D0 FROM V04, V01 WHERE V04.D0!=NULL AND V01.D0!=NULL AND V04.D0=V01.D0 AND V01.D0 NOT IN (SELECT V02.D0 FROM V02 D0 WHERE V01.D0=V02.D0 AND V02.D2>V01.D1) MINUS SELECT V03.D0 D0 FROM V03 WHERE V03.D0!=NULL);

Undefined Binding Variables

The rewrite approaches suggested above, i.e. to translate the SDL expression into CNF, have an interesting side effect when it comes to the binding variables. Here Applicants explain how the invention treats binding variables that appear in a different conjunct than where they are declared. Consider for instance the following example:

{d0|([d1;%x=d3] OR [d2;$y=d3]) AND ([d4 AND d3>$x] OR [d4 AND d3>$y])}

If one rewrites this SDL expression after performing OR distribution, one obtains:

{d0|([d1;$x=d3] AND [d4 AND d3>$x]) OR ([d1; $x=d3] AND [d4 AND d3>$y]) OR ([d2; $y=d3]) AND [d4 AND d3>$y]) OR ([d2; $y=d3] AND [d4 AND d3>$x])}

Notice that the SDL expression now consists of four conjuncts and that in the second and the fourth conjuncts, there are binding variables that are not defined within the same conjunct. One might think that the invention approach for implementing binding variables no longer holds, i.e. with join operation, since the scope of variables does not extend over the UNION statement in SQL that is used for implementing OR. Applicants recognize, however, that conjuncts with undefined binding variables are FALSE, that is they can be eliminated from the disjunctive expression. The results therefore are:

{d0|[d1;$x=d3] AND [d4 AND d3>$x] OR [d2; $y=d3] AND [d4 AND d4>$y]}

Applicants also recognize that this expression could have been rewritten in another way:

{d0|[d1 OR d2;$x=d3] AND [d4 AND d3>$x]}

This is because the SDL syntax allows disjuncts that arise because of different dimensions inside the SDL record operator. Consider another example:

{d0|9 d1;$x=d2] OR d3) AND ([d4>$x] OR d5)}

This is a perfectly legal SDL expression, assuming that the dimensions d2 and d4 are of the same domain. Without rewrite approaches, it is non trivial to transfonn this to SQL since the relation (d0,d1,d2) is different from (d0,d3). One might try the following SQL code:

SELECT DISTINCT D0 FROM (SELECT VA.D0 D0 FROM (SELECT V012.D0 D0 FROM V012 WHERE V012.D0!=NULL UNION ALL (SELECT V03.D0 D0 FROM V03 WHERE V03.D0!=NULL)) VA, (SELECT V04.D0 D0 FROM V04 WHERE V04.D4>V012.D2 UNION ALL (SELECT V05.D0 D0 FROM V05 WHERE V05.D0!=NULL)) VB WHERE VA.D0=VB.D0));

Notice however, that referral to V012.D2 (boldface in the SQL statement) is illegal since it is not within scope there. Also notice that it would be impossible to refer to it as VA.D2 because the relation V03 does not have the D2 dimension and therefore, the relation VA only contains the D0 dimension. The reader can verify the other approach that was described above for translating a general SDL expression to SQL, i.e. using the IN keyword, is also non trivial in this example (fake colurnns have to be used). The solution is however to apply OR distribution to the SDL expression before translation to SQL:

{d0|([d1;$x=d2] OR d3) AND ([d4>$x] OR d5)}=

{d0|[d1;$x=d2] AND [d4>$x] OR [d1;$x=d2] AND d5 OR d3 AND [d4>$x] OR d3 AND d5}

Applicants recognize one conjunct term in the disjunction with an "undefined" binding variable and eliminate that term as discussed above. Hence one obtains:

{d0|[d1;$x=d2] AND [d4>$x] OR [d1;$x=d2] AND d5 OR d3 AND d5}

This is easily translated to SQL with three joins that are unioned together.

Figure 10:
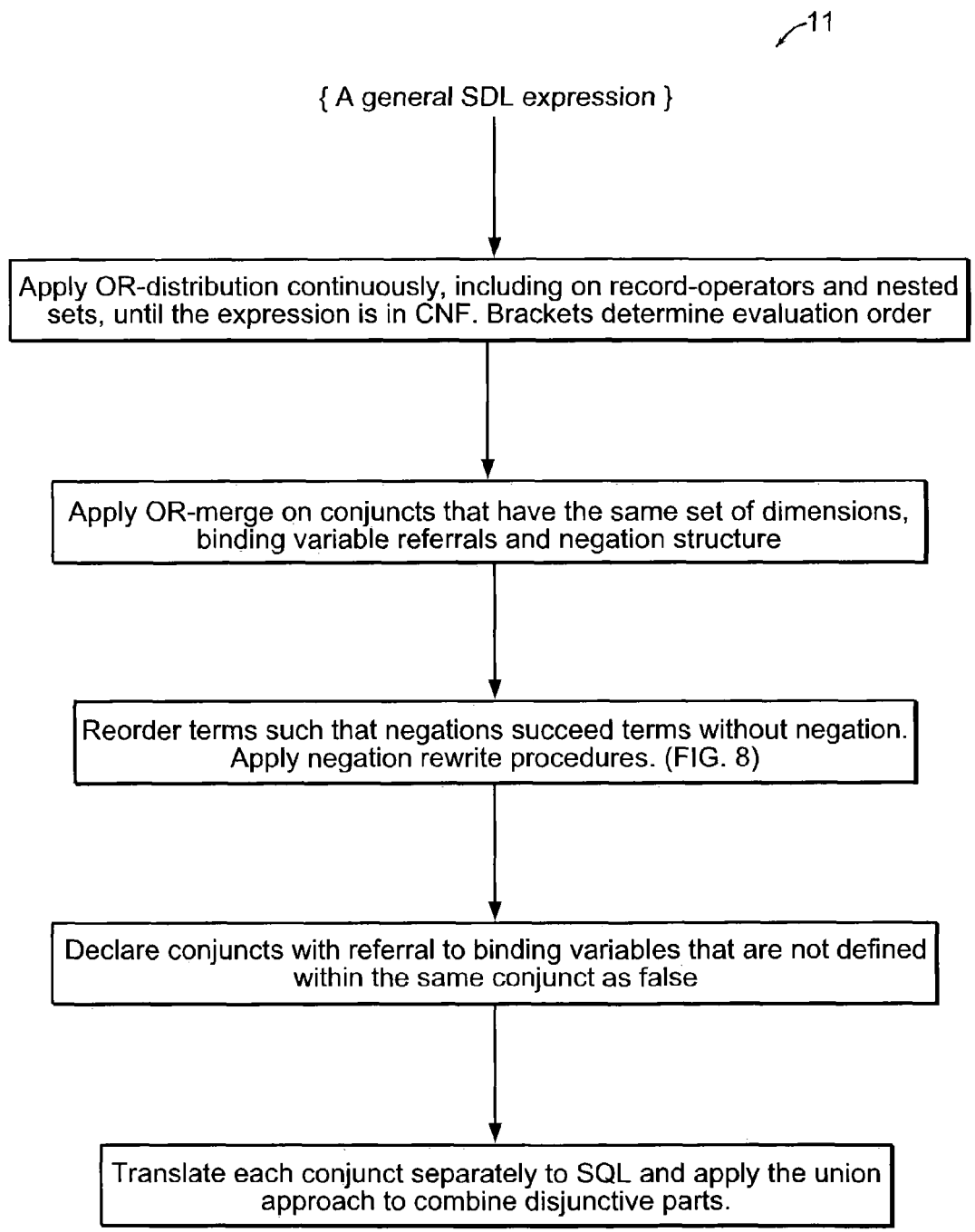
FIG. 10 is an overview of parser steps in one embodiment of the optimization and translation procedure from SDL to SQL.

FIG. 10 illustrates the foregoing optimization and translation routines and procedures for optimized translation of SDL to SQL that uses a parser 11 in initial steps. This optimized translation has the benefit of generating SQL that is faster, especially on RDBMS where the SQL optimizer is not too good.

Aggregate Functions

The SDL language supports aggregate functions in a similar manner as in the SQL. language. In the spirit of sparse syntax, the invention defines a way for using aggregates without any additional HAVING keyword as in SQL and the default grouping (GROUP BY in SQL) is defined implicitly, based on the output-dimension of the set. It is best to take a simple example:

{d0|MAX(d1)>x}={d0|d1>x}

This definition defines all d0 for which the largest d1 in relations with d0 and d1 is larger than x. Note that due to the "exist" nature of the SDL language, the above query is equivalent to the other form shown to the right. If another aggregate operator would be used, this is not the case. For instance the following SDL definition:

{d0|MIN(d1)>x}!={d0|d1>x}

The former definition defines all d0 for which the smallest d1 in relations with d0 and d1 is larger than x, which of course is not equal to the latter definition that only requires some d1 to be larger than x. Now let's see how the former definition can be translated into a SQL code:

SELECT DISTINCT D0 FROM (SELECT V01.D0 D0 FROM V01 GROUP BY V01.D0 HAVING MIN(V01.D1) >x);

Notice how the implicit grouping on the output-dimension in the SDL statement becomes explicit in the SQL code. Also notice how the aggregate constraint becomes a HAVING filter on the SQL relation V01. Let's take a more complicated example:

{d0|[AVG(d1)>x WHERE d3>y GRBY d2]}

Here there are two types of constraints, a regular relational-expression (following the WHERE keyword) and an aggregate relational-expression. Furthermore, there is additional grouping specification, i.e. the average is not only calculated as a function of d0 but the combination of d0 and d2. The SQL translation could look like this:

SELECT DISTINCT D0 FROM (SELECT V0123.D0 D0 FROM V0123, V0123.D2 WHERE V0123.D3>y GROUP BY V0123.D0, V0123.D2 HAVING AVG(V0123.D1)>x );

Note that the aggregate constraints show up in a HAVING clause whereas the regular constraints come in a regular WHERE clause. Also, notice the specification on the grouping clause, i.e. both the implicit and the explicit dimension in the SDL statement. The use of the WHERE keyword is simply for making the syntax more readable and also to give instructions on what kind of constraint it is. Alternatively, the SDL syntax also supports an opposite setup, i.e. with a HAVING clause, e.g.:

{d0|[d3>y HAVING AGV(d1)>x GRBY d2]}

This SDL statement is fully equal to the previous SDL statement. However, the following statement is not:

{d0|[AVG(d1)>x AND d3>y GRBY d2]}

There are a few things worth mentioning here. First, Applicants have omitted the HAVING keyword since it is optional when the constraint starts with a calculated expression using an aggregate operator. Furthermore, the second constraint is also a HAVING constraint, as seen in the translated SQL below, and due to that fact, the dimension d3 will also appear in the GROUP BY statement (it is therefore optional to specify it in SDL):

SELECT DISTINCT D0 FROM (SELECT V0123.D0 D0 FROM V0123 GROUP BY V0123.D0, V0123.D2, V0123.D3 HAVING V0123.D3>y AND AVG(V0123.D1) >x );

Care must be taken when translating the SDL statement when the conjunct has two terms, when a standard join approach is used (as compared to intersect approach). Consider the following:

{d0|CPIMT(d1)>x AND d2=y}

By using nested table expressions the SQL translation could look like this: SELECT DISTINCT D0 FROM (SELECT VA01.D0 FROM (SELECT V01.D0 FROM V01 GROUP BY V01.D0 HAVING COUNT(V01.D1)>x VA01, V02 WHERE VA01.D0=V02.D0 AND V02.D2=y);

Notice how the aggregate grouping is applied before the join, because of a possible tuple-multiplication from the join process.

Aggregates can also be useful in conjunction with nested sets. Consider the following example:

{d0|[COUNT(d0)>x WHERE d1=IN{d2|d3>y}]}

Because of the COUNT aggregate and possible multiplication of tuples, as mentioned above, the join approach proposed for the nested set constraint does not work! Consider the following SQL code:

SELECT DISTINCT D0 FROM (SELECT V012.D0 FROM V012, V34 WHERE V01.D1=V23.D2 AND V23.D3>y GROUP BY V01.D0 HAVING COUNT(V01.D0)>x );

The code above is an incorrect translation! For a record with an aggregate condition as well as a condition based on nested sets, one must use the alternative IN translation approach, e.g.:

SELECT DISTINCT D0 FROM (SELECT V01.D0 FROM V01 WHERE V01.D1 IN (SELECT DISTINCT V23.D2 FROM V23 WHERE V23.D3>y) GROUP BY V01.D0 HAVING COUNT(V01.D0)>x );

Before concluding the discussion about aggregates, consider two more examples, i.e. binding variables defined from aggregates and a case were aggregates and dimensions are mixed in a calculated expression.

{d0|[$x:=MAX(d1) AND $y:=MIN(d1)] AND
    [d2>$y AND d2<$x]}

In this example, the HAVING keyword is left out because it is optional. This can be translated as:

SELECT DISTINCT D0 FROM (SELECT VA01.D0 FROM (SELECT V01.D0, MAX(V01.D1) BX, MIN (V01.D1) BY FROM V01 GROUP BY V01.D0) VA01, V02 WHERE VA01.D0=V02.D0 AND V02.D2>VA01.BY AND V02D2<VA01.BX)

Notice how the binding variables are made part of the output from the nested table expression, i.e. the intermediate relation VA01. Finally, consider:

{d0|[MAX(d1)+d2>x]}=

{d0|[HAVING MAX(d1)+d2>x]}=

{d0|[HAVING MAX(d1)+d2>x GRBY d2]}

Notice the use of additional grouping caused by the use of d2 in combination with aggregate calculations. The SDL compiler automatically recognized this. This is one of the subtle points of aggregates, however, those who are well at home in SQL will understand this due to the nature of grouping and the calculation of aggregates (if grouping of d2 is not specified, there is no way to determine which d2 value to use, because there can be many tuples with the same value for d0 but different value of d2). This becomes more clear when one looks at the translation:

SELECT DISTINCT D0 FROM (SELECT V012.D0 FROM V012 GROUP BY V012.D0, V012.D2 HAVING MAX (V012.D0)+V012.D2>x);

This example emphasizes the point that a calculated-expression with any aggregate must go into a HAVING clause. Of course, the same dimension could also appear in a WHERE filter and more grouping can be specified, e.g.:

{d0|[MAX(d1)+d2>x WHERE d2>0 GRBY d3]}

FIG. 10 is a high level flow diagram of the SDL optimization procedure (by optimizer 13) according to the foregoing. Other similar procedures are suitable.

View Union Rewrite

In the discussion on tables and metadata, Applicants demonstrated how the SDL system uses its metadata to construct virtual relations by combining all the tables that contain the proper dimensions with the union operator. That approach causes the union operator to be applied before the joins are calculated (unless the SQL optimizer does the same rewrite as Applicants are proposing here). Consider the following expression:

{d0|d1 AND d2}

Without the loss of generality, Applicants assume that tables A and B store relations (d0,d1) and that tables C and D store relations (d0,d2). One can indeed introduce a "special" dimension, T that denotes the table in which the tuples (records) are stored. Then the expression above can be written as:

{d0|[d1 AND (T=A OR T=B)] AND [d2 AND (T=C OR T=D)]}

Notice that this specifies a constraint on the dimension T, a constraint that is equivalent to "no constraint" given the assumptions about the data stored in the system. With the invention's regular SQL translation approach, this would be written as:

SELECT DISTINCT D0 FROM (SELECT V01.D0 D0 FROM V01, V02 WHERE V01.D1!=NULL AND V02.D2!=NULL AND V01.D0=V02.D0);

SELECT DISTINCT D0 FROM SELECT V01.D0 D0 FROM (SELECT V01.D0 D0 FROM (SELECT D0, D1 FROM A UNION ALL SELECT D0, D1 FROM B) V01, (SELECT D0, D2 FROM C UNION ALL SELECT D0, D1 FROM D) V02 WHERE V01.D1!=NULL AND V02.D2 !=NULL AND V01.D0=V02.D0);

Now consider if OR distribution is applied on the special table dimension, T:

{d0|[d1 AND T=A] AND [d2 AND T=C] OR [d1 AND T=A] AND [d2 AND T=D] OR [d1 AND T=B] AND [d2 AND T=C] OR [d1 AND T=B] AND [d2 AND T=D]}

The corresponding SQL code takes the following form:

SELECT DISTINCT D0 FROM (SELECT V01.D0 D0 FROM (SELECT V01.D0 D0 FROM A) V01, (SELECT D0, D1 FROM C) V02 WHERE V01.D1!=NULL AND V02.D2!=NULL AND V01.D0=V02.D0)

UNION ALL

SELECT V01.D0 D0 FROM (SELECT V01.D0 D0 FROM A) V01, (SELECT D0, D1 FROM D) V02 WHERE V01.D1 !=NULL AND V02.D2!=NULL AND V01.D0=V02.D0)

UNION ALL

SELECT V01.D0 D0 FROM (SELECT V01.D0 D0 FROM B) V01, (SELECT D0, D1 FROM C) V02 WHERE V01.D1!=NULL AND V02.D2!=NULL AND V01.D0=V02.D0)

UNION ALL

SELECT V01.D0 D0 FROM (SELECT V01.D0 D0 FROM B) V01, (SELECT D0, D1 FROM D) V02 WHERE V01.D1!=NULL AND V02.D2!=NULL AND V01.D0=V02.D0);

After the rewrite, each conjunct is implemented with a join of only two tables, i.e. the relation view v01 does not have to be implemented with the union operator. Instead, the union is carried out because of the disjunctive nature of the whole expression. The union has therefore been moved further back into the evaluation, i.e. after the join whereas it is before the join in the original implementation. Notice that this allows the optimizer 13 to choose a separate execution plan for each join, hence it is more likely to perform well if the tables have different sizes, cardinality and indices. Finally, it is worth mentioning that view union rewrite does not require the definition of a special dimension for table names. Those skilled in the art should see that the bookkeeping for this distribution rewrite could be carried out where a conjunct is translated to SQL code.

Figure 11:
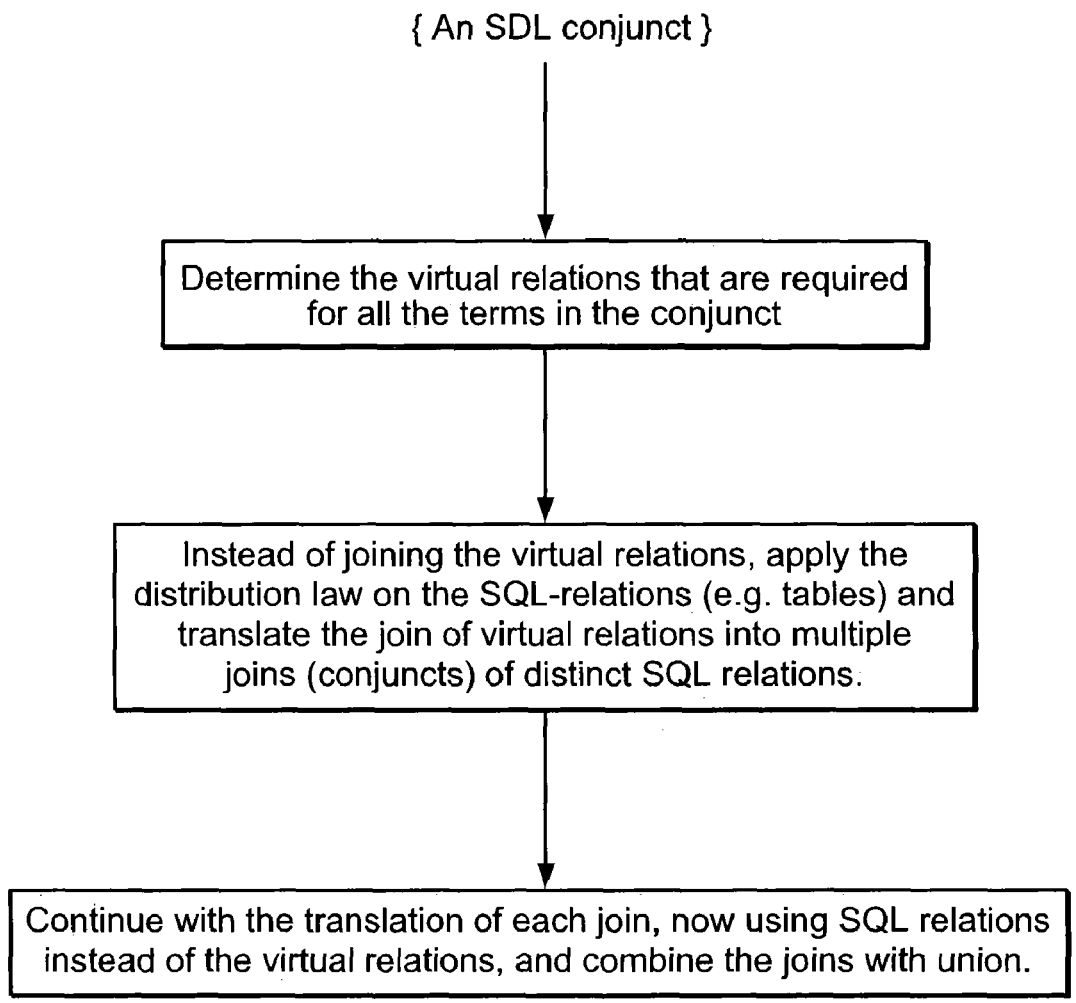
FIG. 11 is an overview of the view-union optimization.

FIG. 11 is a flow diagram of a view-union rewrite optimization procedure (by optimizer 13) according to the foregoing. Other similar procedures are suitable.

Automatic Record Operator Enforcement

The SDL syntax uses square brackets to denote a record operator. The record operator is used to enforce more than one criterion on a single relation instance (tuple/record). There are cases where the nature of the data is such that two expressions, with and without a record operator, are equivalent. This is explored next along with a rewrite optimization strategy that utilizes this fact.

Applicants assume that one has some conjunctive expression:

{d0|d1 AND d2 AND d3 AND d4}

One can group all dimensions in a conjunct together into a set, R, where the following holds: each dimension in R takes part in the same relations as any other dimension in R, and for all those relations, the output dimensions (d0) is declared with its multiplicity as "unique". As an example, if d1, d3 and d4 only exist in a single relation (d0, d1, d3, d4) where d0 is unique, then the expression above can be rewritten as:

{d0|d2 AND [d1 AND d3 AND d4]}

This will change the SQL translation from a 4 table join into a 2 table join, which can be dramatically much faster. A practical example of this is where one has a singleton relation with information on individuals such as (pid, sex, dob, dod), i.e. demographic information. Consider a typical query:

{pid|dob>1950 AND sex=male AND diag:stroke AND date-dob>30}

This expression could be automatically rewritten to:

{pid|[dob>1950 AND sex=male] AND diag:stroke AND date-dob>30}

Notice that since there can be multiple records in (pid, diag, date) for each patient, diag and date would not automatically be locked into a record. In this case, the user is however, most likely trying to make the following query:

{pid|[dob>1950 AND sex=male; $x=dob] AND [diag:stroke AND date-$x>30]}

Notice that since the dimension for date of birth, dob, is not in the same relation as date, it cannot be placed into the record operator, except through a binding variable.

As another example take the following query:

{pid|dob>1950 AND sex=male AND dod-dob>90}

Because all of the four dimensions that appear in this conjunct only exist in one and only one relation and where the pid is unique, this could be automatically rewritten as:

{pid|[dob>1950 AND sex=male AND dod-dob>90]}

As for the view union rewrite, automatic record operator enforcement is easily implemented where a conjunct is translated to SQL. Each SQL cursor that is generated for the conjunct join can be inspected and all cursors that refer to the same table(s) can be merged if the output dimension of those cursors is the same and it is declared unique. In other words, this would eliminate unnecessary self-joins. The automatic record-operator enforcement is really an optimization based on semantic equivalence, i.e. the optimizer 13 can recognize unique constraints on the relations it is using and rewrite the query into a form that has faster implementation than the most natural translation of the query as expressed by the user.

Greedy Record Locking and Structured Dimensions

Sometimes it may be desired to have the optimizer 13 setup in such a mode that it enforces record locking even though the user does not specify it. The scenarios where this may be desirable is when the user is assumed to be inexperienced (unfamiliar with the record-operator) and the data is in such a form that it is most natural to constrain it as records, i.e. constraints on separate dimensions in the same relation make most sense on the same tuple (row). Another scenario is where the data volumes are very large such that forgetting record locking can lead to prohibitively expensive queries. Here Applicants consider a feature in the SDL invention that aims to simplify the query and ensure better performance. Applicants refer to it as greedy record locking.

Consider the following example:

{gid|expr.tissue=:brain AND expr.level>0.9}

The relation that stores these dimensions is (gid, expr.tissue, expr.level) and there is not a unique constraint on gid. Given this fact, it is not semantically correct to enforce record locking on the two dimension constraint in the set definition. However, due to the nature of the data in this example, and there are many equivalent scenarios, the user most likely wanted to query the following:

{gid|[expr.tissue=:brain AND expr.level>0.9]}

Figure 12:
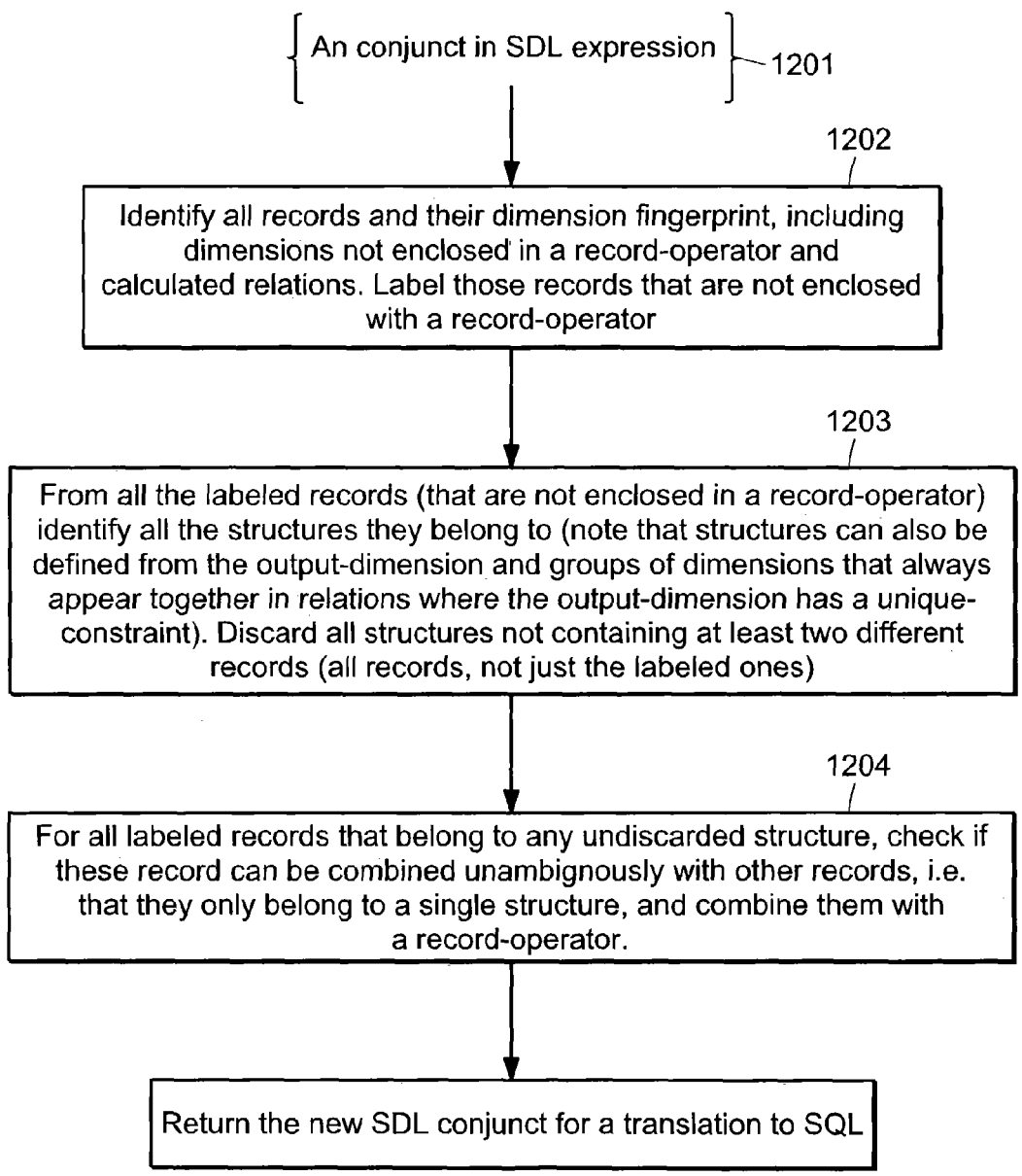
FIG. 12 is an overview of automatic record-operator enforcement.

If one labels these dimensions, expr.tissue and expr.level, in such a manner that defines them to belong to a structure, then the optimizer 13 can automatically enforce record locking. The fact that two dimensions are defined as a structure should also require that they do not exist in isolation, in relations where either is missing. There are multiple ways to define structure groups for dimensions in the metadata, e.g. by labeling each dimension with an identifier of a structure group that could be stored as an additional column in 401 (FIG. 4). The rules for record-enforcement are defined in the present invention in the following maimer as illustrated in FIG. 12.

Dimensions that fall into the same conjunct (after OR-distribution) are collected at 1201. Dimensions that are not enclosed with a record-operator are labeled and inspected with regard to merging them into other records that form the conjunct at step 1202. The structures that are of interest are those that are associated with dimension fingerprints of labeled records, yet dimension fingerprints that are unique in the list of labeled records, and are also associated with other different records in the conjunct (step 1203). Note that in this context, a record can refer to single dimensions or relational-expressions in a conjunct, e.g. [d1], thus dimensions that appear together in a calculated-expression (but not enclosed within a record-operator) are treated together, i.e. they have to belong to the same relation. If a labeled record (dimensions) can be merged with one and only one of the other records (i.e. unambiguously), it is put into that record at step 1204.

Record-operator enforcement can be a) none, by ignoring structure information, i.e. apply only when semantically correct, b) regular, by applying as described above when structure info is found, or c) greedy, by assuming all dimensions that exist in the same relation to belong in a structure. Consider an example:

{gid|loc.start>1000 AND loc.stop<2000 AND loc.chrom=1}

Assume a relation of the form (gid,loc.start, loc.stop, loc.clrom). In this example, assume that a gene could have been mapped to multiple locations on the genome. Therefore, automatic record-operator enforcement would not be possible. However, if these dimensions have been assigned to a structure then the optimizer 13 should be able to treat this as:

{gid|[loc.start>1000 AND loc.stop<2000 AND loc.chrom=1 ]} which is probably what the user wanted. If however the user writes:

{gid|[loc.start>1000 AND [loc.stop<2000] AND loc.chrom=1}

Here the optimizer 13 would not enforce any additional record-locking, because loc.chrom could not be unambiguously put into a record. Likewise:

{gid|loc.start>1000 AND loc.stop<2000 AND loc.chrom=1 AND loc.chrom=2}

This is a silly example, however, it is used to emphasize that loc.chrom could not be locked with the other dimensions because there are two instances of it in the same conjunct.

Now consider the following:

{gid|[loc.start>1000 AND loc.stop<2000] AND loc.chrom=1 AND name='A*'}

Assume that the dimension name is in a separate relation (gid, name). Because loc.chrom is in a structure with loc.start and loc.stop this will be rewritten by the optimizer 13 as:

{gid|[loc.start>1000 AND loc.stop<2000 AND loc.chrom=1] AND name='A*'}

It should be noted, that there are other ways to define the rules for record-operator enforcement. In this embodiment, the rule is in such a manner that non-record constraints are merged into other records if they fulfill certain rules. Alternatively, the record enforcement could only be applied to constraints that are not enclosed by record operators. The former approach gives however a nice feature that will become clear when considering a general case:

d0|(expr1 AND [record-expr]) AND expr2}

The expression inside the brackets could for instance be a user generated expression and the expression outside the brackets could be additional constraints generated automatically by an application. These automatically generated constraints could for instance be window time constraints or window spatial constraints. If the constraints in expr2 are stored in a relation with the record-expression, the rules of this embodiment allow additional machine generated constraints easily to be combined with any type of user-generated expressions that may contain records.

Finally, consider an example with nested sets:

{pid"fid IN{pid{$d:=dob} AND mid IN{pid|dob>$d}}

Typically, a genealogy relation should be a singleton (pid, fid, mid) and the optimizer should therefore be able to rewrite this no matter what. If the genealogy is, however, allowed to store multiple possible parent relationships then it would nevertheless make sense to define fid and mid as a structure. The optimizer 13 would be able to rewrite the query that finds all individuals that have older fathers than mothers as:

pid|[fid IN{pid|4d=dob} AND mid IN{pid|dob>$d}]}

The point here is that the IN constraint is simply treated as a regular constraint. Of course, the same rewrite rules apply within each nested set.

Pivoted Dimensions

Next discussed is an extension to the standard SDL syntax (see the basic SDL syntax specification below) that allows the SDL language to treat dimensions in a hierarchical manner. This extension requires small changes to the meta data presented earlier and minor changes to the SDL "calc-expr" definition. As shown below, the benefit of this extension is to allow measurements to be classified in a hierarchical manner without using the record operator.

The extension redefines the calc-expr such that it includes "dimension:code". To clarify this, Applicants take an example of an SDL expression that utilizes this extension:

{pid|meas:bloodpressure.high>120}

In this example, all measurements have been combined into what looks like a single dimension. Without this extension, the expression would have to be written as:

{pid|[meas:bloodpressure.high AND value>120]}

The data could also have been formatted such that each type of measurement would reside in a separate dimension, e.g.:

{pid|bloodpressure.high>120}

With the invention extension, multiple dimensions are in effect pivoted into a single column and an additional column is needed to store its value. This can also be referred to as vertical representation. Unless the values are stored as strings and converted to the proper domain data type on the fly, all the dimensions that are pivoted together should be of the same data type. To support this extension, it is necessary to augment the meta data. One way to do that is to store an additional column in the table domains, SQLpivoted_type, and an additional column in dim2rel, pivoted_value_column. The SDL system 100 would then recognize dimensions that have non null values in value_column and treat them appropriately when translating the SDL expression to SQL.

Applicants rewrite the first SDL expression in a more general manner:

{d0|d1:a.b>120}

This expression would be translated to the following SQL code:

SELECT DISTINCT D0 FROM (SELECT V01X.D0 D0 FROM V01X WHERE (V01X.D1 LIKE 'A.B. %' OR V01X.D1='A.B') AND V01X.X=120)

Here the column name of the pivotedvaluecolumn is "x" and the virtual view that includes d0, d1 and x is denoted with v01x. It should be noted that although this pivoting extension provides additional flexibility and extends the SDL schema such that it encompasses "all" relational schemas, e.g. horizontal, vertical, and partially pivoted data structure, it is usually more efficient to store dimensions in separate columns. However, by generalizing this approach, it is possible to hide the actual implementation of the relational schema and the SDL language itself simply works with logical or virtual relations.

For implementing access security for data and project separation, there are also implementation choices because of the SDL metadata abstraction. Access to data belonging to different projects can be controlled through the metadata manager. For instance, data from two different projects can be separated into two different SQL tables. It is trivial to support such logic by, for instance, adding access control data to table 402. An alternative approach would be to add an additional column to every data table in the system and let the SDL2SQL query generator include additional WHERE constraint on each cursor, in the spirit of the above code generation for pivoted dimensions. One way to view this is as if every logical relation has a dimension specifying access level and every constraint on dimension is turned into a record expression that combines the original constraints with the system generated access constraints. This is similar to the approach taken in the so-called "Virtual Private Database" in Oracle.

The subject of adding additional dimensions to relations not only has relevance for implementing project access restrictions but also in controlling access and scope to federated data. Furthermore, this subject is related to record-operator enforcement, if one considers the additional scope dimensions as belonging to a structure with all other dimensions. However, ambiguity rules in record-enforcement have to be revised and these rules would also have to propagate into nested subqueries.

SDL syntax specification sdl-set;

---

```
SDL syntax specification
sdl-set:
    { dimension | expression }
    { constantlist }
constantlist:
    constant
    constantlist, constant
expression:
    code-expression
    expression AND expression
    expression OR expression
    NOT expression
    ( expression )
    [ record-expression ]
    [ record-expression; bindinglist ]
    [ aggregate-record-expression ]
    [ aggregate-record-expression GRBY dimensionlist ]
    ALL[ record-expression ]
    ALL[ aggregate-record-expression ]
    ALL[ aggregate-record-expression GRBY dimensionlist ]
parameterlist:
    parameter
    parameterlist, parameter
dimensionlist:
    dimension
    dimensionlist, dimension
parameter:
    calc-expr
bindinglist:
    variable = dimension
    bindinglist, variable = dimension
variablelist:
    variable
    variablelist, variable
record-expression:
    code-expression
    record-expression AND record-expression
    record-expression OR record-expression
    NOT record-expression
    ( record-expression )
    aggregate-record-expression
        HAVING record-expression
        HAVING record-expression WHERE record-expression
        record-expression HAVING record-expression
        record-expression WHERE record-expression
code-expression:
    dimension=:code value
    dimension:code value
    relational-expression
    setname(parameterlist)
    dimension IN sdl-set
    variable := calc-expr
relational-expression:
    calc-expr rel-op calc-expr
rel-op: >, <, >=, <=, =, !=
calc-expr:
    constant (e.g. domain code value)
    variable
    parameter
    dimension
    ( calc-expr )
    calc-expr
    calc-expr calc-op calc-expr
    FUNCTION( calc-expr )
    aggregate-op(dimension)
    SIZE sdl-set
calc-op: +, , *, /
aggregate-op: COUNT, DISTINCT, AVG, STD, VAR, MAX, MIN, . . .
```

--- aggregate-op: COUNT, DISTINCT, AVG, STD, VAR, MAX, MIN, . . .

It should be emphasized that this syntax is simply provided to explain the fundamentals of the SDL language and facilitate the creation of a basic SDL system of the present invention. This basic version of the SDL syntax does not need to entail the SDL invention and does for instance not cover all aspects of binding variable syntax, macros, SQL object-relational extensions nor integration of SDL with SQL through "syntactic gates", as described in following sections.

Bidirectional Language Inlining

Because the SDL language maps to SQL, by definition SQL has all the expression power of SDL. Indeed, SQL has much more expressive power than SDL, however, SDL has much simpler syntax and therefore provides more readable and shorter expressions in the cases where SDL is suitable (the set-definition use-case). The expressive power of SQL and its wide availability makes it very desirable to merge the two languages. In the following discussion the combined language of SQL and SDL will be referred to as SSDL.

In order to merge SQL and SDL two things are necessary: First, a mechanism is needed to map between the meta-data of SDL and the meta-data of SQL (the table and column names) and secondly, the ability to intertwine the SDL and SQL syntax is needed. This invention describes a way to satisfy these needs and to accomplish this in a way that gives an easily readable syntax which is also easily parsed using a "pass-through" compilation technique, i.e. the compiler does not have to parse and compile the whole SQL syntax. This simplifies the construction of the SSDL compiler. Integration of the languages in SSDL is in two ways, i.e. one can inline SDL from within a SQL code and also inline SQL from within SDL. This indeed also means that one can use SDL code from within SQL which then again uses SQL code and vice versa. This leads to a double-recursive implementation of the SSDL compiler. As before, examples are used to explain the implementation of the SSDL language.

Consider the following code:

select * from Table1 as MEAS where MEAS.value>3 and MEAS.id IN {pid|[diag=:icd9.stroke AND $d:=date] AND [drug=:act.tPA AND date>$d]} and MEAS.date>2000

This query is a simple selection of measurements from a relational table, Table1. The rows that are selected are constrained in two ways: first, their date has to be larger than the year 2000 (a regular SQL WHERE clause and secondly, the ids (identifiers) have to belong to the set defined with the SDL expression. Notice how the curly-brackets are used to define the start and the stop of the SDL code. Curly-brackets are not part of the SQL syntax, thus the SDL code can be identified and compiled as described in this invention using SDL2SQL, and substitute the corresponding SQL code into the SQL statement.

In the example above, there was no mixing of the meta-data from the two languages. For such mixing of metadata, consider the following example:

select MEAS(*), D.<dob>, D.<dod>from Table1 as MEAS, [pid, dob, dod] as D where MEAS.value>3 and MEAS.id IN {pid|[diag=:icd9.stroke AND $d:=date] AND [drug=:act.tPA AND date>$d]} and MEAS.date>2000 and D.<pid>=MEAS.id Note a new bracket-operator, <dimension>, is used to map an SDL dimension to a SQL column name. Furthermore, reference to SDL virtual relations through the SDL record-operator (relation-operator) is allowed. An alternative syntax for [pid,dob,dod] could have been [pid AND dob AND dod]. In order to refer to a virtual-relation, a SQL binding variable (cursor) needs to be assigned to it, D in the example above.

Again, it is worth noting that the bracket-operator, introduced in this invention to map between the SDL and the SQL meta-data, is easily recognized by a preprocessor and distinguished from comparison in SQL expressions. This is most easily accomplished by insisting that a binding variable cursor precedes the bracket-operator, thereby also insisting that a dot precedes it, e.g. ".<dim>".

The other symbols that the preprocessor needs to recognize are the square-brackets used to denote the virtual relations. Since square brackets are not part of the standard SQL language, it is very easy to identify them in the SQL statement with a preprocessor and replace them with a corresponding SQI, code that defines the virtual-relation.

The bracket-operator, "<dim>", is really a mechanism to translate from SDL dimensions to SQL column names. SDL dimension names do not necessarily comply with naming conventions of SQL column names. For instance, dots are allowed in SDL dimension names, however, they are illegal in SQL column names. Also, because virtual relations of dimensions are generated at runtime from the dimensions fingerprint, a dimension may refer to multiple different tables and columns. There are many ways to implement a mechanism that issues legal SQL names that have a one-to-one mapping with SDL dimension names, e.g. by hashing, a lookup-table etc., and it should be unnecessary to elaborate on this mechanism in the teaching of this invention.

Alternatively, SQL can be used from within an SDL statement. Consider the following:

{d0|[select T1.c1 as <d0>, MAX(T1.c2) as <$x>
from T1 group by c1] AND [d1<$x]}

Applicants refer to this approach of using SQL inside SDL as the virtual-relation approach, since, instead of letting the record-operator define a relation based on the dimension fingerprint (including the output-dimension), a SQL select statement is put into the record operator instead. Actually, the select statement is not really a pure SQL code, but an SSDL code since it also uses the bracket-operator to define column names, such that the SDL code generator can use the relation defined with the select statement. It is mandatory to have a column that is named after the output-dimension in order to generate the implicit join. The select statement can return more columns and they can be used within the SDL statement as binding variables as shown above. Again the SDL parser 11 can recognize the SQL (SSDL) code within the record operator because "SELECT" is not an allowed keyword in SDL and it is assumed that no dimension is allowed to have that name. The bracket-operator is easily detected in the select statement although the invention also allows the bracket-operator to be preceded with an "as" keyword, in addition to a dot as mention above.

Before leaving this example, it can be informative to see how the overall SQL statement from the SDL/SSDL compiler-could look:

SELECT DISTINCT D0 FROM (SELECT SQL1.D0 FROM(select T1.c1 as D0, MAX(T1.c2) as BX from T1 group by c1 )SQL1, V01 WHERE SQL1.D0 V10.D0 AND V01.D1<SQL1.BX);

Another way of referring to SQL within an SDL statement is the nested set-approach shown in the following example:

{pid|diag=:stroke AND hospid IN{select c1 from
Table1}}

In this example a nested set is defined fully by a SQL statement. For this to work, the data type of the table column c1 must be compatible with the domain of the corresponding dimension, here hospid. Furthermore, the select statement can only return a single column.

Yet another way of using SQL within SDL is to use an SQL-value gate for calculations, e.g.:

{pid|[diag=:stroke AND date>SQLV(select MAX
(LOG(c1)) from T1)]}

This approach is useful when SQL is not used to provide additional attributes on the objects defined by the output-dimension, but rather for comparison with some attributes such as shown here. Needless to say, the SQLV( ) function and its string parameter that contains a SQL code are easily recognized by a preprocessor.

As mentioned earlier, SSDL supports bidirectional language inlining and thus the inlining can be on multiple levels of nesting, e.g.:

select MEAS(*), D.<dob>, D.<dod>from Table1 as MEAS, [pid, dob, dod] as D where MEAS.value>3 and MEAS.id IN {pid|[diag=:icd9.stroke AND $d:=date] AND [drug=:act.tPA AND date>$d] AND [select T2.c1 as <pid>from Table2 as T2]} and MEAS.date>2000 and D.<pid>=MEAS.id In this example, an SDL statement is inlined in the SQL part of the SSDL code and within that SDL statement, there is a SQL code being used according to the virtual-relation method.

The present invention implements an SSDL compiler (FIGS. 13 and 14) with what Applicants refer to as a pass-through approach, i.e. the compiler does not have to understand the SQL language. A preprocessor is used that identifies the symbols that indicate the switching between the languages, i.e. a start of inlining. As seen from the previous examples, these are: ".<SDL>", "as <SDL>", "[SDL]", "{SDL}" from within SQL (SSDL) and "[select SQL/SSDL]", "{select SQL/SSDL}", and "SQLV(SQL/SSDL)". The pass-through approach has the benefit of ignoring any parsing and compilation of the SQL in the SSDL statement. Not only does this simplify the development of the SSDL compiler, but it also makes it much more independent of the SQL flavor (version) being used. Alternatively, one can create a single parser that has a full syntax specification for both of the languages.

It is important to note that common table expressions (defined using the WITH keyword in SQL) and views can only appear in the beginning of an SQL statement. Therefore, a pass-through compiler that possibly has to compile multiple blocks with SDL and SSDL code needs to collect them and place them before the overall result statement. The overall statement will contain both "uncompiled SQL code" (the pass-through code) as well as SQL code generated from SDL code blocks.

Figure 13:
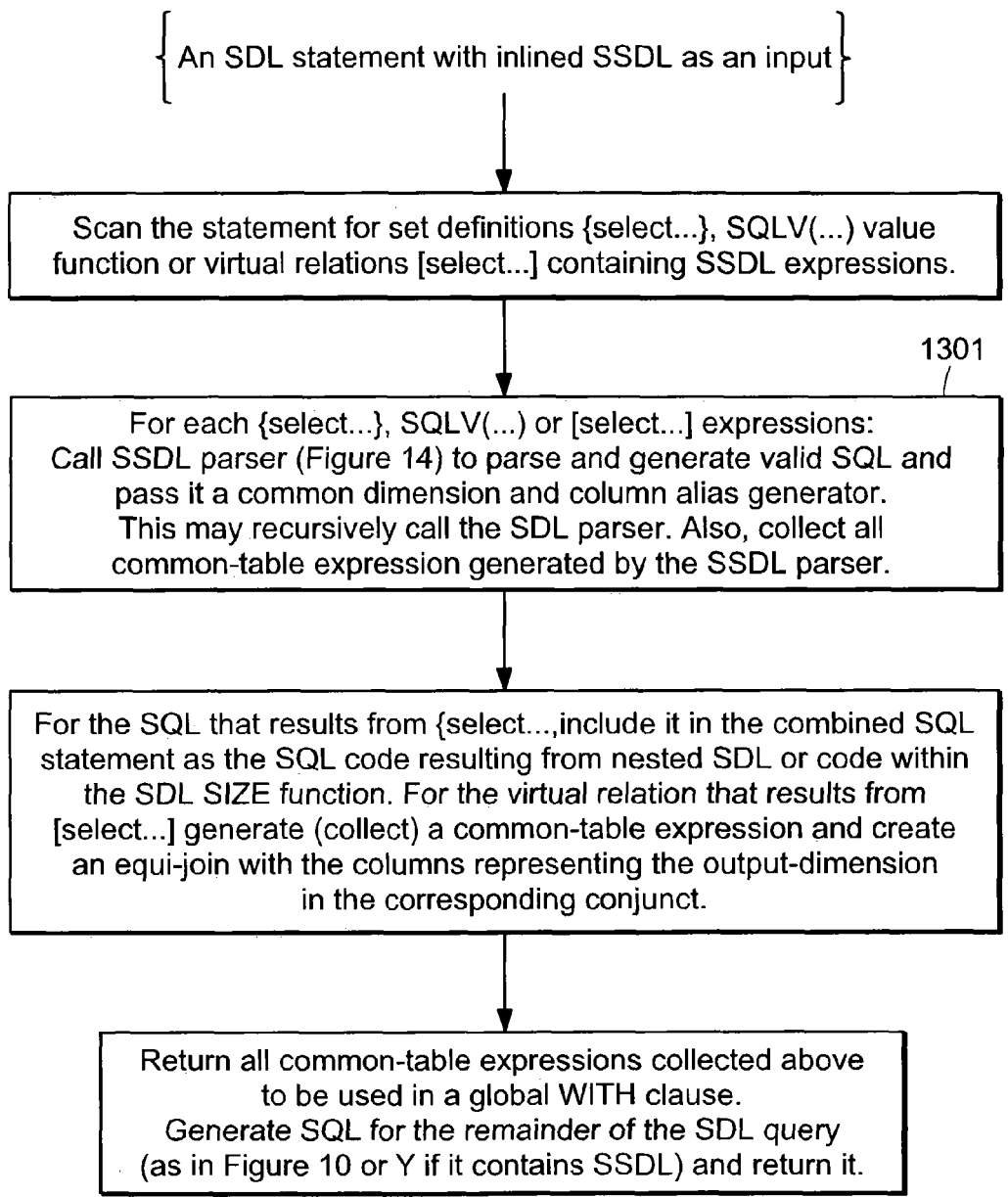
FIG. 13 is a block diagram describing additional steps required for parsing SDL statements with SQL/SSDL inlining.
Figure 14:
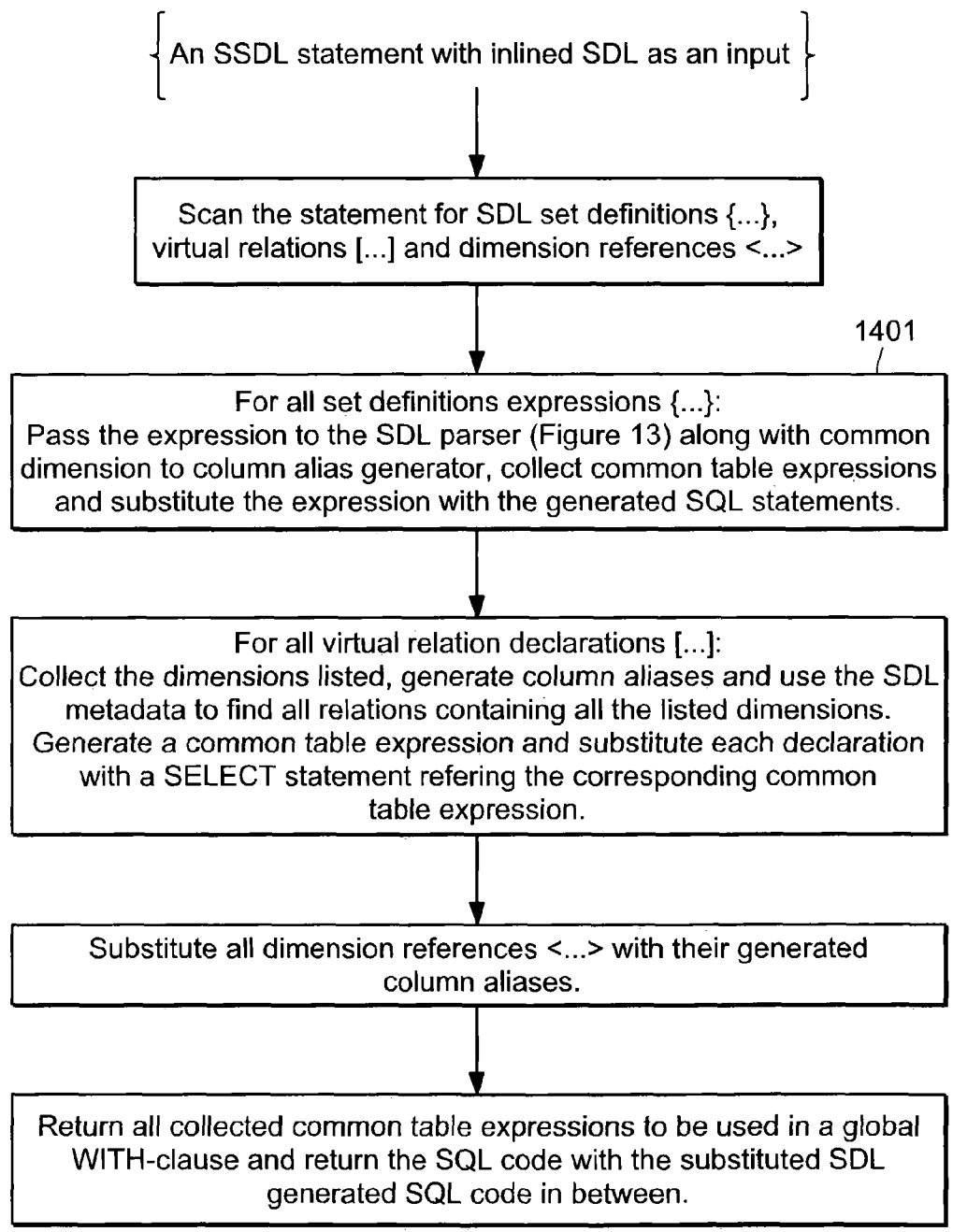
FIG. 14 is a block diagram describing the process of parsing SSDL expressions (SQL/SSDL statements inlined with SDL) and generating the SQL code.

FIG. 13 and FIG. 14 summarize the previous discussion in diagrams that show a preferred embodiment of a high level logic for SDL/SSDL pass-through compiler that supports bidirectional inlining. Worth noting are the steps that collect the SQL code of the inlined statement and the corresponding common table expressions, e.g. 1301 and 1401. These two steps are the cause for double-recursion in the compiler.

Default Dimension Prefix

In many scenarios it can be useful to view dimensions as attributes of complex objects. In such cases it can often be intuitive to arrange the dimensions into a folder hierarchy, such that all the attributes for a given object fall into the same folder. Attributes of different objects would then have different parent folders. If the names of the dimensions reflect this folder hierarchy, then all the dimension attributes in the SDL expressions will repeat the hierarchy structure. This leads to unnecessary long syntax. Default dimension prefixing is a special namespace technique intended to shorten the SDL syntax and make it more readable at the same time.

Let's take an example of SDL expressions with and without using default dimension prefixing. Consider the following expression:

{obj1.id|obj1.a1> × OR [obj1.a2=y AND
    obj1.a3=0]}

Here the dimension a0 represents the ids (identifiers) of the objects. By using default dimension prefixing the above will look like this:

obj1::id|a1> × OR [a2=y AND a2=0]}

Thus, by using double colon "::" after the dimension prefix obj1, the invention makes obj1 the default prefix of all the dimensions (attributes) that belong to relations with the output-dimension.

Consider now an example with a nested set:

{obj1.id|obj1.a1> × AND obj1.a2 IN
    {obj2.a0|obj2.a1>z}}

This can be rewritten using default dimension prefixing as:

obj1::id|a1> × OR a2 IN {obj2::a0|a1>z}}

Notice that the clause a1>x refers to a different dimension than the clause a1>z, i.e. they refer to obj1.a1 and obj3.a1 respectively. Thus, the nested set has a different namespace than does the outer-set.

Sometimes, it may be desired to refer to dimensions outside the current namespace. There are two mechanisms to provide such support. First, if the dimension name that is generated by applying the default prefix is not existent in the metadata, it could be looked up in the global namespace without the dimension prefix. Alternatively, in the spirit of naming conventions used for file names in most file systems, it is possible to use backslash dot-notation to refer outside the default-scope, i.e. "\dim" or ". . . \dim". It should be noted that default dimension prefixing has minimal impact on the SDL compiler and it mostly impacts the metadata manager, i.e. if the parser can provide the metadata manager the namespace, based on the prefix on the current output-dimension, the metadata manager can be modified to recognize the dimensions based on the rules specified above.

Default dimension prefixing can also be used to generate shorter syntax for virtual relations in SSDL. As an example, consider:

select * from [obj1.id, obj1.al]

This can be made equivalent to:

select * from [obj1::id, a1]

Other equivalent syntaxes are also possible such as:

select * from obj1:: [id, a1]

or simply select * from obj1[id, a1]

A corresponding notation could then apply for records within SDL expressions, e.g.:

{obj1.id|obj1.a1> × OR obj1[a2=y AND a2=0]}

It is emphasized that the exact syntax is not really the issue here but the concept of using namespaces within SDL and SSDL.

Template Functions in SDL

The fact that SSDL is a language that combines the metadata of SQL and SDL and has all the expressive power of SQL, gives a lot of flexibility in terms of developing advanced functions into the SDL language. Applicants will refer to these functions as template functions because, during SDL compilation, they are expanded into SSDL code before the final compilation of the SDL code. There is one thing that makes these SDL template functions unique and that is the notion of context, i.e. they can be defined in terms of parameters that are not really part of the input parameters or constraints. The best way to describe this is to take an example.

Consider the following SDL statement:

{gene::id|func=:gpcr AND OVERLAPS({snp::
    id|nonsilent})}

This query is supposed to find all genes that overlap with SNPs that are of type nonsilent. The definition of the OVERLAP template function assumes certain naming conventions, i.e. that spatial positions of genes and SNPs are stored as (gene.id, gene.start, gene.stop) and (SNP.id, SNP.start, SNP.stop), respectively.

The compilation of the template function results in the following SDL statement:

gene::id|func=:gpcr AND [select G.<gene.id>from [gene::
id, start, stop] as G, [snp::id, start, stop] as S where
S.<snp.id>IN { snp::id |nonsilent } and SQLOVERLAPS
(G.<gene.start>,G.<gene.stop>,S.<snp.start>,S.<snp.stop>)
=1]

Here the OVERLAP statement has been replaced with an SSDL code using the virtual relation approach. Also notice the virtual relation labeled as G that refers to gene::id, although there is no mention of gene::id within the parameters in the OVERLAP SDL template function. This is what the Applicants refer to as the unique context feature of the template functions (somewhat similar to the "this" keyword in object-oriented languages). Another way to look at this is the "implicit constraint" nature of SDL, i.e. gene.id could have been passed to the template function, however that would have resulted in longer syntax. Instead the invention allows the template function definition to refer to a context. There are many ways to define the terminology for this.

The present invention proposes the following:

OVERLAP(SDL-set @1):=[select G.<OUTDIM(@this)
>from [PREFOUTDIM(@this), start, stop] as G, [PRE-
FOUTDIM(@1), start, stop] as S where S.<OUTDIM(@1)
>IN @1 and SQLOVERLAPS(G.<PREFIX(@this).start>,
G.<PREFIX(@this).stop>,S.<PREFIX(@1).start>,
S.<PREFIX(@1).stop>)=1]

Both @this and @1 refer to sets, the set in which the OVERLAP template is used and the set that is the input to the OVERLAP template function, respectively. OUTDIM( ), PREFIX( ), and PREFOUTDIM( ) are macros that are easily understood by comparing the definition of OVERLAP with the code in the previous example. Note that the function SQLOVERLAPS needs to be defined in the RDBMS 102.

Take one more example of a template function that also detects an operator and a parameter:

{gene::id|NUMOVLAPS({snp::id|nonsilent})>10 AND chrom=1}

This query is meant to find all genes that overlap with more than 10 nonsilent SNPs. In the present invention, definition for this template function would be:

NUMOVLAPS(SDL-set @1) SDL-relop @2 SDL-calc-expr @3:=[select G.<OUTDIM(@this)>from (select G.<OUTDIM(@this)>from [PREFOUTDIM(@this), start, stop] as G, [PREFOUTDIM(@1), start, stop] as S where S.<OUTDIM(@1)>IN @1 and SQLOVERLAPS (G.<PREFIX(@this).start>, G.<PREFIX(@this).stop>, S.<PREFIX(@1).start>, S.<PREFIX(@1).stop>)=1) GROUP BY S.<OUTDIM(@1)>HAVING count (G.<OUTDIM(@this)>) @2 @3]

The compilation of the template function results in the following SDL statement:

{gene::id|[select G.<gene.id> from (select G.<gene.id> from [gene::id, start, stop] as G, [snp::id, start, stop] as S where S.<snp.id> IN {snp::id|nonsilent} and SQLOVERLAPS (G.<gene.start>, G.<gene.stop>, S.<snp.start>, S.<snp.stop>)=1) GROUP BY S.<snp.id> HAVING count (G.<gene.id>)>10]}

The relational operator, @2, and the calculated expression, @3, are shown in bold in the final SDL code, just for clarification. Notice that the same SQL function is being used as in the previous template function. As a final remark, the present invention describes only two basic types of template functions. The main novelty is the use of the context in the compilation of the statement and the use of SSDL to merge SDL with SQL code.

Primary Dimension and Default Output-Dimension

Another technique for creating a shorter syntax, that is related to default dimension prefixing, is default output-dimension. It has been mentioned in the above that the SDL server or the SDL editor can be configured in such a manner that if output-dimension is omitted from the set declaration, the system 100 will use a predefined default output-dimension. This concept can be generalized such that it applies also to nested-sets and SDL sets defined in SSDL. Indeed, this matter touches a subtle point in the definition of the SDL language and the blurry difference between domains and dimensions (primary dimensions). As above, this is explained through examples. Reference is made to relation1, table 300 of FIG. 3, which defines demography and genealogy relationships for individuals (pids).

Consider now the definition of all male individuals that have long-lived mothers (assume dod larger than today for those who are not already dead):

{pid{sex=:male AND mid IN{pid|[dod-dob>90]}}

This query is valid because IDs of mothers (mid) are of the same domain as IDs of individuals (pid), i.e. their comparison makes sense. However, in a normal data schema, it makes most sense to let all attributes for individuals be in relations that include the pid dimension. Thus, although pid and mid are both equivalently valid dimensions of the same domain, it can be said that the dimension pid is the primary dimension of the domain it belongs to, e.g. ID in 305. In general, one can therefore add to the metadata for domains a name of a primary dimension for any given domain. One can further argue that it is more mathematically correct to specify output-domain as compared to output-dimension in a SDL definition. The example above would therefore be:

ID|sex=:male AND mis IN{ID|[dod-dob>90]}}

There are other things that are elegant in this model, such as the definition of the "universe" that is needed for compiling expressions with negations. With output-domains, the "universe" is simply a set (table, view or materialized view) with all values for the domain. For each domain, this definition set could be the union of all elements belonging to dimensions of its domain. This union can be maintained dynamically using materialized views. With regard to set-definition, this invention makes no distinction between a domain's primary dimension and the domain itself. Thus the present invention defines a mechanism to associate a primary dimension to a domain and a relation that defines its "universe", e.g. two additional columns in table 305. By the same token, the default dimension prefix, mentioned in previous section, can be thought of as default domain prefix.

The main reason why the original language specification talks about an output dimension instead of output-domain is that it gives more flexibility (at the sacrifice of mathematical elegance). Consider for instance the problem of defining a set of all fathers that have more than two children based on the relations in FIG. 3:

{fid|count(pid)>2}

This set is impossible to define based on the dimension pid, given only the relations in FIG. 3. In order for that to be possible, one would need to have a relation that defines a reciprocal relationship to that of 300, e.g. relation with children (pid, cid). Then the above query would become:

pid|sex=:male AND count(cid)>2}

In other words, all individuals that are male and have more than 2 children are selected. With a proper setup of SDL metadata it should be possible to define this reciprocal relation without any actual materialization of data using the fact that more than two dimensions can refer to the same SQL columns. Clearly, one can argue that with the use and definition of a primary dimension, a primary output-dimension is equivalent to an output-domain.

The initial reason for bringing up the discussion about primary dimension was the notion of a default output-dimension for nested sets. Given a dimension of a particular domain that is constrained on a nested set, the output of that nested set must be of the same domain. Now further assume that unless specified otherwise, the default output-dimension of a nested set is the primary dimension of the domain that corresponds to the dimension that is constrained by the nested set. The example above could therefore be written as:

{pid|sex=:male AND mid IN{[dod-dob>90]}}

Furthermore, a default dimension prefix can be assigned to any primary dimension previously. Then the following two definitions are equivalent:

{obj1::id|size> x OR hasobj2 IN{obj2::id|size>z}} and

{obj1::id|size> x OR hasobj2 IN{size>z}}

Figure 15:
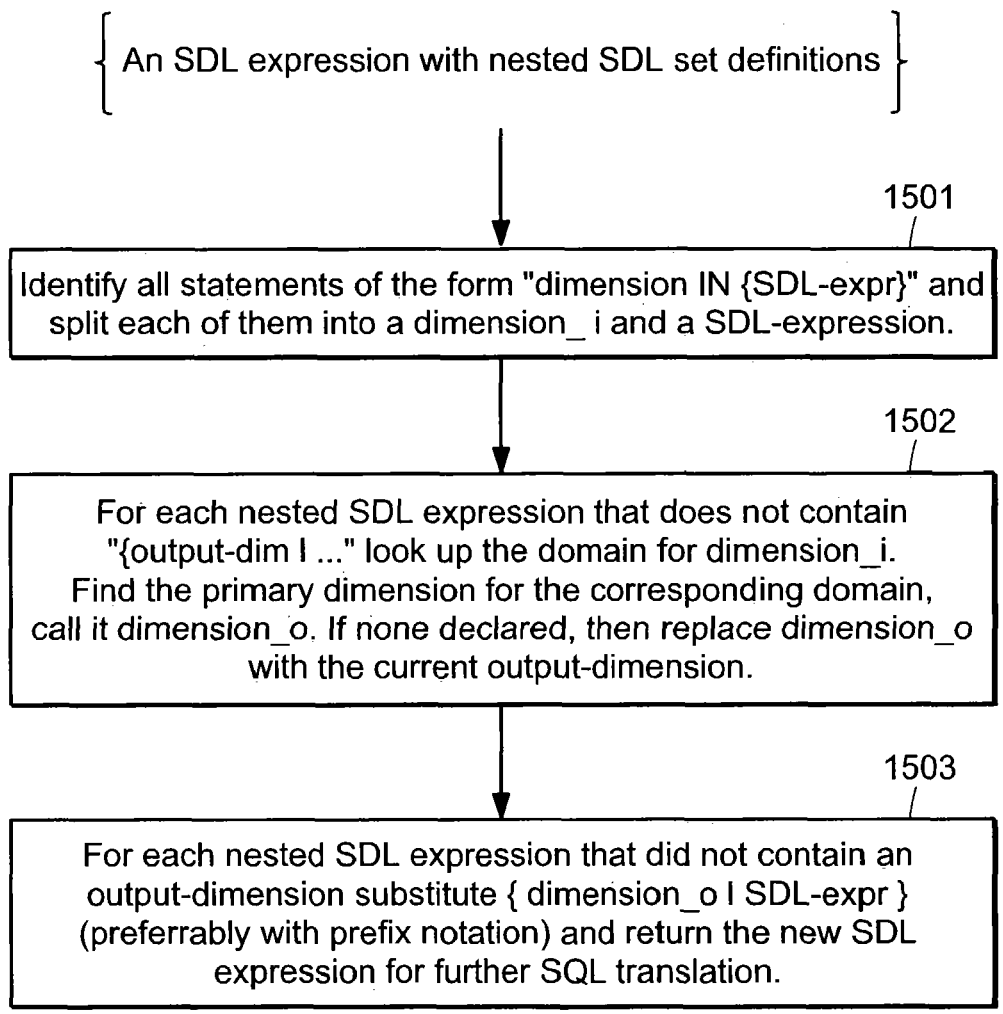
FIG. 15 is an overview of the default dimension logic.

Thus, by default the nested set defines a set of objects of type obj2 whose size is larger than z. Note that the domain type of dimension obj1.hasobj2 is the same as that of dimension obj2. In FIG. 15, it is shown how preprocessing steps can be used to implement default output-dimension, without modifying any of the earlier logic in the SDL compilation. Step 1501 identifies all nested SDL definitions. In 1502, for each nested set that does not explicitly define an output-dimension, a proper output-dimension is found. Finally, in 1503 the definition of the nested set is replaced with a new nested set that explicitly defines an output-dimension.

Virtual Dimensions

This section discusses yet another technique used to provide sparse and readable syntax. Consider if the last example in the previous section were written as:

{obj1::id|size> x OR hasobj2.size>z}

Here a constraint based on a nested set has been replaced with a regular constraint based on a "virtual dimension". Similarly, let's review the genealogical based query in the previous section:

{pid|siex=:male AND mid IN{[dod-dob>90]}}

This could be written as:

{pid|sex=:male AND[mid.dod - mid.dob>90]}

Alternatively, a different separator (C++ stylish) could be used rather than than a dot in the virtual dimensions, e.g.:

{pid|sex=:male AND [mid->dod - mid->dob>90]}

The present invention makes this possible with the definition of a primary dimension for domains and the concept of a virtual dimension.

Figure 16:
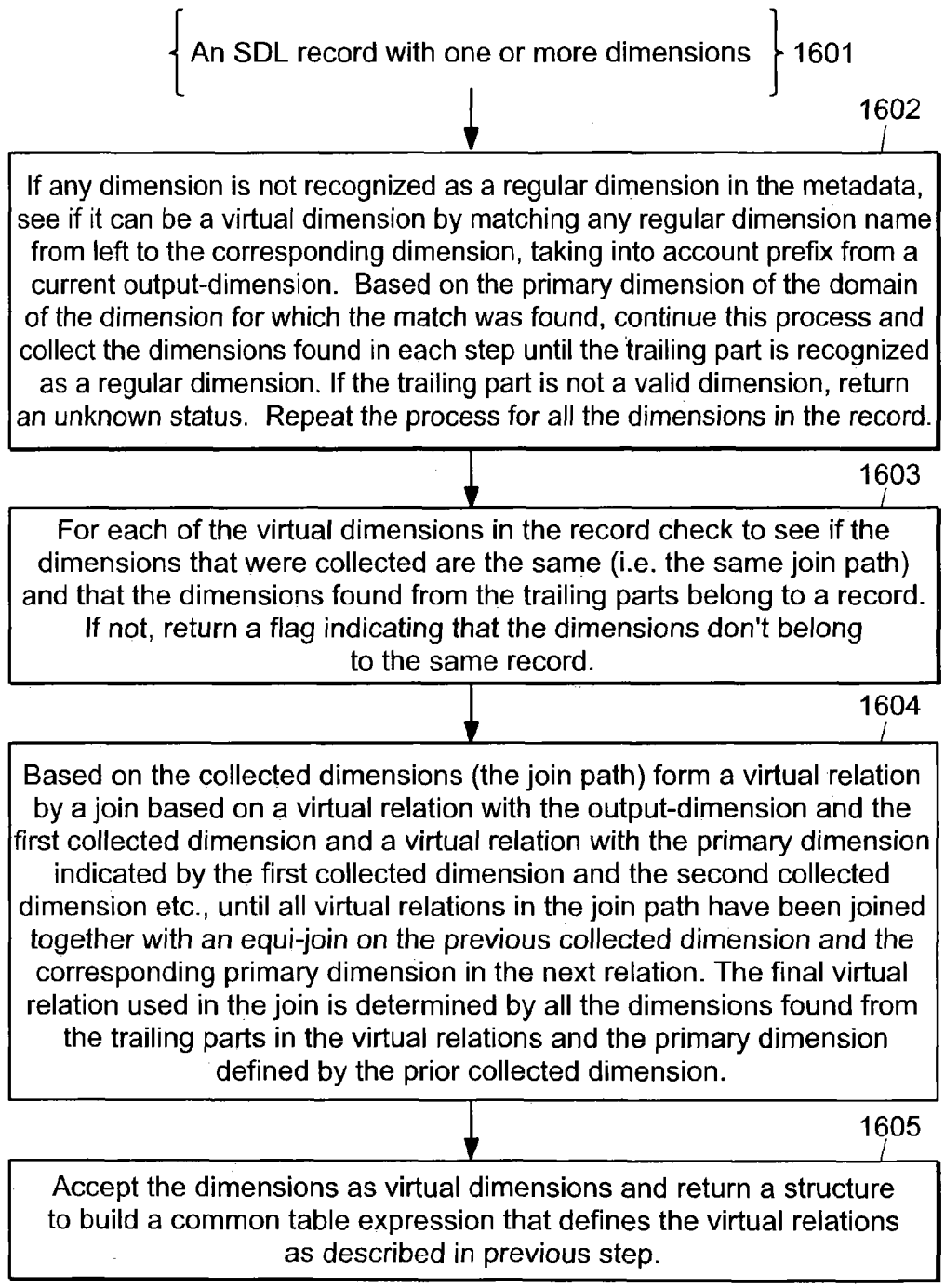
FIG. 16 is an overview of the virtual dimension and virtual relation logic.

FIG. 16 defines the process for determining if a dimension is a virtual dimension and finding (generating on the fly) the corresponding virtual relation for it. The input 1601 is a record with multiple dimensions, including the output-dimension. Note that it is necessary to treat many dimensions simultaneously for the purpose of determining if the "virtual record" is legal.

According to step 1602, names of regular dimensions override virtual dimensions (this allows virtual dimensions and the corresponding virtual relations to be materialized). If a dimension name is not recognized as a regular dimension it may be a virtual dimension. To determine this, a recursive algorithm that matches regular dimension names is used. The algorithm tries to match the left part of the given dimension name with existing dimension names that belong to relations with the corresponding output-dimension (taking into account dimension prefixes). Based on the match, the algorithm continues to try to match the rest of the dimension name by using dimension names that belong to relations with the primary dimension of the domain of the dimension found in a previous match, again taking into account dimension prefixes. This process continues until the whole input dimension name has been matched fully. If the input dimension cannot be fully matched, it is not a legal virtual dimension. This type of match is done for each input dimension in the record and information about all the dimensions that matched are collected, i.e. the path.

Step 1603 checks to see if the virtual dimension can be enclosed in the same record. For this to be true, the dimension path, up to the last dimension part, has to be the same as the dimension matching the so-called trailing parts in the virtual dimension names that belong to a record (relation).

If the virtual dimensions are all valid together, step 1604 generates the corresponding virtual relation by forming a join according to the path found earlier (see also examples).

Finally, in 1605 the dimensions are accepted and a structure for generating a common table expression for their relation is returned.

To clarify this complex definition, it is best to elaborate more on the examples above. Based on FIG. 3, the relation mid.dob (or mid->dob) is not recognized as a regular dimension. Also, dob is a name of another dimension (there is no prefix in this example) that can be joined with the primary dimension of its domain, e.g. pid, according to the definition specified in FIG. 16. This can be written in SSDL as:

[pid, mid.dob]=select A.<pid>, B.<dob>from [pid, mid] as A, [pid, dob] as B where A.<mid>=B.<pid>

Similarly, for an example where there is a default dimension prefix:

[obj1.id, obj1.hasobj2.size] =select A.<obj1.id>, B.<obj2.size>from [obj1.id, obj1.hasobj2] as A, [obj2.id, obj2.size] as B where A.<obj1.hasobj2>=B.<obj2.id>Here, obj2.id is the primary dimension of the domain of the dimension obj1.hasobj2. Notice that obj2 does not appear between hasobj2 and size because of the prefix elimination.

A virtual relation based on multiple nesting, e.g. mid.fid.dob can also be defined as:

[pid, mid.fid.dob]=select A.<pid>, B.<dob>from [pid, mid.fid] as A, [pid, dob] as B where A.<mid.fid>=B.<pid>

Here a virtual relation containing a virtual dimension is used to define the join, i.e. a recursive definition. This can be further expanded as:

[pid, mid.fid.dob]=select A.<pid>, C.<dob>from [pid, mid] as A, [pid, fid] as B, [pid, dob] as C where A.<mid>=B.<pid>and B.<fid>=C.<pid>

As a remark, it is the part of the name in the virtual dimension prior to the last separator that defines the join needed for the corresponding relation. Each virtual relation that is defined in terms of virtual dimensions has to have a unique and unambiguous join-path.

Lets take another look at the earlier example:

{pid|sex=:male AND [mid.dod - mid.dob>90]}

Here the record-operator emphasized the fact that both mid.dod and mid.dob have to come from the same virtual relation. Thus, according to the present invention convention for noting the virtual relations in SQL:

$V_{pid,mid.dob,mid.dod}$=[pid, mid.dob, mid.dod]=select A.<pid>,

B.<dob>, B.<dod>from [pid, mid] as A, [pid, dob, dod] as

B where A.<mid>=B.<pid>

Virtual dimensions can be implemented without changing anything in the parsing architecture of the SDL compiler if the metadata manager 17 has built in logic to handle them. This is somewhat a similar approach as current implementation uses to handle dimension aliases as discussed in the next section. Materialization of virtual relations can also be implemented into the metadata manager in connection with virtual dimensions, i.e. the view definitions above that are needed to declare the relations that contain the virtual dimensions can be materialized.

Support for virtual dimensions and default output-dimension of nested sets can be built into the client tools that are used for query composition. This support Applicants refer to as nested-dimension browsing and it will be discussed in a later section on the client components.

Dimension Aliases

Dimension aliases can be defined in the SDL metadata, i.e. a dimension can be recognized under different names and thereby different dimension names can produce the same dimension fingerprint. Note that the same table column can also be associated with more than one dimension, however, that is slightly different than dimension aliases since they apply also to virtual relation creation on SSDL level. The metadata and the metadata manager must be modified such that dimension names and its aliases produce the same fingerprint. There are many ways to do this, however, to avoid combinatorial complications from multiple dimensions and multiple aliases when searching for corresponding relations, it is best to use one main dimension name for lookup of the relations. Known techniques for such handling of aliases are suitable. Later discussed however is how aliases can be useful in mapping objects to relations (not to be confused with object-relational extension in the next section) as well as for federation.

Object-Relational Extensions

SDL is easily extended to use object-relational features such as those provided in Informix UDB (Illustra), DB2, and Oracle9i. An SDL domain can be defined in terms of extended data types (objects). Similarly, methods that belong to the extended data type can be made accessible visually (in a tree browser) as well as syntactically in the same manner as attributes. Furthermore, an operator can be assigned to domains in the same manner as in languages such as C++, i.e. operator overloading. Thus, the "=:" operator in SDL could indeed be overloaded for other data types. Consider a data type called "segment" that stores start, stop, and chromosome. Visually, in a GUI folder hierarchy, these methods could be shown as leaves under the node segment, with empty oval brackets appended, and possibly with information on input parameters. Their use in an SDL statement could be:

```
{gene::id|func=:gpcr AND [segment.chrom()=1 AND
    segment.start()>10000]}
```

This example is self-explanatory in the light of previous examples. If an object-relational method for evaluating overlap between segments exists, the overlap examples in previous sections could be written as:

```
{gene::id|func=:gpcr AND $x:=segment AND
    SIZE{snp::id|nonsilent AND segment.overlaps
    ($x)}10}
```

Here it is assumed that both (gene.id, gene.segment) and (snp.id, snp.segment) exist. Notice that the binding variable, $x, is of object-relational type.

XML Data and SDL Queries

Next shown is how SDL can be used to in connection with XML data. By proper shredding of the XML data tree into relations, SDL can be used to search for objects such as books, based on the attributes that have been defined in terms of XML. Below is given an example based on a document type definition (DTD) found at the XML consortium, www.w3c.org. Consider the following definition of a book:

```
<!ELEMENT book (title, (author+|editor+), price)>
<!ATTLIST book year CDATA #REQUIRED>
<!ELEMENT author (last, first)>
<!ELEMENT editor (last, first, affiliation)>
<!ELEMENT title (#PCDATA)>
<!ELEMENT last (#PCDATA)>
<!ELEMENT first (#PCDATA)>
<!ELEMENT affiliation (#PCDATA)>
<!ELEMENT price (#PCDATA)>
```

There are many ways to map XML to relational data structures (e.g. see reference F. Tian et.al. "The Design and Performance Evaluation of Alternative XML Storage Strategies", ACM Sigmod Record, vol. 31(1), 2002). This discussion is not a formal discussion on how XML can be mapped to relations, but more to serve as examples of how a DTD can be mapped to a relational structure and corresponding dimensions in order to demonstrate how SDL can be used with XML. For instance one could use the following relations in one embodiment:

(bookid, title, year, price), (bookid, author.last, author.first), (bookid, editor.last, editor.first, editor.affilation)

With these virtual relations a user could for instance define the following SDL queries in order to search for books in libraries:

```
{bookid|[title="*SQL*" AND year>1900] AND
    (author.first="John" OR editor.first"John")}
```

As mentioned earlier, the record operator could be omitted if it is assumed that each book only has one title. The SDL system could automatically enforce the record locking (for increased efficiency) if that relation has a primary key or if title and publisher are declared to belong in a dimension structure. Another example from this is worth considering, where the fact that a book can have many authors is used in the query:

```
{bookid|[author.first="John" AND $x:=author.last]
    AND [author.last=$x AND NOT
    author.first="John"]}
```

This query would find all books that have two or more authors with the same last name and one of these authors with the first name of John. In a typical setup where the system is aimed at providing the user with a mechanism to find books, the user would not have to specify the output-dimension, book.id, or the set curly-brackets.

The schema above is constructed based on the fact that queries will be made to select books. Thus, it has been denormalized in some sense to reflect that. This is the inherent nature of XML, i.e. the hierarchical structure of XML means that one has to make a choice. It is, however, well known that proper relational database design gives a lot of flexibility with regard to update of data, speed and ability to pose arbitrary queries. Here Applicants suggest different relations for the above DTD, e.g.:

r1: (book.id, book.title, book.year, book.price), r2: (book.id, book.author): (author.book, author.id), r3: (book.id, book.editor): (editor.book, editor.id), r4: (author.id, author.first, author.last), r5: (editor.id, editor.first, editor.last, editor.affilitation)

Applicants have labeled the relations to indicate names of possible SQL relations/tables that store the data. Notice also that Applicants map two distinct virtual relations to the tables r2 and r3, i.e. different dimension combinations. The reason is that these are relations that store relationships between objects and the purpose of mapping them two times will become clear as this discussion continues. In this schema, assume that book.author and author.id are of the same domain and that author.id is the primary dimension. Likewise, book.editor and editor.id are of the same domain.

The following queries are now possible:

{book::id|[title="*SQL*" AND year>1900] AND
  author IN

{first="John"}}=

{book::id|[title="*SQL*" AND year>1900] AND author.first="John"}

With the alternative mapping of r2 a set of authors can now be easily defined, e.g.:

{author::id|first="John" AND book
  IN{title="*SQL*"}}

One can argue that to make these queries even more readable, the dimension/attribute author.book should be called author.haspublishedbook etc. Proper naming of dimensions is an important subject but is outside the scope of this discussion. It is now worthwhile to show an example that uses virtual dimension notation, as compared to nested sets.

{author::id|first="John" AND book.title="*SQL*"}

All of these variants are automatically handled by the SDL systems from the same relations, given that it supports default dimension prefixing and output dimension as well as virtual dimensions.

As a final example of the flexibility of SDL in terms of short and yet powerful queries on XML data that has been mapped to relational structure consider the problem of finding all authors that have published more than ten books or have been the single author of a book:

{author::id|count(book)>10 OR book IN{count(author)=1}}

The aim of this section was to show that XML data can be mapped to relational data structures, which are then easily used through SDL to search for various types of objects. In the next section, the related issue of the use of searching for objects that have been mapped through Object-Relational mapping to a relational schema is considered.

Objects, Relational Mapping and SDL Queries

Next, consider how SDL can be used as a query language for objects. The subject is very similar to the mapping of XML, however, this discussion will also consider inheritance of objects. The aim with this discussion is not to cover this subject in-general, but to give-a simple example in order to demonstrate the flexibility that the SDL language and its metadata provide to implement a powerful object-query language. The following example will be very similar to the XML examples, however, the below will use object-inheritance to implement authors and editors, i.e., both authors and editors are object classes inherited from the person class. Some basic class definitions could be the following (in a Java/C++ like syntax):

Class Person {String last, first; };
Class Author : Person {Book books[ ]; };
Class Editor : Person {Book books[ ], String affiliation;
Class Book{String title; Integer price year; Author authors[];
  Editor editors[]};

Object oriented languages provide a mechanism to cast objects, either using object-widening or object-narrowing. By using multiple dimensions for the same table columns (dimension aliases) and multiple domains, it is possible to provide this support in an elegant manner in SDL. Consider the following relations that Applicants use to map the above classes:

r1: (book.id, book.title, book.price),
r2: (person.id, person.first, person.last, person.objtype),
r3: (book.id, book.authors): (book.id, book.persons): (author.books, author.id)
r4: (book.id, book.editors): (book.id, book.persons): (editor.books, editor.id)
r5: (author.id, author.first, author.last, author.objtype="author"): (person.id, person.first, person.last, person.objtype="author")
r6: (editor.id, editor.first, editor.last, editor.affilitation, editor.objtype="editor") (person.id, person. first, person.last, person.objtype="editor")

Worth noting here is that relations/tables r5, that store the attributes of the author objects, and r6 that stores the attributes of the editor objects, are also mapped to the dimensions that represent the attributes of the person objects. Furthermore, for r6, the second dimension mapping only uses three of the 4 columns, since the person object does not have any attribute for affiliation. The second dimension mapping of table r3 and r4 are to support narrowing. An important issue here is that the domains of person.id, author.id, and editor.id are different, although they will have to use the same underlying data type. These dimensions are also defined as the primary dimensions for their corresponding domains.

Like usually this is best explained through examples:

{person::id|first="John"}

This query finds all person objects with the first name of John. In order to evaluate this query the virtual relation of [person.id, person.first] is used. Given the metadata definition defined above, it will find all objects that have been put into relation r2, r5, and r6. To find all the objects for authors with the first name of John the two following definitions would be possible:

{person::id|first="John" AND
  objtype="author"}={author::id|fisrt="John"}

An example of a query that uses the equivalence of widening would be the following:

{book::id|title="*SQL*" AND person IN{person::
  id|first="John" AND objtype="author"}}

Note that person refers here to either an author or an editor. To define object casting that is equivalent to object narrowing, one embodiment maps two dimensions to the same column in relations r5 and r6, (author.id, auth2pers) and (editor.id, ed2pers) respectively. Note that even though the two dimensions in each relation map to the same column, they must be of different domains. This would for instance enable the following query:

{book::id|title="*SQL*" and authorIN{author::
  id|auth2pers IN{person::id|first="John"}}}

It is not necessary to specify the output-dimensions of the nested sets in the above examples, however, it is done here to emphasize the different types of object from each set. Alternatively, this could have been written using virtual dimension notation:

{book::id|title="*SQL*" AND author.auth2pers
  IN{person::id|first="John"}}

This concludes the discussion of how SDL can be used to define sets of objects and how multiple mapping of dimensions to the same tables can be used as a mechanism to implement transparent yet efficient object-inhenitance and object-casting in conventional RDBMS.

SDL Federation

The SDL system 100 provides several mechanisms to deal with federation of its metadata 17. As such, the SDL system does not implement any specific techniques to federate queries but relies on federated RDBMS, such as DB2 DiscoveryLink. Thus, SDL delegates the optimization to the underlying database system. However, the SDL system provides tools to setup a SDL server that is built from other SDL servers, local or remote, by using metadata from the metadata managers of these servers to define the metadata in the new server. A unique feature of the SDL system is that it allows this to be done not only when the new SDL server is defined, but also session dependent for each user that accesses the SDL system. Furthermore, each session can provide its own storage manager, for storage of results and other user dependent data.

There are two main cases where federation of metadata is desirable, i.e. when multiple database instances store equivalent data or when data of different nature are stored in separate servers and relationships between the data enables queries that refer to multiple servers simultaneously. The SDL system 100 provides two different mechanisms to implement federation. The former is referred to as static federation and the latter as dynamic or session dependent federation.

Figure 17:
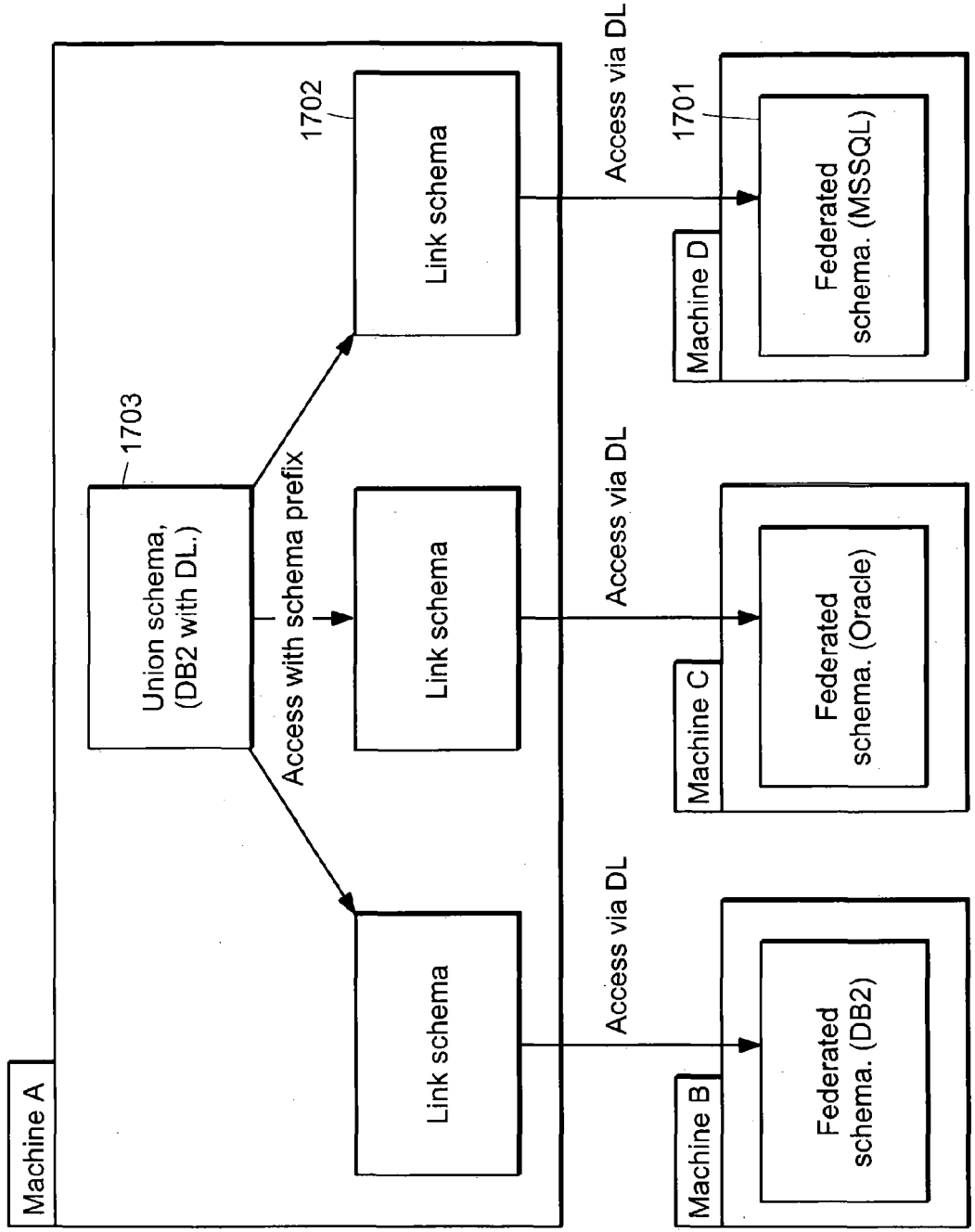
FIG. 17 illustrates a computer architecture for static SDL federation.

Static Federation If two or more SDL servers exist they can be combined using federation technology. The SDL data management tools provide options to define how such federation takes place, i.e. which server and how their metadata is combined. Static federation is achieved with merging and prefixing multiple metadata schemas into a single union schema as illustrated in FIG. 17.

In a typical scenario, a new SDL server is generated on a DB2-DiscoveryLink (DL) server. One or more external (can be internal as well) SDL servers 1701 are specified for federation. These external SDL metadata schemas will have a corresponding link schema 1702 on the DL server. Such link schemas 1702 are implemented by creating nicknames to the necessary metadata tables 17 in the external SDL servers 1701 (instead of DL nicknames, Oracle DB links can be used as well).

The other step in the federation is to combine the dimensions from all the SDL servers 1701, i.e. all the link schemas 1702, into a single SDL metadata schema 1703, the union schema. Often a straightforward copying is not sufficient because there can be conflicts in dimension names between the servers or the dimension attributes may need to be organized in a new manner given new dimension attributes from other servers. To achieve this, the SDL system provides two main mechanisms, i.e. dimension prefixing as well as dimension and domain aliases.

Consider the case where there are two servers, both set up for genes. One stores basic annotation data, and the other stores information on gene expression measurements. In server A, there are the following relations:

(gid, start, stop, chrom, name)
(gid, go_term) and in server B there is the following:
(ugid, name)
(ugid, level, expr)
(expid, tissue, date, condition)

One may now want to combine these dimensions into a new SDL server by specifying a prefix on all the dimensions, e.g. A and B. This would automatically generate the following dimensions:

(A.gid, A.start, A.stop, A.chrom, A.name)
(A.gid, A.gene ontology)
(B.ugid, B.name)
(B.ugid, B.level, B.expr)
(B.expid, B.tissue, B.date, B.condition)

Furthermore, one can define dimension aliases (gid ->A.gid) and (gid ->B.ugid). ote that defining aliases is similar to mapping the same relation multiple times, as in some of the previous examples such as in the section on object-relational mapping, however, it is more convenient if the same dimension appears in multiple relations such as is often the case for primary dimensions. Now query both of these databases, as an example:

{gid|A.name=B.name}

This will generate all genes with the same name in both databases. Similarly, consider:

{gid|A.chrom=:autosom AND A.go_term=:gpcr AND
 [B.level>0.9 AND B.expr IN{tissue{"brain"
 AND date>2000}]}

Both of these queries above would actually result in a federated join. For instance the first query would generate:

select distinct TA.gid_col from TA_gid_name as TA, TB_ugid_name as TB where TA.gid_col =TB.ugid_col;

In the above query, the table names (nicknames more appropriately) reflect the location of the underlying data tables. If in addition one generated two aliases, (name ->A.name) and (name ->B.name), then the following query {gid|name="APO*"} would generate:

select distinct TAB.gid from (select TA.gid_col, TA.name_col as name from TA_gid_name as TA UNION ALL select TB.gid_col, TB.name_col as name from TB_ugid_name as TB) as TAB where TAB.name like "APO%";

Clearly, prefixes and aliases can be used as a simple intuitive mechanism to organize federated SDL metadata. In addition, as brought up in previous sections on pivoting dimensions, relations (in particular those with aliases) could be included into the union schema by introducing an additional server or database dimension whose value reflects the origin of the data tuples. This is easily implemented through a view mechanism on the nicknames and would for instance allow queries such as:

{gid|[name="APO*" AND server="A"]}= {gid|A.name="APO*"}={A.gid|A.name="APO*"}

Dynamic Federation

A novel federation feature in the SDL system 100 is referred to herein as dynamic or session dependent federation. What is meant is that users can specify the federation set-up at runtime. Thus each session in a federated SDL server can have different federation set-up. This capability opens up many new possibilities. With regard to application development, dynamic or session dependent federation setup will allow applications to determine at runtime which SDL compatible data sources it federates. Thus, for instance, session dependent application data can be used within the SDL query tool, as long as the application data has a relational API and the application provides SDL metadata for that data. A relational API to the application data is most easily achieved by storing the given application data in a relational database but relational wrappers can also be defined for data that does not reside within a relational database. Unlike in the static federation, an application that uses dynamic federation defines its metadata by providing the SDL server a handle to one or more SDL schema feature objects, prefixes and aliases (as in the static federation).

Figure 18:
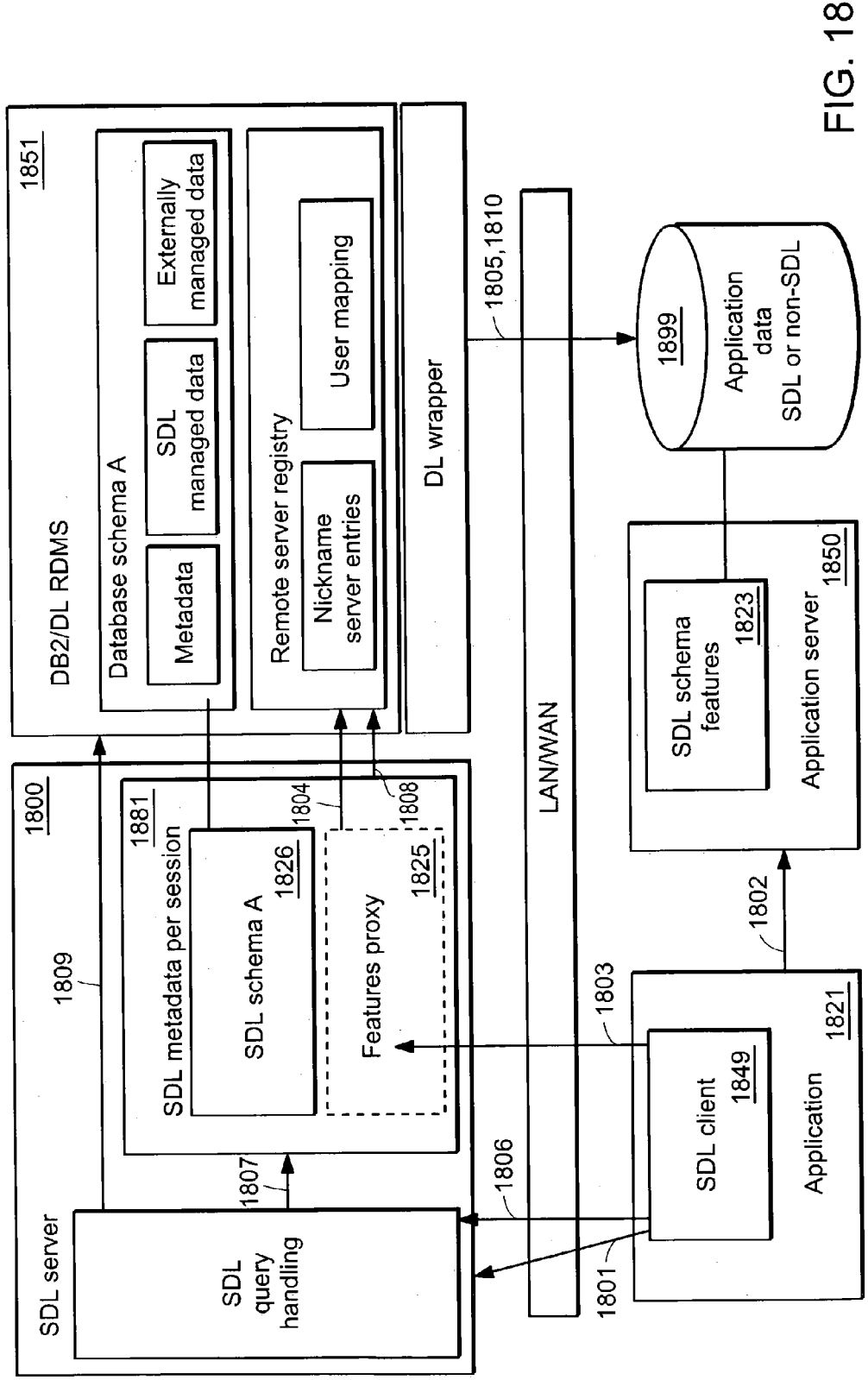
FIG. 18 show interactions and schematic overview in dynamic SDL federation.

FIG. 18 shows a preferred embodiment of an architecture to implement dynamic federation in SDL. An application 1821 with an embedded SDL client 1849 logs into an SDL server 1800 via 1801. Next it (1821) instantiates 1802 an SDL schema feature object 1823 in a local application server 1850 that maps the application data. This data can be persisted in a local SDL server, data in an arbitrary relational database, flat files or even in applications main memory, if appropriate wrappers are used. Once the SDL schema object 1823 has been created (or requested from a local SDL server), it is registered 1803 on the remote SDL server 1800. The metadata session object 1881 on the remote SDL server 1800, which now contains two SDL schema objects 1825 and 1826 (possibly more), lets the remote federated features register themselves 1804 such that the federation engine in the RDBMS 1851 can connect 1805 to the federated data 1899, e.g. if the federated data resides in a RDBMS. Once this has taken place, the SDL client 1849 can start issuing queries 1806 to the SDL system 1800. The SDL system 1800 compiles the SDL statement to an SQL statement 1807 based on the session's total metadata 1881. Nicknames or aliases that have not yet been defined, but are referred to in the SQL statement, are generated on the fly 1808 by the metadata-manager 17. Finally, the SQL statement is executed 1809 and federated appropriately 1810 by the federation mechanism in the RDBMS 1851.

SDL Client Components

Figure 19B:
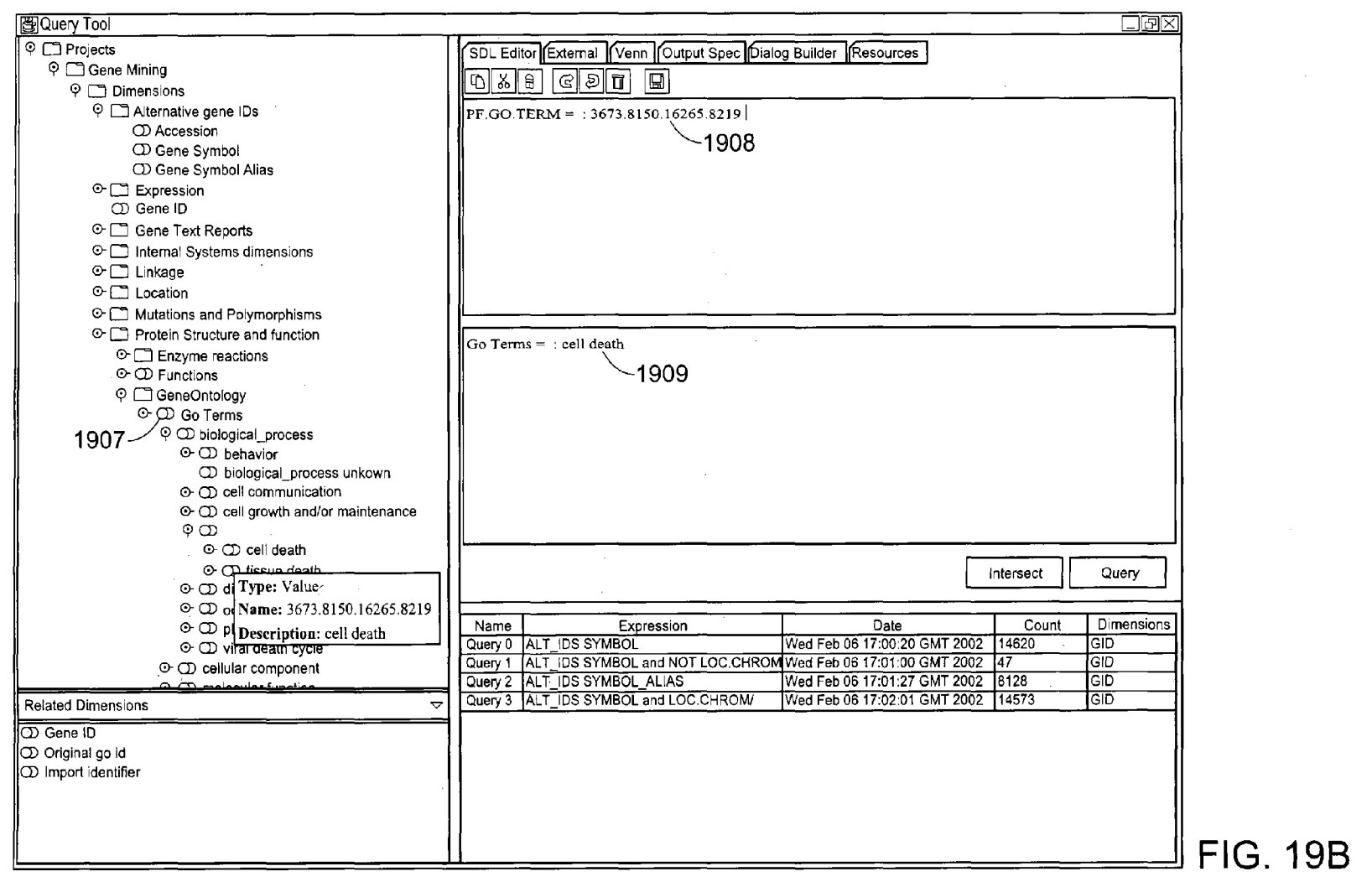

This invention describes several client software components that can be used to facilitate the creation of SDL queries. FIGS. 19A and B show a composite query tool comprised of several independent components. According to FIG. 1, the tool in FIGS. 19A and B can be divided into a data explorer 1900 and 1901 and a query-composer 1903 and 1904. In 1900 one sees a tree-browser that provides an overview of the meta data in the system. In this example, it shows the dimensions presented in hierarchical manner. It could also present the dimensions beneath the corresponding domains or the SQL relations that they belong to or any other system that may be useful for the user to group and classify the dimensions. The window in 1901 shows the dimensions that are related to the selected dimensions in 1902. This window can also be configured to show all the SQL relations that the selected dimension exists in. An SDL syntax aware editor is shown on the right side of FIGS. 19A and B. It is split up into the editing part 1903 that shows the dimensions and a description part 1904 that shows the descriptions of the dimensions that are stored in the metadata. Finally, shown are buttons 1905 for launching the SDL query and a list box 1906 showing information about the sets that have been generated with SDL queries.

For enumerable dimensions, the data explorer 1900 has the unique feature of allowing the user to drill into the domain values that are stored in a corresponding hierarchy, e.g. the gene ontology classification scheme 1907. This enables the user to drag and drop into the editor both the dimension and the corresponding condition on that dimension 1908. The description view 1909 shows the corresponding statement with the description taken from the hierarchy table, e.g. 307 in FIG. 3.

Figure 20B:
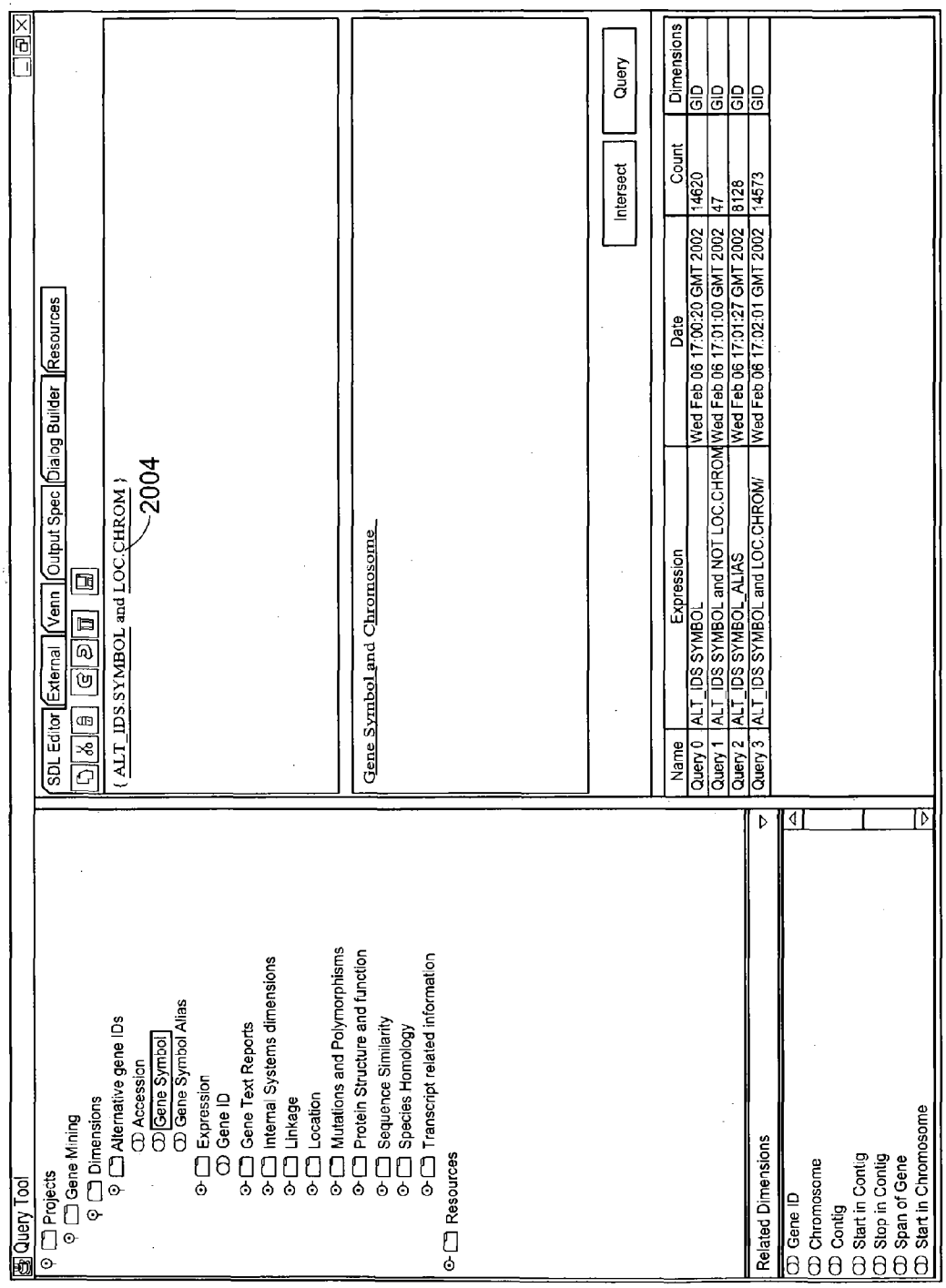
FIG. 20A and B illustrate relation detection assistance in the composite query-tool.
Figure 21A:
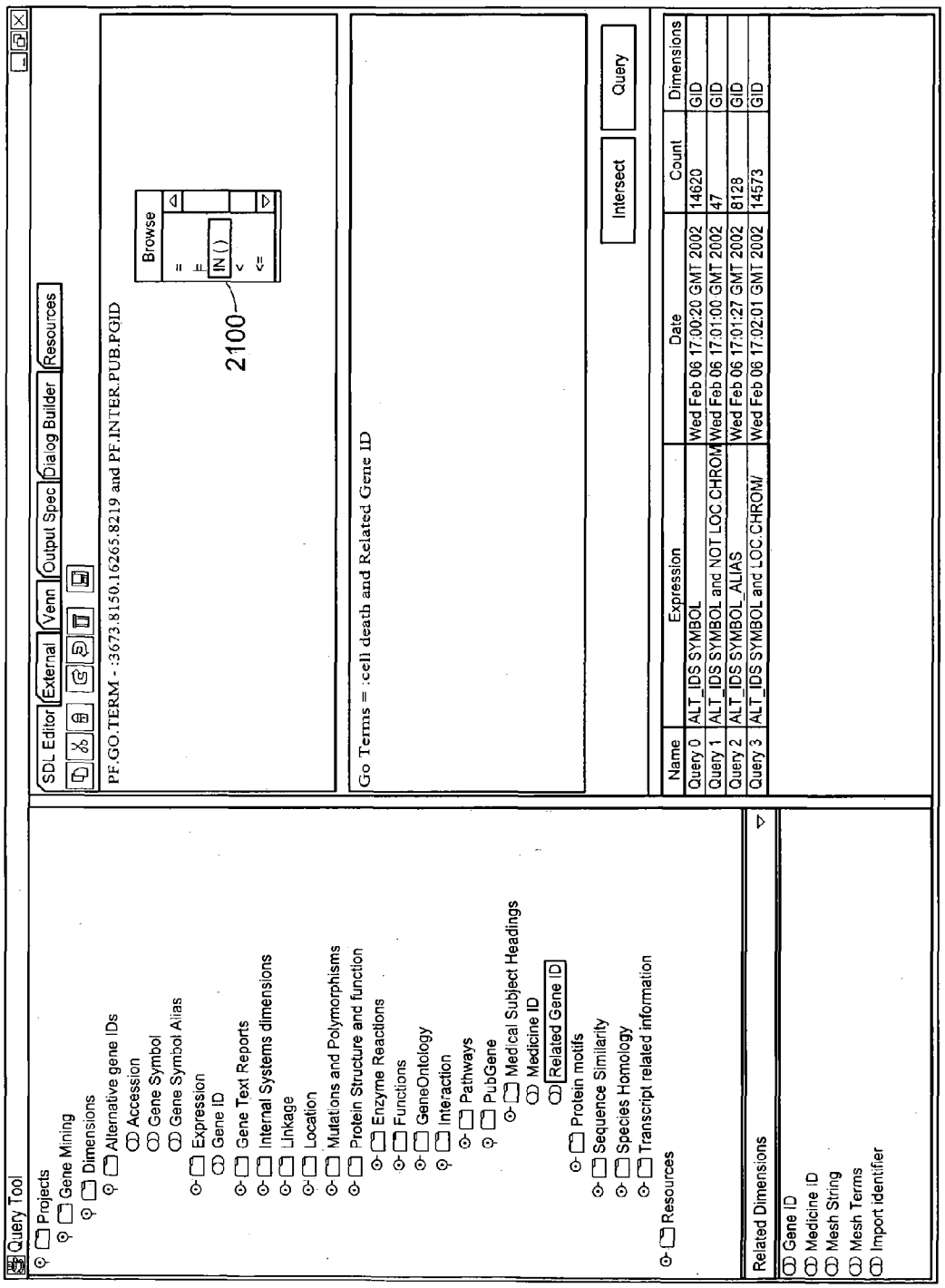
FIGS. 21A and B illustrate SDL keyword and dimension assistance.

The SDL invention users are not required to think about the tables that store the data. However, they need to understand when they can apply the record operator on relations. FIGS. 20A and B show how the composite tool supports that. For the selected dimension, 2000, the view 2001 shows that the attribute "chromosome" exists in a relation with the attribute "gene-symbol". Hence, the user can apply the record-operator as shown in 2002. The editor also warns the user if he does not enclose dimensions that exist in a relation into a record operator 2004, e.g. with underline marks. This does however, not necessarily have to be an error (see the discussion of automatic enforcement of record operator). As shown in FIGS. 21A and B, the editor also has syntax aware support for the insertion of SDL keywords 2100 and dimension and domain values insertions 2101.

Figure 22B:
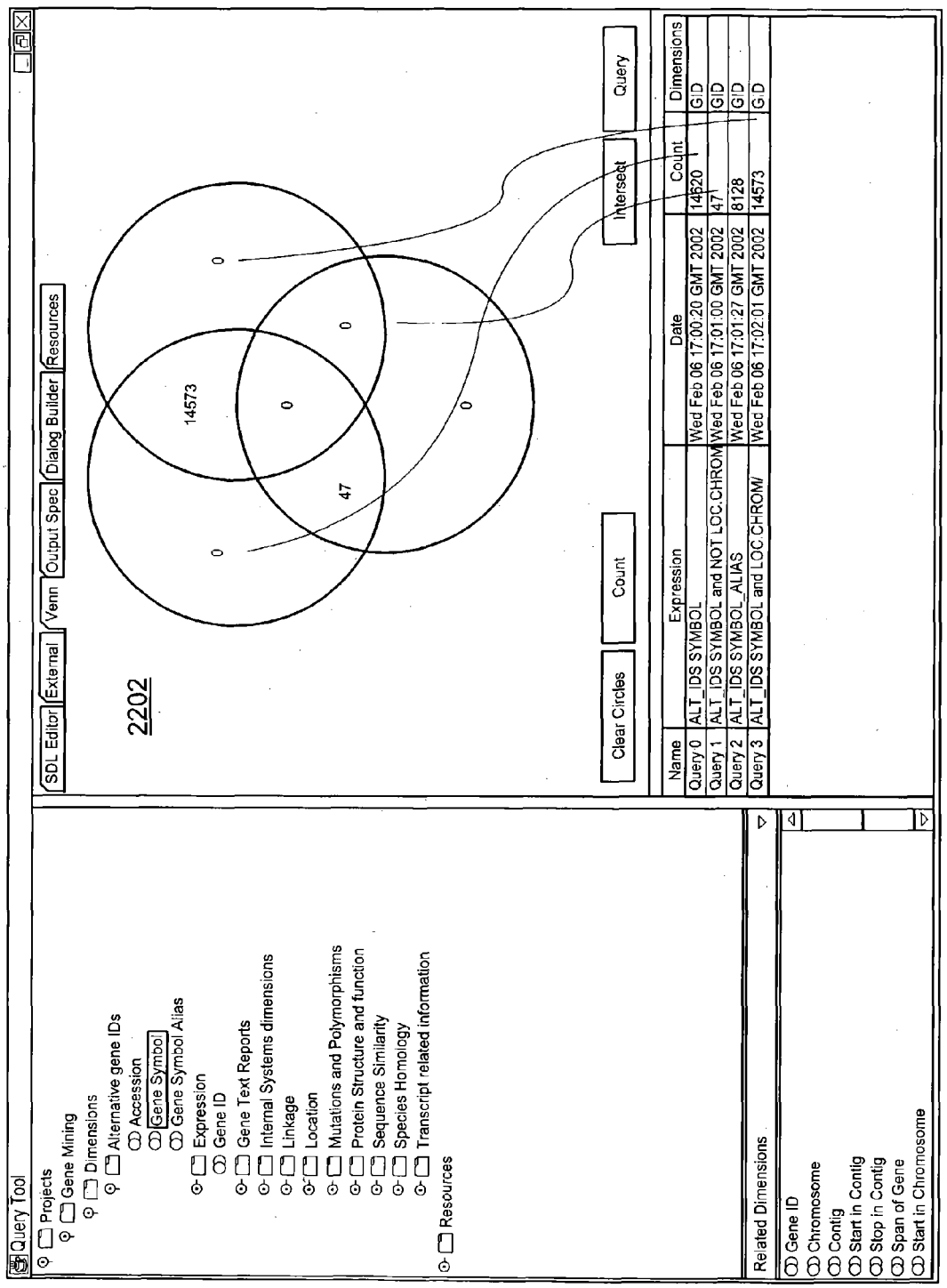
FIGS. 22A and B illustrate SDL queries and set analysis using a Venn-tool.

FIGS. 22A and B show how the editor 1903, 1904 can be configured such that the user does not have to specify either the output-dimensions or the curly-brackets of the set. The expression in 2200 is an example of this and notice that the output-dimension in the nested set can also be omitted if it is the same as the default output-dimension. In this example, the default output-dimension is GID as shown in 2201. The composite query tool provides a Venn tool 2202 that allows sets of the same type to be analyzed. In one embodiment, the Venn tool is generally an automatic SDL query generator.

Figures 23, 23A, 23B:
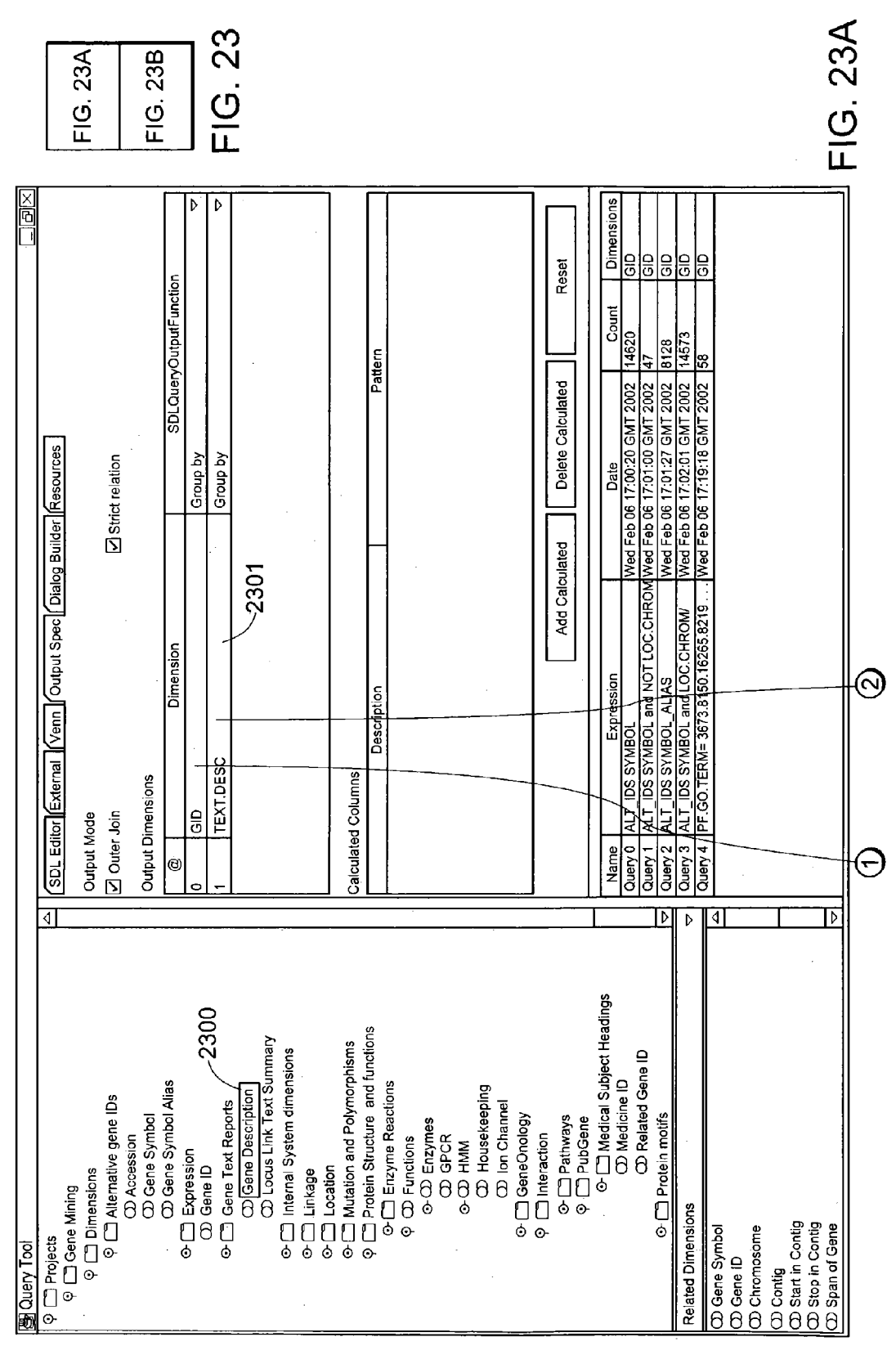

The composite query tool provides a very simple mechanism to specify a report for the elements in the query sets. FIGS. 23A and B show the report output-specification in the preferred embodiment. Actually, the output specification tool is a relation definition tool and the relations generated with it could be registered in the SDL system metadata. However, in the present invention, applicants only consider it for the purpose of generating relations that can be joined with the SDL query sets, in order to provide more information on the elements in the sets. The output specification tool provides drag and drop support and the user selects the dimensions he wants to see together, e.g. GID and TEXT.DESC 2300, and places them in the report, 2301. By a mouse double click on any set in the list box, 1906, a report corresponding to the set and the output spec opens up, 2302.

Figures 24, 24A, 24B:
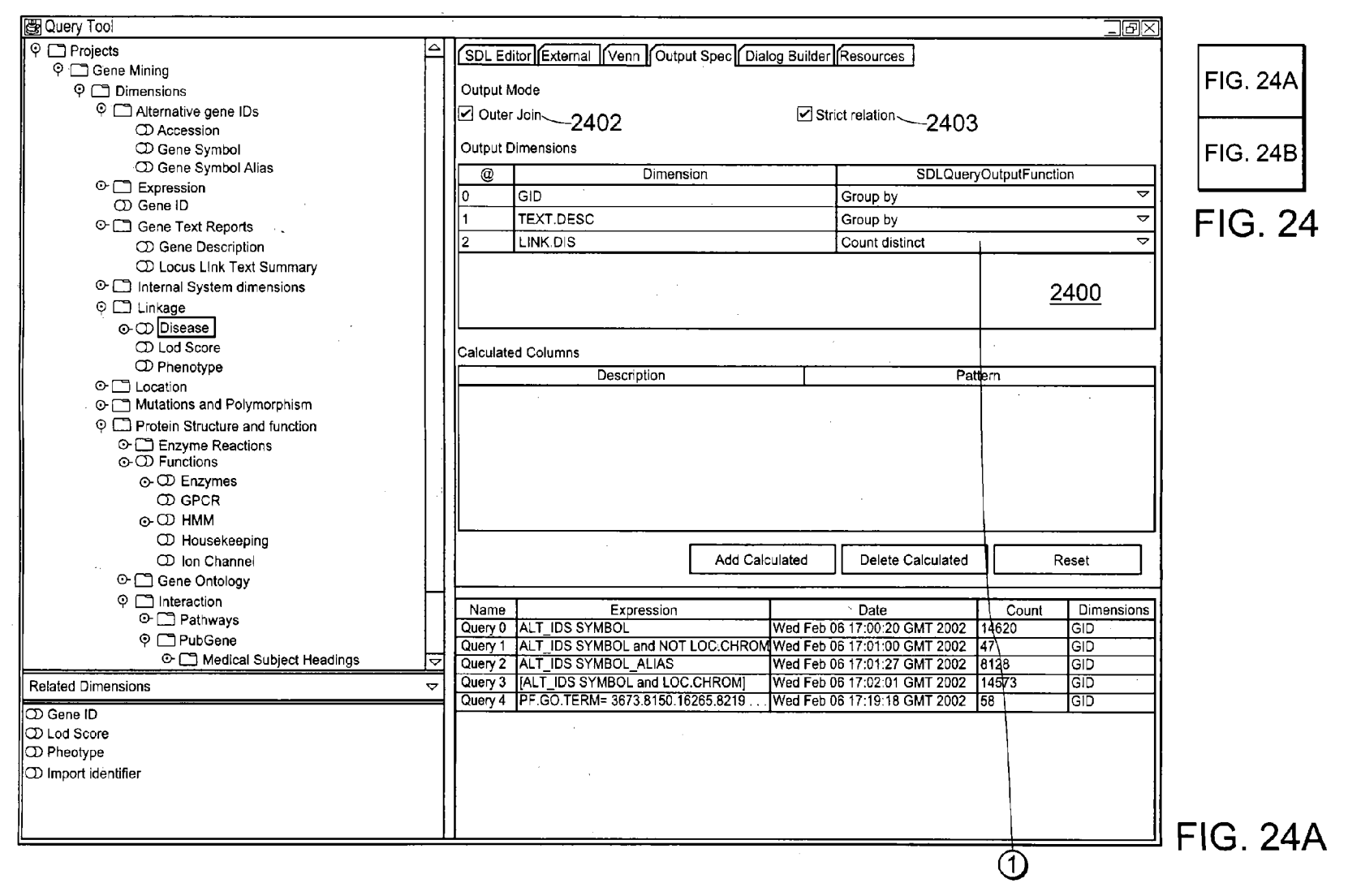

As shown in FIGS. 24A and B, the output specification (report builder) also supports the creation of columns with aggregate operators 2400 (the standard SQL aggregate operators) as shown in 2401. Furthermore, the output specification tool allows the user to specify whether the relations that contain the dimensions should be joined with the set using outer join or regular join 2402. Also, it allows the user to specify if all the dimensions in the report have to come from a single relation or not. If strict is selected 2403 the system will complain if more than one relation is needed to cover all the dimensions specified in the output specification. Notice that the output specification is to specify an operation, i.e. the report generation, which is independent of the SDL set definition, although both depend on the definition of an output-dimension. As mentioned before, SSDL is ideal for the purpose of generating instructions to create a report.

Figure 25B:
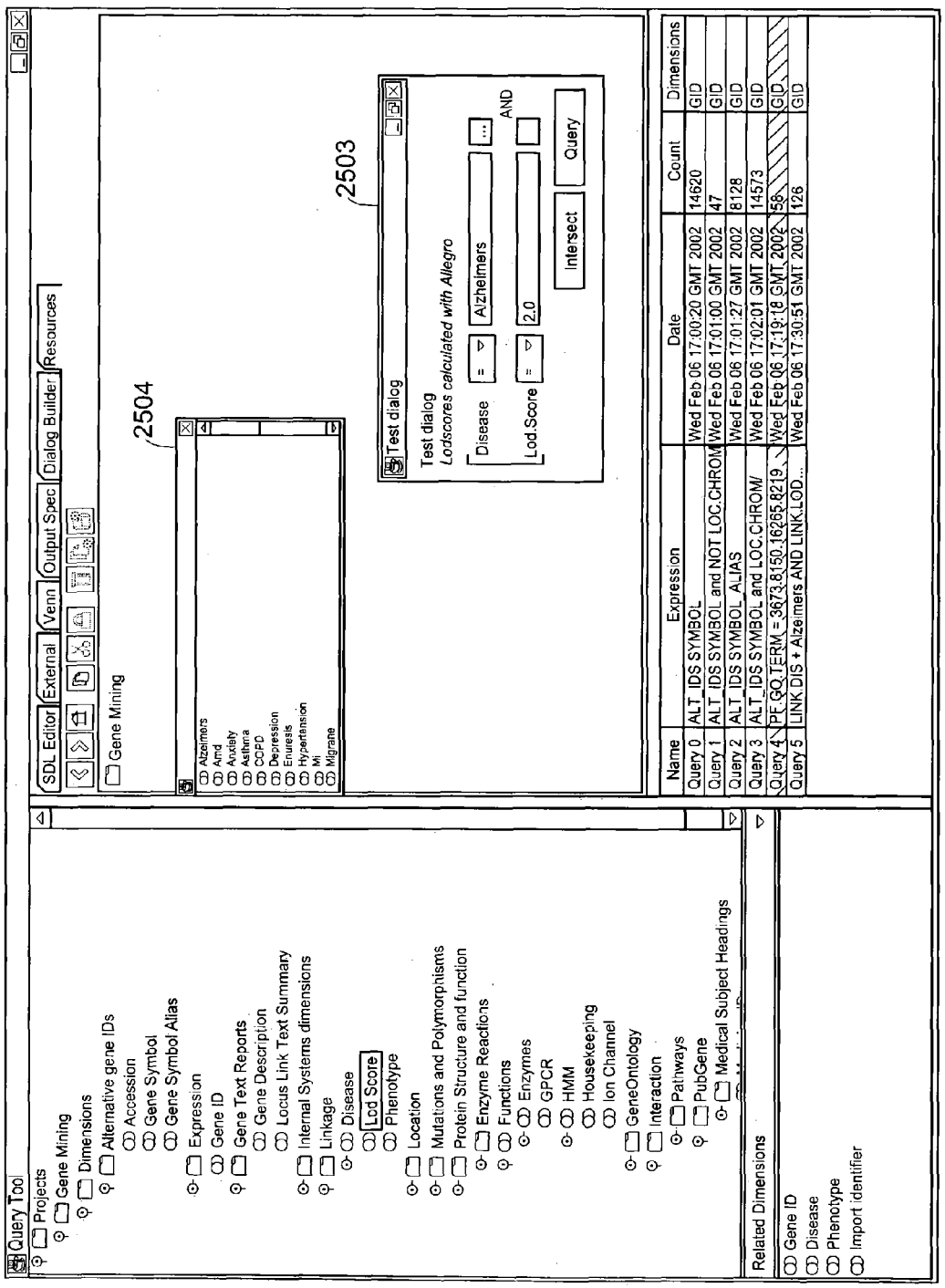
FIGS. 25A and B illustrate SDL query dialogs.

Even though the syntax-aware editor in conjunction with the drag and drop behavior of the metadata tree provides a user-friendly interface, it is even easier to issue queries through specially designed dialogs. Because of the simple and sparse nature of the SDL language, it is relatively easy to create a drag-and drop driven dialog builder in which users can create their own dialogs without any programming effort. In the preferred embodiment of the composite query tool, applicants describe a dialog builder as shown in FIGS. 25A and B. The user can simply drag the dimensions from tree, 2500, and drop them onto a canvas. This will create an input field for the corresponding dimensions in the dialog. The user can then build expressions with Boolean logic by connecting the input fields with either AND or OR as in 2501. Furthermore, the user can enclose input fields from the same relation into a record operator by labeling the appropriate dimensions with a tick mark and then locking them together 2502.

The dialogs can be locked and launched such as from the resource tab. The dialog then prompts the user for input 2503 for all the fields in the dialogs. The inputs will then become constraints on the corresponding dimensions, e.g. disease type of a lod score in 2503. For enumerable dimensions the dialog even supports browsing of the corresponding domain hierarchy 2504. Once the user presses the query button in the dialog, an SDL query is launched and the result set appears in the list-box 2201, like the sets defined from the editor. A particularly nice feature of the dialogs in the preferred embodiment is that if the user does not complete all fields, the dialog will generate a reduced expression. The rules resemble the way NULL is treated in Boolean logic in SQL, e.g. the SDL expression {e1 AND unknown AND e3} will become {e1 AND e3} and {e1 AND unknown OR e3} will become {e1 OR e3}. Since the expressions that the dialogs support are usually relatively simple SDL expressions, the reduction of the expression based on undefined fields does not cause confusion. This type of reduction mechanism can also easily be extended to more complex expressions that involve brackets. The rules above can be applied within each bracket, and only if the entire expression within the bracket results in unknown is the bracket replaced with unknown. In many ways, the dialogs can be considered as SDL setnames (formulas) with parameters (see the SDL syntax specification). Indeed, the present embodiment stores setname formulas and dialogs in a similar manner.

Figures 26, 26A, 26B:
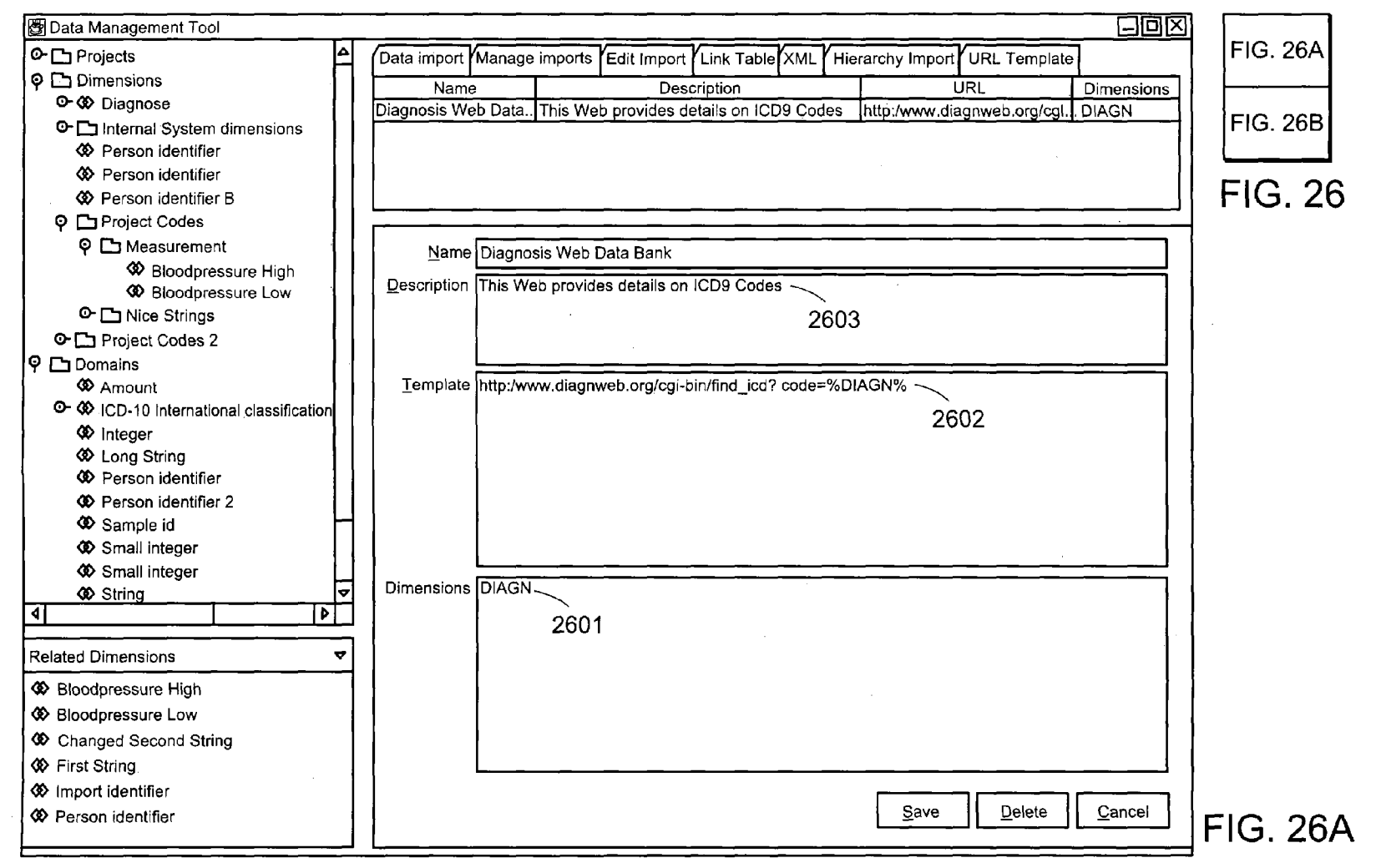

FIGS. 26A and B show how the present invention provides a template builder for a universal resource locator (URL), i.e. a tool for defining web-based actions. Other actions, such as Windows based OLE actions could also be defined in a similar manner. The URL templates can be defined in terms of fingerprints of one or more dimensions 2601. The URL can then be defined in terms of symbols indicating the desired dimensions 2602. Furthermore, a description 2603 can be assigned to the given URL template. In SDL reports, the user can then activate URL templates that are compatible with the dimension fingerprint of the given report. By selecting a specific line in the report the user can then choose a template 2604 to launch, which is then populated by the corresponding dimension values in the report 2605. As a remark, it is noted that URL templates can also be based on domain fingerprints as compared to dimension fingerprint.

Figure 27:
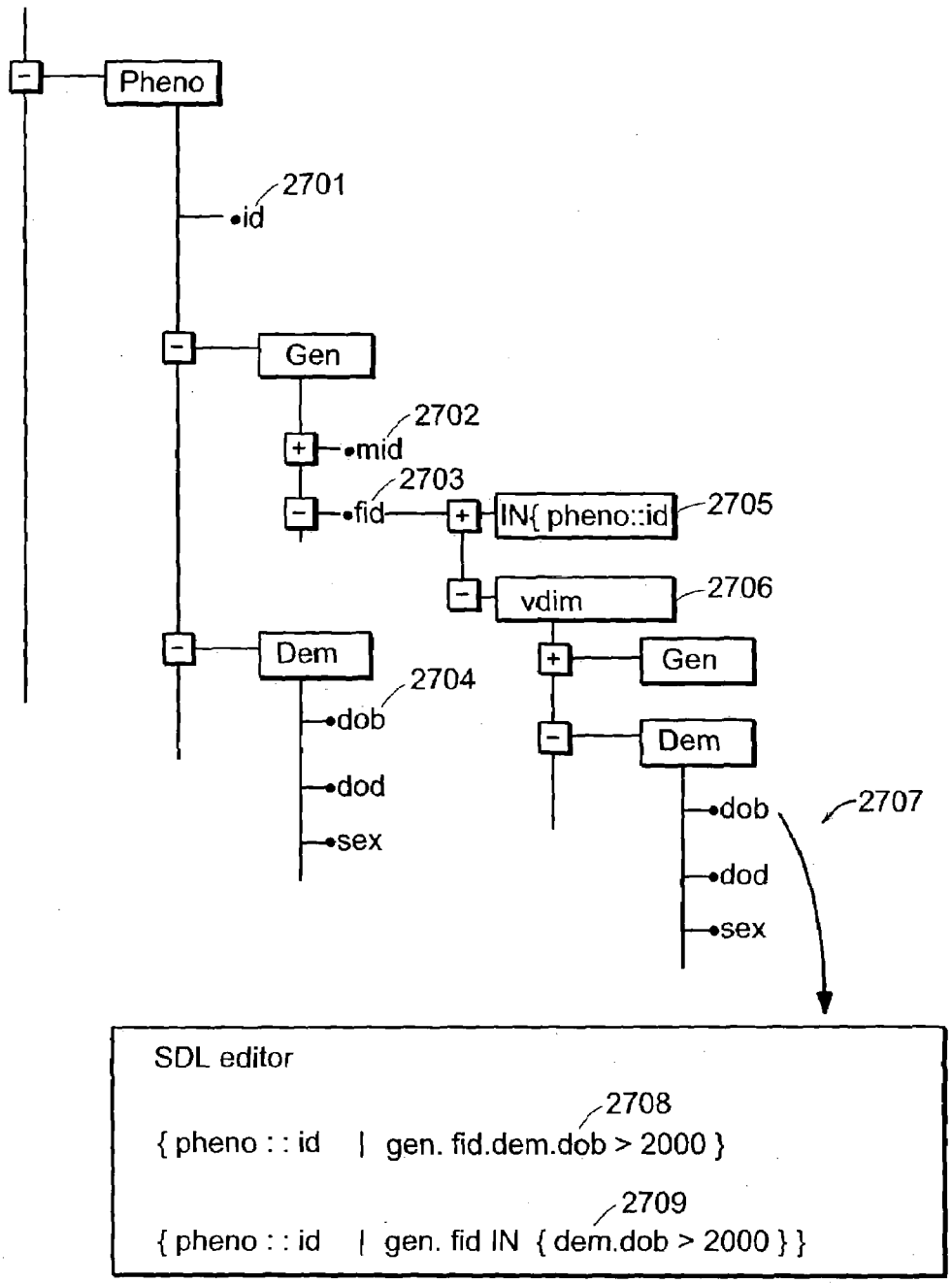
FIG. 27 illustrates nested dimension drilling, nested sets, virtual dimensions, default dimension prefix and default output-dimension

Nested dimension drilling is a GUT support feature for creating nested SDL queries or SDL queries with virtual dimensions. FIG. 27 shows an exemplary data tree-browser in an SDL query composer 1903, 1904. Here it is assumed that the metadata has been defined in such a way that pheno.id 2701 is the primary dimension of the domain shared by pheno.id 2701, pheno.gen.mid 2702 and pheno.gen.fid 2703. Other dimensions, such as pheno.dem.dob 2704, are of different domain, a domain for which no primary dimension has been defined. Therefore, one sees no symbol or indication for drill-in (plus or minus) in 2704 as is seen in both 2702 and 2703. Once the user chooses to drill-in on pheno.gen.fid 2703, the present invention provides two options: (a) to drill-in for generating nested sets 2705 or (b) to drill-in to generate virtual relations 2706. In FIG. 27 it is assumed that the user chose 2706 to select a virtual dimension. Regardless of which of the two selections the user makes, he will see a new dimension tree fold out with all the dimensions that belong to relations with the primary dimension of the domain that 2703 belongs to.

Thus, dob 2707 denotes the virtual dimension pheno.gen.fid.dem.dob, which would be the dimension that is inserted into the SDL 2708 if it is dragged-and-dropped into the editor. In contrast, had the user chosen to drill-in through 2705, a drag-and-drop would have resulted in 2709 in the SDL editor.

Since the tree browser can become a little too crowded with these drill-in indications (2705 and 2706), one embodiment of the present invention makes them optional. The user can press a button to hide them from the tree. With FIG. 27 in mind, it should not be too hard to envision an extension of the tree browser where other features of dimensions are made available in a similar manner as the above drill-in indications. Such features can be object-relational methods, as mentioned earlier, supported operators etc. Indeed, the domain value browsing 1907 is a special case of such support provided in an exemplary embodiment of the invention. Presentation of all of these features could be customizable. Similarly, the tree-view could be customized to show only the dimensions that are related to specific primary dimensions, e.g. with events from the context sensitive SDL editor. All such support can make the query building process easier for the user.

The "SDL Users Manual" is attached as an appendix to the related U.S. Provisional Application No. 60/356,559 and provides further description of Applicants' overall SDL system and the present invention SDL server 102. Such description is herein incorporated by reference as part of this disclosure.

While this invention has been particularly shown and described with references to preferred embodiments thereof, it will be understood by those skilled in the art that various changes in form and details may be made therein without departing from the scope of the invention encompassed by the appended claims.

What is claimed is:

1. In a computer system, a method of retrieving sets of object data from a data store by defining queries on virtual relations which define desired sets of object data to be retrieved from the data store, comprising the steps of:

providing a written representation of a desired object data set in terms of dimensions from relations storing object data in the data store;

implying constraints on relation instances or dimensions including specifying sets of objects using constraints on dimensions and using a record operator to indicate which constraints apply to a same tuple in a relation, said step of implying constraints enabling length of the written representation to be minimized; and using the written representation, querying the data store and retrieving the desired object data set, including using the record operator to apply multiple atomic constraints on different dimensions in a same tuple in a relation, said querying and retrieving resulting in the desired object data set as query results.

2. A method as claimed in claim 1 wherein the step of providing a written representation includes using a record operator to express to a user where constraints on different dimensions apply to a same tuple in a relation or multiple constraints on a same dimension apply to multiple tuples.

3. A method as claimed in claim 1 wherein the step of providing a written representation includes employing any combination of a disjunctive expression and a conjunctive expression; and further comprising the steps of:
  performing OR-distribution on disjunctive expressions; and
  eliminating from disjunctive expressions, conjuncts with undefined binding variables.

4. A method as claimed in claim 1 further comprising the steps of:
  translating a conjunctive expression including reordering terms of a conjunct;
  moving terms with negation and no binding variables furthest back in the conjunct;
  placing terms without negation ahead of other terms in the conjunct; and
  adding a terms with the certain set type of the desired data set to the front of the conjunct if all existing terms have negation.

5. A method as claimed in claim 1 further comprising the step of automatically enforcing a record-operator where an expression in the written representation without the record-operator is semantically equivalent to the expression with the record-operator.

6. A method as claimed in claim 1 wherein the data store has a native query engine; and
  further comprising the step of rewriting the written representation such that upon translation of the rewritten written representation into code for the native query engine, the code is optimized for querying the data store.

7. A method as claimed in claim 1 wherein the step of providing a written representation includes utilizing a certain symbol to specify hierarchical constraints on dimensions.

8. A method as claimed in claim 7 wherein the certain symbol is a colon or an equal sign followed by a colon.

9. A method as claimed in claim 1 wherein the step of providing a written representation includes using an expression with bidirectional inlining of SQL statements and SDL statements; and
  further comprising the steps of
    denoting a start of SDL inlining in SQL with a bracket type symbol or referring to SDL metadata in an SQL statement by enclosing it in a bracket-operator.

10. A method as claimed in claim 9 wherein the step of denoting includes denoting the start of SQL inlining in SDL with a square-bracket followed by a certain keyword or
  denoting the start of SQL inlining in SDL with a curly-bracket followed by a certain keyword.

11. A method as claimed in claim 1 further comprising the step of supporting federated queries by having session dependent federation in which metadata is defined at runtime and federation nicknames are generated on demand.

12. In a computer system, apparatus for retrieving sets of object data from a data store by defining queries on virtual relations which define desired sets of object data to be retrieved from the data store, comprising:
  an input component for providing a written representation of a desired object data set in terms of dimension attributes from relations storing object data in the data store, wherein the written representation specifies sets of objects using predicates on dimension attributes and employing a record operator notation to indicate which predicates apply to a same tuple; and
  an assembly coupled to receive the written representation, in response the assembly using the written representation to query the data store and retrieve the desired object data set by implying constraints on relations and determining number of dimensions and tuples in a relation to apply predicates, said implying constraints enabling length of the written representation to be minimized, the assembly producing an indication of the retrieved desired object data set as query results.

13. Apparatus as claimed in claim 12 wherein the written representation includes a record operator to express to a user which predicates on different dimensions apply to a same tuple in a relation and which multiple predicates on a same dimension apply to multiple tuples.

14. Apparatus as claimed in claim 13 wherein the assembly further reorders terms of a conjunctive expression.

15. Apparatus as claimed in claim 12 wherein the assembly automatically enforces a record-operator where an expression in the written representation without the record-operator is equivalent to the expression with the record-operator.

16. Apparatus as claimed in claim 12 wherein the written representation utilizes a certain symbol to specify hierarchical constraints on dimensions.

17. Apparatus as claimed in claim 16 wherein the certain symbol is a colon or an equal sign followed by a colon.

18. Apparatus as claimed in claim 12 wherein the input component includes:
  an editor for composing written representations; and
  a data browser for enabling user browsing of dimension values and relations of the data store, to assist a user in composing desired written representations, wherein the editor employs a user interface which supports drag and drop of dimensions and relation values in written representations being composed.

19. Apparatus as claimed in claim 12 wherein the written representation includes an expression with bidirectional inlining of SQL statements and SDL statements.

20. Apparatus as claimed in claim 19 wherein said expression denotes SDL portions in an SQL statement with one bracket operator, and denotes SQL portions in an SDL statement with another bracket-type operator.

21. Apparatus as claimed in claim 12 wherein the assembly supports federated queries of the data store by using prefixes or aliases to map dimension names.

22. Apparatus as claimed in claim 21 wherein the assembly has session dependent federation in which metadata is defined at runtime and federation nicknames are generated on demand.

* * * * *